US012646376B2

(12) United States Patent
Miri et al.

(10) Patent No.: US 12,646,376 B2
(45) **Date of Patent: *Jun. 2, 2026**

(54) SYSTEM AND METHOD FOR TRANSFERRING FUNDS FROM A FINANCIAL INSTITUTION DEVICE TO A CASHLESS WAGERING ACCOUNT ACCESSIBLE VIA A MOBILE DEVICE

(71) Applicant: IGT, Las Vegas, NV (US)

(72) Inventors: Sina Miri, Menlo Park, CA (US); Erik B. Petersen, Reno, NV (US); Kevin Higgins, Reno, NV (US); Dwayne A Davis, Reno, NV (US); Matthew Levin, Reno, NV (US)

(73) Assignee: IGT, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/015,218

(22) Filed: Jan. 9, 2025

(65) Prior Publication Data

US 2025/0148868 A1 May 8, 2025

Related U.S. Application Data

(63) Continuation of application No. 17/158,565, filed on Jan. 26, 2021, now Pat. No. 12,217,570, which is a continuation of application No. 15/244,857, filed on Aug. 23, 2016, now Pat. No. 10,916,090.

(51) Int. Cl.
*G07F 17/32* (2006.01)

(52) U.S. Cl.
CPC ...... *G07F 17/3244* (2013.01); *G07F 17/3211* (2013.01); *G07F 17/3225* (2013.01); *G07F 17/3241* (2013.01)

(58) Field of Classification Search
CPC ............ G07F 17/3202; G07F 17/3204; G07F 17/3209; G07F 17/3211; G07F 17/3223; G07F 17/3225; G07F 17/3241; G07F 17/3244; G07F 17/3251; G06Q 20/10;
(Continued)

(56) References Cited

U.S. PATENT DOCUMENTS

| | | | |
|---|---|---|---|
| 2,033,638 | A | 3/1936 | Koppl |
| 2,062,923 | A | 12/1936 | Nagy |
| 3,662,105 | A | 5/1972 | Hurst |

(Continued)

FOREIGN PATENT DOCUMENTS

| | | |
|---|---|---|
| EA | 008726 | 8/2007 |
| EP | 0805424 | 11/1997 |

(Continued)

OTHER PUBLICATIONS

EZ Pay® Card Accounts Advertisement, written by IGT, published in 2013 (1 page).

(Continued)

*Primary Examiner* — Thien M Le
*Assistant Examiner* — April A Taylor
(74) *Attorney, Agent, or Firm* — Neal, Gerber & Eisenberg LLP

(57) ABSTRACT

Systems and methods for transferring funds from a financial institution account to a cashless wagering account and then to an electronic gaming machine without utilizing any physical forms of currency.

20 Claims, 12 Drawing Sheets

(58) Field of Classification Search
CPC ... G06Q 20/108; G06Q 20/1085; G06Q 20/18
See application file for complete search history.

(56) References Cited

U.S. PATENT DOCUMENTS 4,071,689 A 1/1978 Talmage
4,072,930 A 2/1978 Lucero
D247,828 S 5/1978 Moore et al.
4,159,054 A 6/1979 Yoshida
4,283,709 A 8/1981 Lucero
4,339,709 A 7/1982 Brihier
4,339,798 A 7/1982 Hedges
4,553,222 A 11/1985 Kurland
4,575,622 A 3/1986 Pellegrini
4,741,539 A 5/1988 Sutton et al.
4,764,666 A 8/1988 Bergeron
4,799,683 A 1/1989 Bruner, Jr.
4,856,787 A 8/1989 Itkis
4,882,473 A 11/1989 Bergeron et al.
4,948,138 A 8/1990 Pease et al.
5,011,149 A 4/1991 Purnell
5,038,022 A 8/1991 Lucero
5,042,809 A 8/1991 Richardson
5,048,831 A 9/1991 Sides
5,067,712 A 11/1991 Georgilas
5,096,195 A 3/1992 Gimmon
5,168,969 A 12/1992 Mayhew
5,179,517 A 1/1993 Sarbin
5,221,838 A 6/1993 Gutman
5,232,191 A 8/1993 Infanti
5,240,249 A 8/1993 Czarnecki et al.
5,242,163 A 9/1993 Fulton
5,265,874 A 11/1993 Dickinson et al.
5,276,312 A 1/1994 McCarthy
5,287,269 A 2/1994 Dorrough et al.
5,290,033 A 3/1994 Bittner et al.
5,326,104 A 7/1994 Pease et al.
5,332,076 A 7/1994 Ziegert
5,342,047 A 8/1994 Heidel et al.
5,344,144 A 9/1994 Cannon
5,371,345 A 12/1994 Lestrange
5,397,125 A 3/1995 Adams
5,398,932 A 3/1995 Eberhardt et al.
D359,765 S 6/1995 Izawa
5,429,361 A 7/1995 Raven
5,429,363 A 7/1995 Hayashi
5,457,306 A 10/1995 Lucero
5,470,079 A 11/1995 LeStrange et al.
5,483,049 A 1/1996 Schulze, Jr.
5,489,010 A 2/1996 Rogers
5,505,449 A 4/1996 Eberhardt et al.
5,557,086 A 9/1996 Schulze et al.
5,559,312 A 9/1996 Lucero
5,579,002 A 11/1996 Iggulden et al.
5,580,309 A 12/1996 Piechowiak et al.
5,580,310 A 12/1996 Orus et al.
5,611,730 A 3/1997 Weiss
5,618,045 A 4/1997 Kagan
5,643,086 A 7/1997 Alcorn
5,645,486 A 7/1997 Nagao et al.
5,655,961 A 8/1997 Acres
5,676,231 A 10/1997 Legras
5,702,304 A 12/1997 Acres
5,704,835 A 1/1998 Dietz
5,709,603 A 1/1998 Kaye
5,718,632 A 2/1998 Hayashi
5,727,786 A 3/1998 Weingardt
5,741,183 A 4/1998 Acres
5,759,102 A 6/1998 Pease
5,761,647 A 6/1998 Boushy
5,762,617 A 6/1998 Infanti
5,766,074 A 6/1998 Cannon et al.
5,768,382 A 6/1998 Schneier
5,769,716 A 6/1998 Saffari
5,770,533 A 6/1998 Franchi
5,779,545 A 7/1998 Berg
5,788,573 A 8/1998 Baerlocher
5,795,228 A 8/1998 Trumbull
5,796,389 A 8/1998 Bertram
5,797,085 A 8/1998 Beuk
5,809,482 A 9/1998 Strisower
5,811,772 A 9/1998 Lucero
5,816,918 A 10/1998 Kelly
5,818,019 A 10/1998 Irwin, Jr.
5,833,536 A 11/1998 Davids
5,833,537 A 11/1998 Barrie
5,833,540 A 11/1998 Miodunski
5,836,819 A 11/1998 Ugawa
5,851,148 A 12/1998 Brune
5,871,398 A 2/1999 Schneier
D406,612 S 3/1999 Johnson
5,885,158 A 3/1999 Torango
5,902,983 A 5/1999 Crevelt et al.
5,913,487 A 6/1999 Leatherman
5,919,091 A 7/1999 Bell
5,935,000 A 8/1999 Sanchez, III et al.
5,943,624 A 8/1999 Fox et al.
5,947,820 A 9/1999 Morro et al.
5,951,397 A 9/1999 Dickinson
5,952,640 A 9/1999 Lucero
5,954,583 A 9/1999 Green
5,957,776 A 9/1999 Hoehne
5,959,277 A 9/1999 Lucero
5,967,896 A 10/1999 Jorasch
5,971,271 A 10/1999 Wynn
5,984,779 A 11/1999 Bridgeman
5,997,401 A 12/1999 Crawford
5,999,808 A 12/1999 Ladue
6,001,016 A 12/1999 Walker
6,003,013 A 12/1999 Boushy
6,003,651 A 12/1999 Waller
6,010,404 A 1/2000 Walker
6,012,832 A 1/2000 Saunders
6,012,983 A 1/2000 Walker
6,014,594 A 1/2000 Heidel et al.
6,019,283 A 2/2000 Lucero
6,038,666 A 3/2000 Hsu
6,039,648 A 3/2000 Guinn et al.
6,048,269 A 4/2000 Burns
6,050,895 A 4/2000 Luciano
6,056,642 A 5/2000 Bennett
6,059,289 A 5/2000 Vancura
6,062,981 A 5/2000 Luciano
6,068,552 A 5/2000 Walker
6,077,163 A 6/2000 Walker
6,089,975 A 7/2000 Dunn
6,089,977 A 7/2000 Bennett
6,091,066 A 7/2000 Sugihara
6,095,920 A 8/2000 Sudahiro
6,099,408 A 8/2000 Schneier
6,104,815 A 8/2000 Alcorn
6,106,396 A 8/2000 Alcorn
6,110,041 A 8/2000 Walker et al.
6,113,098 A 9/2000 Adams
6,113,492 A 9/2000 Walker
6,113,493 A 9/2000 Walker
6,113,495 A 9/2000 Walker
6,120,025 A 9/2000 Hughes
6,125,307 A 9/2000 Heidel et al.
6,128,550 A 10/2000 Heidel et al.
6,135,884 A 10/2000 Hedrick
6,135,887 A 10/2000 Pease
6,139,419 A 10/2000 Abe
6,139,431 A 10/2000 Walker
6,141,711 A 10/2000 Shah
6,142,369 A 11/2000 Jonstromer
6,142,872 A 11/2000 Walker et al.
6,146,273 A 11/2000 Olsen
6,149,522 A 11/2000 Alcorn
6,161,059 A 12/2000 Tedesco
6,162,121 A 12/2000 Morro
6,162,122 A 12/2000 Acres
6,165,071 A 12/2000 Weiss
6,174,234 B1 1/2001 Seibert, Jr.

(56) References Cited

U.S. PATENT DOCUMENTS

| | | | |
|---|---|---|---|
| 6,182,221 | B1 | 1/2001 | Hsu |
| 6,183,362 | B1 | 2/2001 | Boushy |
| 6,190,256 | B1 | 2/2001 | Walker |
| 6,206,283 | B1 | 3/2001 | Bansal |
| 6,210,279 | B1 | 4/2001 | Dickinson |
| 6,223,166 | B1 | 4/2001 | Kay |
| 6,227,972 | B1 | 5/2001 | Walker |
| 6,231,445 | B1 | 5/2001 | Acres |
| 6,244,958 | B1 | 6/2001 | Acres |
| 6,247,643 | B1 | 6/2001 | Lucero |
| 6,253,119 | B1 | 6/2001 | Dabrowski |
| 6,264,560 | B1 | 7/2001 | Goldberg |
| 6,264,561 | B1 | 7/2001 | Saffari |
| 6,267,671 | B1 | 7/2001 | Hogan |
| 6,270,410 | B1 | 8/2001 | Demar |
| 6,270,412 | B1 | 8/2001 | Crawford et al. |
| 6,280,328 | B1 | 8/2001 | Holch |
| 6,285,868 | B1 | 9/2001 | Ladue |
| 6,290,600 | B1 | 9/2001 | Glasson |
| 6,293,485 | B1 | 9/2001 | Hollowed |
| 6,293,866 | B1 | 9/2001 | Walker |
| 6,302,790 | B1 | 10/2001 | Brossard |
| 6,307,956 | B1 | 10/2001 | Black |
| D451,153 | S | 11/2001 | Hedrick et al. |
| 6,318,536 | B1 | 11/2001 | Korman et al. |
| 6,319,125 | B1 | 11/2001 | Acres |
| 6,341,353 | B1 | 1/2002 | Herman |
| 6,347,738 | B1 | 2/2002 | Crevelt et al. |
| 6,353,390 | B1 | 3/2002 | Beri et al. |
| 6,364,768 | B1 | 4/2002 | Acres et al. |
| 6,368,216 | B1 | 4/2002 | Hedrick |
| 6,371,852 | B1 | 4/2002 | Acres |
| 6,378,073 | B1 | 4/2002 | Davis |
| 6,379,246 | B1 | 4/2002 | Dabrowski |
| 6,383,076 | B1 | 5/2002 | Tiedeken |
| 6,394,907 | B1 | 5/2002 | Rowe |
| 6,409,595 | B1 | 6/2002 | Uihlein |
| 6,409,602 | B1 | 6/2002 | Wiltshire |
| 6,416,406 | B1 | 7/2002 | Duhamel |
| 6,416,409 | B1 | 7/2002 | Jordan |
| 6,422,670 | B1 | 7/2002 | Hedrick et al. |
| 6,443,452 | B1 | 9/2002 | Brune |
| 6,443,843 | B1 | 9/2002 | Walker |
| 6,450,885 | B2 | 9/2002 | Schneier |
| 6,454,649 | B1 | 9/2002 | Mattice et al. |
| 6,488,203 | B1 | 12/2002 | Stoutenberg et al. |
| 6,488,585 | B1 | 12/2002 | Wells |
| 6,491,584 | B2 | 12/2002 | Graham et al. |
| 6,496,928 | B1 | 12/2002 | Deo |
| 6,505,095 | B1 | 1/2003 | Kolls |
| 6,508,710 | B1 | 1/2003 | Paravia et al. |
| 6,530,835 | B1 | 3/2003 | Walker |
| 6,547,131 | B1 | 4/2003 | Foodman et al. |
| D474,183 | S | 5/2003 | Mesa |
| 6,558,256 | B1 | 5/2003 | Saunders et al. |
| 6,561,900 | B1 | 5/2003 | Baerlocker et al. |
| 6,561,903 | B2 | 5/2003 | Walker |
| 6,579,179 | B2 | 6/2003 | Poole et al. |
| 6,581,161 | B1 | 6/2003 | Byford |
| 6,582,310 | B1 | 6/2003 | Walker |
| 6,585,598 | B2 | 7/2003 | Nguyen |
| 6,592,457 | B1 | 7/2003 | Frohm et al. |
| 6,612,574 | B1 | 9/2003 | Cole et al. |
| 6,620,046 | B2 | 9/2003 | Rowe |
| 6,628,939 | B2 | 9/2003 | Paulsen |
| 6,634,550 | B1 | 10/2003 | Walker et al. |
| 6,638,166 | B2 | 10/2003 | Hedrick et al. |
| 6,641,477 | B1 | 11/2003 | Dietz, II |
| 6,645,078 | B1 | 11/2003 | Mattice |
| 6,648,755 | B1 | 11/2003 | Luciano et al. |
| 6,648,761 | B1 | 11/2003 | Izawa et al. |
| 6,676,522 | B2 | 1/2004 | Rowe et al. |
| 6,682,421 | B1 | 1/2004 | Rowe |
| 6,682,422 | B1 | 1/2004 | Walker et al. |
| 6,685,567 | B2 | 2/2004 | Cockerille |
| 6,702,670 | B2 | 3/2004 | Jasper et al. |
| 6,702,672 | B1 | 3/2004 | Angell et al. |
| 6,712,191 | B2 | 3/2004 | Hand |
| D488,512 | S | 4/2004 | Knobel |
| 6,719,630 | B1 | 4/2004 | Seelig et al. |
| D490,473 | S | 5/2004 | Knobel |
| 6,729,958 | B2 | 5/2004 | Burns et al. |
| 6,736,725 | B2 | 5/2004 | Burns et al. |
| 6,739,972 | B2 | 5/2004 | Flanagan-Parks et al. |
| 6,739,975 | B2 | 5/2004 | Nguyen |
| 6,743,098 | B2 | 6/2004 | Urie et al. |
| 6,749,510 | B2 | 6/2004 | Globbi |
| 6,752,312 | B1 | 6/2004 | Chamberlain et al. |
| 6,758,393 | B1 | 7/2004 | Luciano |
| 6,758,757 | B2 | 7/2004 | Luciano, Jr. et al. |
| 6,773,345 | B2 | 8/2004 | Walker et al. |
| 6,778,820 | B2 | 8/2004 | Tendler |
| 6,780,111 | B2 | 8/2004 | Cannon et al. |
| 6,799,032 | B2 | 9/2004 | McDonnell et al. |
| 6,800,027 | B2 | 10/2004 | Giobbi et al. |
| 6,800,029 | B2 | 10/2004 | Rowe |
| 6,804,763 | B1 | 10/2004 | Stockdale et al. |
| 6,811,486 | B1 | 11/2004 | Luciano, Jr. |
| 6,814,282 | B2 | 11/2004 | Seifert et al. |
| 6,831,682 | B1 | 12/2004 | Silverbrook et al. |
| 6,834,794 | B2 | 12/2004 | Dabrowski |
| 6,835,134 | B2 | 12/2004 | Poole et al. |
| 6,843,725 | B2 | 1/2005 | Nelson |
| 6,846,238 | B2 | 1/2005 | Wells |
| 6,848,995 | B1 | 2/2005 | Walker et al. |
| 6,852,029 | B2 | 2/2005 | Van Baltz et al. |
| 6,869,361 | B2 | 3/2005 | Sharpless et al. |
| 6,869,362 | B2 | 3/2005 | Walker |
| 6,875,106 | B2 | 4/2005 | Weiss et al. |
| 6,880,079 | B2 | 4/2005 | Kefford |
| 6,884,170 | B2 | 4/2005 | Rowe |
| 6,884,172 | B1 | 4/2005 | Lloyd et al. |
| 6,892,182 | B1 | 5/2005 | Rowe et al. |
| 6,896,618 | B2 | 5/2005 | Benoy |
| 6,902,484 | B2 | 6/2005 | Idaka |
| 6,905,411 | B2 | 6/2005 | Nguyen et al. |
| 6,908,390 | B2 | 6/2005 | Nguyen et al. |
| 6,913,532 | B2 | 7/2005 | Baerlocher et al. |
| 6,923,721 | B2 | 8/2005 | Luciano et al. |
| 6,935,957 | B1 | 8/2005 | Yates et al. |
| 6,935,958 | B2 | 8/2005 | Nelson |
| 6,949,022 | B1 | 9/2005 | Showers et al. |
| 6,955,600 | B2 | 10/2005 | Glavich et al. |
| 6,969,319 | B2 | 11/2005 | Rowe et al. |
| 6,971,956 | B2 | 12/2005 | Rowe et al. |
| 6,984,174 | B2 | 1/2006 | Cannon et al. |
| 6,997,803 | B2 | 2/2006 | LeMay et al. |
| 7,004,388 | B2 | 2/2006 | Kohta |
| 7,004,837 | B1 | 2/2006 | Crowder et al. |
| 7,018,292 | B2 | 3/2006 | Tracy et al. |
| 7,032,115 | B2 | 4/2006 | Kashani |
| 7,033,276 | B2 | 4/2006 | Walker et al. |
| 7,035,626 | B1 | 4/2006 | Luciano |
| 7,037,195 | B2 | 5/2006 | Schneider et al. |
| 7,048,628 | B2 | 5/2006 | Schneider |
| 7,048,630 | B2 | 5/2006 | Berg et al. |
| D523,482 | S | 6/2006 | Uemizo |
| 7,063,617 | B2 | 6/2006 | Brosnan et al. |
| 7,076,329 | B1 | 7/2006 | Kolls |
| 7,089,264 | B1 | 8/2006 | Guido et al. |
| 7,094,148 | B2 | 8/2006 | Baerlocher et al. |
| 7,105,736 | B2 | 9/2006 | Laakso |
| 7,111,141 | B2 | 9/2006 | Nelson |
| 7,144,321 | B2 | 12/2006 | Mayeroff |
| 7,152,783 | B2 | 12/2006 | Charrin |
| 7,153,210 | B2 | 12/2006 | Yamagishi |
| 7,167,724 | B2 | 1/2007 | Yamagishi |
| 7,169,041 | B2 | 1/2007 | Tessmer et al. |
| 7,169,052 | B2 | 1/2007 | Beaulieu et al. |
| 7,175,523 | B2 | 2/2007 | Gilmore et al. |
| 7,181,228 | B2 | 2/2007 | Boesch |
| 7,182,690 | B2 | 2/2007 | Giobbi et al. |
| RE39,644 | E | 5/2007 | Alcorn et al. |
| 7,213,750 | B1 | 5/2007 | Barnes et al. |

(56) References Cited

U.S. PATENT DOCUMENTS

| | | | |
|---|---|---|---|
| D547,806 | S | 7/2007 | Uemizo |
| 7,243,104 | B2 | 7/2007 | Bill |
| 7,247,098 | B1 | 7/2007 | Bradford et al. |
| 7,259,718 | B2 | 8/2007 | Patterson et al. |
| 7,275,989 | B2 | 10/2007 | Moody |
| 7,275,991 | B2 | 10/2007 | Burns |
| 7,285,047 | B2 | 10/2007 | Gielb et al. |
| 7,314,408 | B2 | 1/2008 | Cannon et al. |
| 7,316,615 | B2 | 1/2008 | Soltys et al. |
| 7,316,619 | B2 | 1/2008 | Nelson |
| 7,318,775 | B2 | 1/2008 | Brosnan et al. |
| 7,326,116 | B2 | 2/2008 | O'Donovan et al. |
| 7,330,108 | B2 | 2/2008 | Thomas |
| 7,331,520 | B2 | 2/2008 | Silva |
| 7,335,106 | B2 | 2/2008 | Johnson |
| 7,337,330 | B2 | 2/2008 | Gatto |
| 7,341,522 | B2 | 3/2008 | Yamagishi |
| 7,346,358 | B2 | 3/2008 | Wood et al. |
| 7,355,112 | B2 | 4/2008 | Laakso |
| 7,384,338 | B2 | 6/2008 | Rothschild et al. |
| 7,387,571 | B2 | 6/2008 | Walker et al. |
| 7,393,278 | B2 | 7/2008 | Gerson et al. |
| 7,396,990 | B2 | 7/2008 | Lu et al. |
| 7,403,788 | B2 | 7/2008 | Trioano et al. |
| 7,415,426 | B2 | 8/2008 | Williams et al. |
| 7,416,485 | B2 | 8/2008 | Walker |
| 7,419,428 | B2 | 9/2008 | Rowe |
| 7,425,177 | B2 | 9/2008 | Rodgers et al. |
| 7,427,234 | B2 | 9/2008 | Soltys et al. |
| 7,427,236 | B2 | 9/2008 | Kaminkow et al. |
| 7,427,708 | B2 | 9/2008 | Ohmura |
| 7,448,949 | B2 | 11/2008 | Kaminkow et al. |
| 7,467,999 | B2 | 12/2008 | Walker |
| 7,477,889 | B2 | 1/2009 | Kim |
| 7,500,913 | B2 | 3/2009 | Baerlocher |
| 7,510,474 | B2 | 3/2009 | Carter, Sr. |
| 7,513,828 | B2 | 4/2009 | Nguyen et al. |
| 7,519,838 | B1 | 4/2009 | Suurballe |
| 7,545,522 | B1 | 6/2009 | Lou |
| 7,552,341 | B2 | 6/2009 | Chen |
| 7,559,838 | B2 | 7/2009 | Walker et al. |
| 7,563,167 | B2 | 7/2009 | Walker et al. |
| 7,572,183 | B2 | 8/2009 | Olivas et al. |
| 7,585,222 | B2 | 9/2009 | Muir |
| 7,594,855 | B2 | 9/2009 | Meyerhofer |
| 7,602,298 | B2 | 10/2009 | Thomas |
| 7,607,174 | B1 | 10/2009 | Kashchenko et al. |
| 7,611,409 | B2 | 11/2009 | Muir et al. |
| 7,637,810 | B2 | 12/2009 | Amaitis et al. |
| 7,644,861 | B2 | 1/2010 | Alderucci |
| 7,653,757 | B1 | 1/2010 | Fernald et al. |
| 7,693,306 | B2 | 4/2010 | Huber |
| 7,699,703 | B2 | 4/2010 | Muir |
| 7,701,344 | B2 | 4/2010 | Mattice et al. |
| 7,722,453 | B2 | 5/2010 | Lark et al. |
| 7,749,079 | B2 | 7/2010 | Chamberlain et al. |
| 7,753,789 | B2 | 7/2010 | Walker et al. |
| 7,758,420 | B2 | 7/2010 | Saffari |
| 7,758,423 | B2 | 7/2010 | Foster et al. |
| 7,771,271 | B2 | 8/2010 | Walker et al. |
| 7,780,529 | B2 | 8/2010 | Rowe et al. |
| 7,780,531 | B2 | 8/2010 | Englman et al. |
| 7,785,192 | B2 | 8/2010 | Canterbury et al. |
| 7,785,193 | B2 | 8/2010 | Paulsen et al. |
| 7,803,053 | B2 | 9/2010 | Atkinson |
| 7,811,172 | B2 | 10/2010 | Asher et al. |
| 7,819,749 | B1 | 10/2010 | Fish |
| 7,822,688 | B2 | 10/2010 | Labron |
| 7,828,652 | B2 | 11/2010 | Nguyen et al. |
| 7,828,654 | B2 | 11/2010 | Carter |
| 7,828,661 | B1 | 11/2010 | Fish |
| D628,576 | S | 12/2010 | Daniel |
| 7,846,017 | B2 | 12/2010 | Walker et al. |
| 7,850,522 | B2 | 12/2010 | Walker et al. |
| 7,850,528 | B2 | 12/2010 | Wells |
| 7,874,919 | B2 | 1/2011 | Paulsen et al. |
| 7,877,798 | B2 | 1/2011 | Saunders et al. |
| 7,883,413 | B2 | 2/2011 | Paulsen |
| 7,883,417 | B2 | 2/2011 | Bruzzese |
| 7,892,097 | B2 | 2/2011 | Muir et al. |
| 7,909,692 | B2 | 3/2011 | Nguyen et al. |
| 7,909,699 | B2 | 3/2011 | Parrott et al. |
| 7,918,728 | B2 | 4/2011 | Nguyen et al. |
| 7,927,211 | B2 | 4/2011 | Rowe et al. |
| 7,927,212 | B2 | 4/2011 | Hedrick et al. |
| 7,950,996 | B2 | 5/2011 | Nguyen et al. |
| 7,951,008 | B2 | 5/2011 | Wolf et al. |
| 7,954,137 | B2 | 5/2011 | Schuba |
| 7,988,550 | B2 | 8/2011 | White |
| 7,997,972 | B2 | 8/2011 | Nguyen et al. |
| 8,016,666 | B2 | 9/2011 | Angell et al. |
| 8,023,133 | B2 | 9/2011 | Kaneko |
| 8,038,527 | B2 | 10/2011 | Walker et al. |
| 8,057,298 | B2 | 11/2011 | Nguyen et al. |
| 8,057,303 | B2 | 11/2011 | Rasmussen |
| 8,079,904 | B2 | 12/2011 | Griswold |
| 8,087,988 | B2 | 1/2012 | Nguyen et al. |
| 8,096,872 | B2 | 1/2012 | Walker et al. |
| 8,109,821 | B2 | 2/2012 | Kovacs et al. |
| 8,117,608 | B1 | 2/2012 | Slettehaugh et al. |
| 8,118,668 | B2 | 2/2012 | Gagner et al. |
| 8,142,281 | B2 | 3/2012 | Robins et al. |
| 8,144,356 | B2 | 3/2012 | Meyerhofer |
| 8,157,642 | B2 | 4/2012 | Paulsen |
| 8,182,326 | B2 | 5/2012 | Speers et al. |
| 8,192,276 | B2 | 6/2012 | Walker et al. |
| 8,219,129 | B2 | 7/2012 | Brown |
| 8,220,019 | B2 | 7/2012 | Stearns et al. |
| 8,226,459 | B2 | 7/2012 | Barrett |
| 8,226,474 | B2 | 7/2012 | Nguyen et al. |
| 8,231,456 | B2 | 7/2012 | Zielinski |
| 8,235,803 | B2 | 8/2012 | Loose et al. |
| 8,241,127 | B2 | 8/2012 | Kovacs |
| 8,282,465 | B2 | 10/2012 | Giobbi |
| 8,282,475 | B2 | 10/2012 | Nguyen et al. |
| 8,282,490 | B2 | 10/2012 | Arezina |
| 8,286,856 | B2 | 10/2012 | Meyerhofer et al. |
| 8,323,099 | B2 | 12/2012 | Durham et al. |
| 8,337,290 | B2 | 12/2012 | Nguyen et al. |
| 8,393,955 | B2 | 3/2013 | Arezina et al. |
| 8,403,758 | B2 | 3/2013 | Hornik et al. |
| 8,419,548 | B2 | 4/2013 | Gagner |
| 8,461,958 | B2 | 6/2013 | Saenz |
| 8,469,800 | B2 | 6/2013 | Lemay et al. |
| 8,496,530 | B2 | 7/2013 | Dean |
| 8,512,144 | B2 | 8/2013 | Johnson et al. |
| 8,550,903 | B2 | 10/2013 | Lyons |
| 8,597,108 | B2 | 12/2013 | Nguyen |
| 8,597,111 | B2 | 12/2013 | Lemay et al. |
| 8,602,875 | B2 | 12/2013 | Nguyen |
| 8,608,569 | B2 | 12/2013 | Carrico |
| 8,613,655 | B2 | 12/2013 | Kisenwether et al. |
| 8,613,659 | B2 | 12/2013 | Nelson |
| 8,613,668 | B2 | 12/2013 | Nelson et al. |
| 8,621,242 | B2 | 12/2013 | Brown et al. |
| 8,622,836 | B2 | 1/2014 | Nelson et al. |
| 8,721,434 | B2 | 5/2014 | Nelson et al. |
| 8,734,236 | B2 | 5/2014 | Arezina et al. |
| 8,745,417 | B2 | 6/2014 | Huang et al. |
| 8,814,683 | B2 | 8/2014 | Hollander et al. |
| 8,827,813 | B2 | 9/2014 | Lemay et al. |
| 8,827,814 | B2 | 9/2014 | Lemay et al. |
| 8,858,323 | B2 | 10/2014 | Nguyen et al. |
| 8,876,595 | B2 | 11/2014 | Nelson et al. |
| 8,932,140 | B2 | 1/2015 | Gagner et al. |
| 8,956,222 | B2 | 2/2015 | Lemay et al. |
| 8,961,306 | B2 | 2/2015 | Lemay |
| 8,978,868 | B2 | 3/2015 | Johnson et al. |
| 9,011,236 | B2 | 4/2015 | Nelson et al. |
| 9,039,523 | B2 | 5/2015 | Price et al. |
| 9,153,095 | B2 | 10/2015 | Adiraju et al. |
| 9,235,952 | B2 | 1/2016 | Nguyen |
| 9,779,397 | B2 | 10/2017 | Warner et al. |
| 9,875,611 | B2 | 1/2018 | Warner |

(56) References Cited

U.S. PATENT DOCUMENTS 10,223,866 B2 3/2019 Warner et al.
10,706,680 B2 7/2020 Warner
10,916,090 B2 * 2/2021 Miri .................... G07F 17/3211
11,410,499 B2 8/2022 Stephen
12,217,570 B2 * 2/2025 Miri .................... G07F 17/3241
2001/0016516 A1 8/2001 Takatsuka
2001/0039204 A1 11/2001 Tanskanen
2001/0044337 A1 11/2001 Rowe
2002/0002075 A1 1/2002 Rowe
2002/0020603 A1 2/2002 Jones
2002/0042295 A1 4/2002 Walker et al.
2002/0061778 A1 5/2002 Acres
2002/0077182 A1 6/2002 Swanberg
2002/0082070 A1 6/2002 Macke et al.
2002/0087641 A1 7/2002 Levosky
2002/0090986 A1 7/2002 Cote et al.
2002/0094869 A1 7/2002 Harkham
2002/0103027 A1 8/2002 Rowe et al.
2002/0107066 A1 8/2002 Seelig
2002/0111206 A1 8/2002 Van Baltz et al.
2002/0111209 A1 8/2002 Walker
2002/0111210 A1 8/2002 Luciano, Jr. et al.
2002/0111213 A1 8/2002 McEntee et al.
2002/0113369 A1 8/2002 Weingardt
2002/0116615 A1 8/2002 Nguyen et al.
2002/0123381 A1 9/2002 Akeripa
2002/0132666 A1 9/2002 Lind
2002/0133418 A1 9/2002 Hammond et al.
2002/0137217 A1 9/2002 Rowe et al.
2002/0142825 A1 10/2002 Lark et al.
2002/0145035 A1 10/2002 Jones
2002/0147047 A1 10/2002 Letovsky
2002/0147049 A1 10/2002 Carter, Sr.
2002/0151366 A1 10/2002 Walker et al.
2002/0163570 A1 11/2002 Phillips
2002/0167486 A1 11/2002 Tan et al.
2002/0167536 A1 11/2002 Valdes et al.
2002/0169021 A1 11/2002 Urie et al.
2002/0169623 A1 11/2002 Call et al.
2002/0183046 A1 12/2002 Joyce et al.
2002/0183105 A1 12/2002 Cannon et al.
2002/0196342 A1 12/2002 Walker
2003/0001338 A1 1/2003 Bennett et al.
2003/0003988 A1 1/2003 Walker
2003/0003996 A1 1/2003 Nguyen et al.
2003/0008696 A1 1/2003 Abecassis et al.
2003/0008707 A1 1/2003 Walker et al.
2003/0027632 A1 2/2003 Sines
2003/0027635 A1 2/2003 Walker et al.
2003/0032474 A1 2/2003 Kaminkow
2003/0032485 A1 2/2003 Cockerille
2003/0045354 A1 3/2003 Giobbi
2003/0050117 A1 3/2003 Silva et al.
2003/0054868 A1 3/2003 Paulsen et al.
2003/0054881 A1 3/2003 Hedrick
2003/0064805 A1 4/2003 Wells
2003/0064807 A1 4/2003 Walker et al.
2003/0074259 A1 4/2003 Slyman et al.
2003/0083126 A1 5/2003 Paulsen
2003/0083943 A1 5/2003 Adams
2003/0092477 A1 5/2003 Luciano et al.
2003/0092480 A1 5/2003 White et al.
2003/0100361 A1 5/2003 Sharpless et al.
2003/0103965 A1 6/2003 Jung et al.
2003/0104860 A1 6/2003 Cannon et al.
2003/0104865 A1 6/2003 Itkis
2003/0119543 A1 6/2003 Kfoury et al.
2003/0141359 A1 7/2003 Dymovsky
2003/0144052 A1 7/2003 Walker
2003/0148809 A1 8/2003 Nelson
2003/0148812 A1 8/2003 Paulsen
2003/0162588 A1 8/2003 Brosnan et al.
2003/0162591 A1 8/2003 Nguyen et al.
2003/0172037 A1 9/2003 Jung
2003/0172083 A1 9/2003 Goodwin et al.
2003/0186739 A1 10/2003 Paulsen et al.
2003/0199295 A1 10/2003 Vancura
2003/0199321 A1 10/2003 Williams
2003/0203756 A1 10/2003 Jackson
2003/0216174 A1 11/2003 Gauselmann
2003/0224852 A1 12/2003 Walker
2003/0224854 A1 12/2003 Joao
2003/0228900 A1 12/2003 Yamagishi
2004/0002386 A1 1/2004 Wolfe et al.
2004/0005919 A1 1/2004 Walker et al.
2004/0014514 A1 1/2004 Yacenda
2004/0016797 A1 1/2004 Jones
2004/0023709 A1 2/2004 Beaulieu et al.
2004/0023716 A1 2/2004 Gauselmann
2004/0023721 A1 2/2004 Giobbi
2004/0033095 A1 2/2004 Saffari et al.
2004/0038725 A1 2/2004 Kaminkow
2004/0039635 A1 2/2004 Linde
2004/0039702 A1 2/2004 Blair et al.
2004/0040617 A1 3/2004 Dietrich
2004/0043814 A1 3/2004 Angell et al.
2004/0048650 A1 3/2004 Mierau et al.
2004/0082385 A1 4/2004 Silva et al.
2004/0085293 A1 5/2004 Soper
2004/0088250 A1 5/2004 Bartter et al.
2004/0106449 A1 6/2004 Walker et al.
2004/0106454 A1 6/2004 Walker
2004/0118669 A1 6/2004 Mou
2004/0127277 A1 7/2004 Walker
2004/0127290 A1 7/2004 Walker et al.
2004/0129773 A1 7/2004 Lute, Jr.
2004/0137987 A1 7/2004 Nguyen et al.
2004/0140617 A1 7/2004 Cordell
2004/0147308 A1 7/2004 Walker et al.
2004/0147314 A1 7/2004 Lemay
2004/0185935 A1 9/2004 Yamagishi
2004/0190042 A1 9/2004 Ferlitsch et al.
2004/0192434 A1 9/2004 Walker
2004/0199284 A1 10/2004 Hara
2004/0204233 A1 10/2004 Saffari et al.
2004/0209690 A1 10/2004 Bruzzese
2004/0224753 A1 11/2004 Odonovan et al.
2004/0225565 A1 11/2004 Selman
2004/0230527 A1 11/2004 Hansen et al.
2004/0256803 A1 12/2004 Ko
2004/0259633 A1 12/2004 Gentles et al.
2004/0259640 A1 12/2004 Gentles
2004/0266395 A1 12/2004 Pailles
2005/0003890 A1 1/2005 Hedrick et al.
2005/0004980 A1 1/2005 Vadjinia
2005/0014554 A1 1/2005 Walker
2005/0017067 A1 1/2005 Seifert et al.
2005/0020354 A1 1/2005 Nguyen et al.
2005/0026696 A1 2/2005 Hashimoto et al.
2005/0049049 A1 3/2005 Griswold et al.
2005/0054438 A1 3/2005 Rothschild
2005/0059485 A1 3/2005 Paulsen
2005/0070257 A1 3/2005 Saarinen
2005/0076242 A1 4/2005 Breuer
2005/0101376 A1 5/2005 Walker et al.
2005/0101383 A1 5/2005 Wells
2005/0130728 A1 6/2005 Nguyen
2005/0173220 A1 8/2005 Liu et al.
2005/0181870 A1 8/2005 Nguyen et al.
2005/0187020 A1 8/2005 Amaitis et al.
2005/0202875 A1 9/2005 Murphy et al.
2005/0209002 A1 9/2005 Blythe et al.
2005/0223219 A1 10/2005 Gatto et al.
2005/0227770 A1 10/2005 Papulov
2005/0240484 A1 10/2005 Yan
2005/0255911 A1 11/2005 Nguyen et al.
2005/0273635 A1 12/2005 Wilcox et al.
2005/0277471 A1 12/2005 Russell et al.
2005/0282637 A1 12/2005 Gatto et al.
2005/0287852 A1 12/2005 Sugawara
2006/0009283 A1 1/2006 Englman et al.
2006/0018450 A1 1/2006 Sandberg-Diment
2006/0025206 A1 2/2006 Walker
2006/0025222 A1 2/2006 Sekine

(56) References Cited

U.S. PATENT DOCUMENTS

| | | | |
|---|---|---|---|
| 2006/0035707 | A1 | 2/2006 | Nguyen |
| 2006/0040741 | A1 | 2/2006 | Griswold |
| 2006/0046822 | A1 | 3/2006 | Kaminkow et al. |
| 2006/0046823 | A1 | 3/2006 | Kaminkow |
| 2006/0046830 | A1 | 3/2006 | Webb |
| 2006/0046834 | A1 | 3/2006 | Sekine |
| 2006/0046842 | A1 | 3/2006 | Mattice |
| 2006/0046849 | A1 | 3/2006 | Kovacs |
| 2006/0046855 | A1 | 3/2006 | Nguyen et al. |
| 2006/0049624 | A1 | 3/2006 | Brosnan et al. |
| 2006/0064372 | A1 | 3/2006 | Gupta |
| 2006/0068893 | A1 | 3/2006 | Jaffe et al. |
| 2006/0068897 | A1 | 3/2006 | Sanford et al. |
| 2006/0073869 | A1 | 4/2006 | LeMay et al. |
| 2006/0073897 | A1 | 4/2006 | Englman et al. |
| 2006/0079317 | A1 | 4/2006 | Flemming et al. |
| 2006/0079333 | A1 | 4/2006 | Morrow |
| 2006/0089174 | A1 | 4/2006 | Twerdahl |
| 2006/0118382 | A1 | 6/2006 | Yoshioka |
| 2006/0148551 | A1 | 7/2006 | Walker et al. |
| 2006/0149846 | A1 | 7/2006 | Schuba |
| 2006/0160621 | A1 | 7/2006 | Rowe et al. |
| 2006/0165060 | A1 | 7/2006 | Dua |
| 2006/0166732 | A1 | 7/2006 | Lechner et al. |
| 2006/0166741 | A1 | 7/2006 | Boyd et al. |
| 2006/0173781 | A1 | 8/2006 | Donner |
| 2006/0189382 | A1 | 8/2006 | Muir |
| 2006/0217170 | A1 | 9/2006 | Roireau |
| 2006/0217193 | A1 | 9/2006 | Walker et al. |
| 2006/0223627 | A1 | 10/2006 | Nozaki |
| 2006/0226598 | A1 | 10/2006 | Walker |
| 2006/0246981 | A1 | 11/2006 | Walker et al. |
| 2006/0247028 | A1 | 11/2006 | Brosnan et al. |
| 2006/0247035 | A1 | 11/2006 | Rowe et al. |
| 2006/0247037 | A1 | 11/2006 | Park |
| 2006/0252530 | A1 | 11/2006 | Oberberger et al. |
| 2006/0253481 | A1 | 11/2006 | Guido et al. |
| 2006/0258439 | A1 | 11/2006 | White |
| 2006/0266598 | A1 | 11/2006 | Baumgartner et al. |
| 2006/0271433 | A1 | 11/2006 | Hughes |
| 2006/0279781 | A1 | 12/2006 | Kaneko |
| 2006/0281525 | A1 | 12/2006 | Borissov |
| 2006/0281541 | A1 | 12/2006 | Nguyen et al. |
| 2006/0281554 | A1 | 12/2006 | Gatto et al. |
| 2006/0287072 | A1 | 12/2006 | Walker |
| 2006/0287098 | A1 | 12/2006 | Morrow et al. |
| 2006/0287106 | A1 | 12/2006 | Jensen |
| 2007/0004510 | A1 | 1/2007 | Underdahl et al. |
| 2007/0017979 | A1 | 1/2007 | Wu et al. |
| 2007/0021198 | A1 | 1/2007 | Muir |
| 2007/0026935 | A1 | 2/2007 | Wolf et al. |
| 2007/0054739 | A1 | 3/2007 | Amaitis et al. |
| 2007/0060254 | A1 | 3/2007 | Muir |
| 2007/0060302 | A1 | 3/2007 | Fabbri |
| 2007/0060306 | A1 | 3/2007 | Amaitis et al. |
| 2007/0060319 | A1 | 3/2007 | Block et al. |
| 2007/0060358 | A1 | 3/2007 | Amaitas et al. |
| 2007/0060372 | A1 | 3/2007 | Yamagishi |
| 2007/0077981 | A1 | 4/2007 | Hungate et al. |
| 2007/0087833 | A1 | 4/2007 | Feeney et al. |
| 2007/0087834 | A1 | 4/2007 | Moser et al. |
| 2007/0117608 | A1 | 5/2007 | Roper et al. |
| 2007/0117623 | A1 | 5/2007 | Nelson |
| 2007/0129123 | A1 | 6/2007 | Eryou et al. |
| 2007/0129150 | A1 | 6/2007 | Crowder et al. |
| 2007/0129151 | A1 | 6/2007 | Crowder et al. |
| 2007/0149279 | A1 | 6/2007 | Norden et al. |
| 2007/0149286 | A1 | 6/2007 | Bemmel |
| 2007/0155469 | A1 | 7/2007 | Johnson |
| 2007/0159301 | A1 | 7/2007 | Hirt |
| 2007/0161402 | A1 | 7/2007 | Ng et al. |
| 2007/0174809 | A1 | 7/2007 | Brown |
| 2007/0184904 | A1 | 8/2007 | Lee |
| 2007/0190494 | A1 | 8/2007 | Rosenberg |
| 2007/0191109 | A1 | 8/2007 | Crowder et al. |
| 2007/0197247 | A1 | 8/2007 | Inselberg |
| 2007/0202941 | A1 | 8/2007 | Miltenberger et al. |
| 2007/0207852 | A1 | 9/2007 | Nelson et al. |
| 2007/0207854 | A1 | 9/2007 | Wolf et al. |
| 2007/0218971 | A1 | 9/2007 | Berube |
| 2007/0218985 | A1 | 9/2007 | Okada |
| 2007/0218991 | A1 | 9/2007 | Okada |
| 2007/0238505 | A1 | 10/2007 | Okada |
| 2007/0241187 | A1 | 10/2007 | Alderucci et al. |
| 2007/0243928 | A1 | 10/2007 | Iddings |
| 2007/0248036 | A1 | 10/2007 | Nevalainen |
| 2007/0257430 | A1 | 11/2007 | Hardy et al. |
| 2007/0259713 | A1 | 11/2007 | Fiden et al. |
| 2007/0259717 | A1 | 11/2007 | Mattice et al. |
| 2007/0267488 | A1 | 11/2007 | Chang |
| 2007/0270213 | A1 | 11/2007 | Nguyen et al. |
| 2007/0275777 | A1 | 11/2007 | Walker et al. |
| 2007/0275779 | A1 | 11/2007 | Amaitis et al. |
| 2007/0281782 | A1 | 12/2007 | Amaitis et al. |
| 2007/0281785 | A1 | 12/2007 | Amaitas et al. |
| 2007/0298873 | A1 | 12/2007 | Nguyen et al. |
| 2008/0011832 | A1 | 1/2008 | Chang |
| 2008/0015032 | A1 | 1/2008 | Bradford |
| 2008/0020824 | A1 | 1/2008 | Cuddy et al. |
| 2008/0026816 | A1 | 1/2008 | Sammon |
| 2008/0026823 | A1 | 1/2008 | Wolf et al. |
| 2008/0026844 | A1 | 1/2008 | Wells |
| 2008/0032787 | A1 | 2/2008 | Low et al. |
| 2008/0070652 | A1 | 3/2008 | Nguyen et al. |
| 2008/0070671 | A1 | 3/2008 | Okada |
| 2008/0070681 | A1 | 3/2008 | Marks et al. |
| 2008/0076506 | A1 | 3/2008 | Nguyen et al. |
| 2008/0076528 | A1 | 3/2008 | Nguyen et al. |
| 2008/0076548 | A1 | 3/2008 | Paulsen |
| 2008/0076572 | A1 | 3/2008 | Nguyen et al. |
| 2008/0085753 | A1 | 4/2008 | Okada |
| 2008/0096650 | A1 | 4/2008 | Baerlocher |
| 2008/0102956 | A1 | 5/2008 | Burman et al. |
| 2008/0102957 | A1 | 5/2008 | Burman et al. |
| 2008/0113772 | A1 | 5/2008 | Burrill et al. |
| 2008/0119267 | A1 | 5/2008 | Denlay |
| 2008/0139306 | A1 | 6/2008 | Lutnick |
| 2008/0146321 | A1 | 6/2008 | Parente |
| 2008/0150902 | A1 | 6/2008 | Edpalm et al. |
| 2008/0153583 | A1 | 6/2008 | Huntley et al. |
| 2008/0161110 | A1 | 7/2008 | Campbell |
| 2008/0166997 | A1 | 7/2008 | Sun et al. |
| 2008/0167106 | A1 | 7/2008 | Lutnick et al. |
| 2008/0182644 | A1 | 7/2008 | Lutnick et al. |
| 2008/0182667 | A1 | 7/2008 | Davis et al. |
| 2008/0200240 | A1 | 8/2008 | Saltiel et al. |
| 2008/0200251 | A1 | 8/2008 | Alderucci et al. |
| 2008/0207296 | A1 | 8/2008 | Lutnick et al. |
| 2008/0207307 | A1 | 8/2008 | Cunninghamm, II et al. |
| 2008/0213026 | A1 | 9/2008 | Grabiec |
| 2008/0214258 | A1 | 9/2008 | Brosnan et al. |
| 2008/0220878 | A1 | 9/2008 | Michaelis |
| 2008/0234028 | A1 | 9/2008 | Meyer et al. |
| 2008/0234047 | A1 | 9/2008 | Nguyen |
| 2008/0238610 | A1 | 10/2008 | Rosenberg |
| 2008/0254878 | A1 | 10/2008 | Saunders et al. |
| 2008/0254881 | A1 | 10/2008 | Lutnick et al. |
| 2008/0254883 | A1 | 10/2008 | Patel et al. |
| 2008/0254891 | A1 | 10/2008 | Saunders et al. |
| 2008/0254892 | A1 | 10/2008 | Saunders et al. |
| 2008/0254897 | A1 | 10/2008 | Saunders et al. |
| 2008/0261682 | A1 | 10/2008 | Phillips |
| 2008/0263173 | A1 | 10/2008 | Weber et al. |
| 2008/0268934 | A1 | 10/2008 | Mattice et al. |
| 2008/0270302 | A1 | 10/2008 | Beenau et al. |
| 2008/0293483 | A1 | 11/2008 | Pickus |
| 2008/0300047 | A1 | 12/2008 | Nagano |
| 2008/0300058 | A1 | 12/2008 | Sum et al. |
| 2008/0300061 | A1 | 12/2008 | Zheng |
| 2008/0305860 | A1 | 12/2008 | Linner |
| 2008/0305862 | A1 | 12/2008 | Walker et al. |
| 2008/0305864 | A1 | 12/2008 | Kelly et al. |
| 2008/0305865 | A1 | 12/2008 | Kelly et al. |
| 2008/0305866 | A1 | 12/2008 | Kelly et al. |

(56) References Cited

U.S. PATENT DOCUMENTS

| | | | |
|---|---|---|---|
| 2008/0305873 | A1 | 12/2008 | Zheng |
| 2008/0311971 | A1 | 12/2008 | Dean |
| 2008/0311994 | A1 | 12/2008 | Amaitas et al. |
| 2008/0318655 | A1 | 12/2008 | Davies |
| 2008/0318669 | A1 | 12/2008 | Buchholz |
| 2008/0318686 | A1 | 12/2008 | Crowder et al. |
| 2009/0005165 | A1 | 1/2009 | Arezina et al. |
| 2009/0011821 | A1 | 1/2009 | Griswold |
| 2009/0011822 | A1 | 1/2009 | Englman |
| 2009/0023490 | A1 | 1/2009 | Moshal |
| 2009/0029766 | A1 | 1/2009 | Lutnick et al. |
| 2009/0054149 | A1 | 2/2009 | Brosnan et al. |
| 2009/0077396 | A1 | 3/2009 | Tsai et al. |
| 2009/0088258 | A1 | 4/2009 | Saunders et al. |
| 2009/0098925 | A1 | 4/2009 | Gagner et al. |
| 2009/0098943 | A1 | 4/2009 | Weber et al. |
| 2009/0104977 | A1 | 4/2009 | Zielinski |
| 2009/0104983 | A1 | 4/2009 | Okada |
| 2009/0118013 | A1 | 5/2009 | Finnimore et al. |
| 2009/0118022 | A1 | 5/2009 | Lyons et al. |
| 2009/0124350 | A1 | 5/2009 | Iddings et al. |
| 2009/0124366 | A1 | 5/2009 | Aoki et al. |
| 2009/0124376 | A1 | 5/2009 | Kelly et al. |
| 2009/0125429 | A1 | 5/2009 | Takayama |
| 2009/0131134 | A1 | 5/2009 | Baerlocher et al. |
| 2009/0131146 | A1 | 5/2009 | Arezina et al. |
| 2009/0131151 | A1 | 5/2009 | Harris et al. |
| 2009/0132163 | A1 | 5/2009 | Ashley et al. |
| 2009/0137255 | A1 | 5/2009 | Ashley et al. |
| 2009/0138133 | A1 | 5/2009 | Buchholz et al. |
| 2009/0149245 | A1 | 6/2009 | Fabbri |
| 2009/0149261 | A1 | 6/2009 | Chen et al. |
| 2009/0153342 | A1 | 6/2009 | Thorn |
| 2009/0156303 | A1 | 6/2009 | Kiely et al. |
| 2009/0158400 | A1 | 6/2009 | Miyake |
| 2009/0176578 | A1 | 7/2009 | Herrmann et al. |
| 2009/0186680 | A1 | 7/2009 | Napolitano |
| 2009/0191962 | A1 | 7/2009 | Hardy et al. |
| 2009/0197684 | A1 | 8/2009 | Arezina |
| 2009/0216547 | A1 | 8/2009 | Canora et al. |
| 2009/0219901 | A1 | 9/2009 | Bull et al. |
| 2009/0221342 | A1 | 9/2009 | Katz et al. |
| 2009/0227302 | A1 | 9/2009 | Abe |
| 2009/0227317 | A1 | 9/2009 | Spangler |
| 2009/0233715 | A1 | 9/2009 | Ergen |
| 2009/0239666 | A1 | 9/2009 | Hall et al. |
| 2009/0264190 | A1 | 10/2009 | Davis et al. |
| 2009/0275397 | A1 | 11/2009 | Van Baltz et al. |
| 2009/0275410 | A1 | 11/2009 | Kisenwether et al. |
| 2009/0275411 | A1 | 11/2009 | Kisenwether et al. |
| 2009/0298468 | A1 | 12/2009 | Hsu |
| 2009/0313084 | A1 | 12/2009 | Chugh |
| 2009/0328144 | A1 | 12/2009 | Sherlock et al. |
| 2010/0002897 | A1 | 1/2010 | Keady |
| 2010/0004058 | A1 | 1/2010 | Acres |
| 2010/0012715 | A1 | 1/2010 | Williams |
| 2010/0016075 | A1 | 1/2010 | Thomas |
| 2010/0029376 | A1 | 2/2010 | Hardy et al. |
| 2010/0036758 | A1 | 2/2010 | Monk |
| 2010/0048291 | A1 | 2/2010 | Warkentin |
| 2010/0048297 | A1 | 2/2010 | Dasgupta |
| 2010/0056248 | A1 | 3/2010 | Acres |
| 2010/0062833 | A1 | 3/2010 | Mattice et al. |
| 2010/0062840 | A1 | 3/2010 | Herrmann |
| 2010/0069160 | A1 | 3/2010 | Barrett |
| 2010/0079237 | A1 | 4/2010 | Falk |
| 2010/0081501 | A1 | 4/2010 | Carpenter et al. |
| 2010/0087241 | A1 | 4/2010 | Nguyen |
| 2010/0087249 | A1 | 4/2010 | Rowe |
| 2010/0093421 | A1 | 4/2010 | Nyman |
| 2010/0093429 | A1 | 4/2010 | Mattice |
| 2010/0094734 | A1 | 4/2010 | Wang |
| 2010/0099499 | A1 | 4/2010 | Amaitis et al. |
| 2010/0113061 | A1 | 5/2010 | Holcman |
| 2010/0113161 | A1 | 5/2010 | Walker |
| 2010/0124967 | A1 | 5/2010 | Lutnick et al. |
| 2010/0130276 | A1 | 5/2010 | Fiden |
| 2010/0155462 | A1 | 6/2010 | Morrison et al. |
| 2010/0160043 | A1 | 6/2010 | Fujimoto et al. |
| 2010/0169514 | A1 | 7/2010 | Noguchi et al. |
| 2010/0173691 | A1 | 7/2010 | Wolfe |
| 2010/0174650 | A1 | 7/2010 | Nonaka |
| 2010/0178977 | A1 | 7/2010 | Kim et al. |
| 2010/0178986 | A1 | 7/2010 | Davis et al. |
| 2010/0197383 | A1 | 8/2010 | Rad et al. |
| 2010/0203955 | A1 | 8/2010 | Sylla |
| 2010/0203963 | A1 | 8/2010 | Allen |
| 2010/0219234 | A1 | 9/2010 | Forbes |
| 2010/0222100 | A1 | 9/2010 | Dragt |
| 2010/0225653 | A1 | 9/2010 | Sao et al. |
| 2010/0227662 | A1 | 9/2010 | Speers et al. |
| 2010/0227670 | A1 | 9/2010 | Arezina et al. |
| 2010/0227687 | A1 | 9/2010 | Speers et al. |
| 2010/0234091 | A1 | 9/2010 | Baerlocher et al. |
| 2010/0234099 | A1 | 9/2010 | Rasmussen |
| 2010/0250787 | A1 | 9/2010 | Miyata |
| 2010/0279764 | A1 | 11/2010 | Allen et al. |
| 2010/0304848 | A1 | 12/2010 | Detlefsen |
| 2010/0323780 | A1 | 12/2010 | Acres |
| 2010/0323785 | A1 | 12/2010 | Motyl |
| 2010/0323789 | A1 | 12/2010 | Gabriele |
| 2010/0325703 | A1 | 12/2010 | Etchegoyen |
| 2010/0331079 | A1 | 12/2010 | Bytnar |
| 2011/0009181 | A1 | 1/2011 | Speers et al. |
| 2011/0015976 | A1 | 1/2011 | Lempel et al. |
| 2011/0028199 | A1 | 2/2011 | Luciano et al. |
| 2011/0035319 | A1 | 2/2011 | Brand et al. |
| 2011/0039615 | A1 | 2/2011 | Acres |
| 2011/0057028 | A1 | 3/2011 | Schwartz |
| 2011/0065492 | A1 | 3/2011 | Acres |
| 2011/0065496 | A1 | 3/2011 | Gagner et al. |
| 2011/0065497 | A1 | 3/2011 | Patterson, Jr. |
| 2011/0070940 | A1 | 3/2011 | Jaffe |
| 2011/0076963 | A1 | 3/2011 | Hatano |
| 2011/0086691 | A1 | 4/2011 | Luciano et al. |
| 2011/0086696 | A1 | 4/2011 | Macewan |
| 2011/0093723 | A1 | 4/2011 | Brown et al. |
| 2011/0098104 | A1 | 4/2011 | Meyerhofer |
| 2011/0111827 | A1 | 5/2011 | Nicely et al. |
| 2011/0111843 | A1 | 5/2011 | Nicely et al. |
| 2011/0111860 | A1 | 5/2011 | Nguyen |
| 2011/0118008 | A1 | 5/2011 | Taylor |
| 2011/0118010 | A1 | 5/2011 | Brune |
| 2011/0119098 | A1 | 5/2011 | Miller |
| 2011/0136576 | A1 | 6/2011 | Kammler et al. |
| 2011/0159966 | A1 | 6/2011 | Gura et al. |
| 2011/0166989 | A1 | 7/2011 | Ross et al. |
| 2011/0207531 | A1 | 8/2011 | Gagner |
| 2011/0208418 | A1 | 8/2011 | Looney et al. |
| 2011/0212711 | A1 | 9/2011 | Scott |
| 2011/0223993 | A1 | 9/2011 | Allen et al. |
| 2011/0242565 | A1 | 10/2011 | Armstrong |
| 2011/0263318 | A1 | 10/2011 | Agarwal et al. |
| 2011/0263325 | A1 | 10/2011 | Atkinson |
| 2011/0275428 | A1 | 11/2011 | Forman et al. |
| 2011/0287823 | A1 | 11/2011 | Guinn et al. |
| 2011/0295668 | A1 | 12/2011 | Charania |
| 2011/0306400 | A1 | 12/2011 | Nguyen |
| 2011/0306401 | A1 | 12/2011 | Nguyen |
| 2011/0306426 | A1 | 12/2011 | Novak et al. |
| 2011/0307318 | A1 | 12/2011 | Laporte et al. |
| 2011/0314153 | A1 | 12/2011 | Bathiche |
| 2012/0015709 | A1 | 1/2012 | Bennett et al. |
| 2012/0015735 | A1 | 1/2012 | Abouchar |
| 2012/0028703 | A1 | 2/2012 | Anderson et al. |
| 2012/0028718 | A1 | 2/2012 | Barclay et al. |
| 2012/0034968 | A1 | 2/2012 | Watkins et al. |
| 2012/0046110 | A1 | 2/2012 | Amaitis |
| 2012/0047008 | A1 | 2/2012 | Alhadeff et al. |
| 2012/0049455 | A1 | 3/2012 | Yap |
| 2012/0066048 | A1 | 3/2012 | Foust et al. |
| 2012/0067944 | A1 | 3/2012 | Ross |
| 2012/0072111 | A1 | 3/2012 | Davis |
| 2012/0084131 | A1 | 4/2012 | Bergel et al. |

(56) References Cited

U.S. PATENT DOCUMENTS

| | | | |
|---|---|---|---|
| 2012/0094757 | A1 | 4/2012 | Vago |
| 2012/0094769 | A1 | 4/2012 | Nguyen et al. |
| 2012/0108319 | A1 | 5/2012 | Caputo et al. |
| 2012/0115593 | A1 | 5/2012 | Vann et al. |
| 2012/0122567 | A1 | 5/2012 | Gangadharan et al. |
| 2012/0122584 | A1 | 5/2012 | Nguyen |
| 2012/0122585 | A1 | 5/2012 | Nguyen |
| 2012/0122590 | A1 | 5/2012 | Nguyen |
| 2012/0129586 | A1 | 5/2012 | Lutnick |
| 2012/0129611 | A1 | 5/2012 | Rasmussen |
| 2012/0149561 | A1 | 6/2012 | Ribi et al. |
| 2012/0172130 | A1 | 7/2012 | Acres |
| 2012/0184363 | A1 | 7/2012 | Barclay et al. |
| 2012/0187187 | A1 | 7/2012 | Duff |
| 2012/0190426 | A1 | 7/2012 | Acres |
| 2012/0190455 | A1 | 7/2012 | Briggs |
| 2012/0194448 | A1 | 8/2012 | Rothkopf |
| 2012/0208618 | A1 | 8/2012 | Frerking |
| 2012/0208627 | A1 | 8/2012 | Kitakaze et al. |
| 2012/0221474 | A1 | 8/2012 | Eicher et al. |
| 2012/0239552 | A1 | 9/2012 | Harycki |
| 2012/0252556 | A1 | 10/2012 | Doyle et al. |
| 2012/0265681 | A1 | 10/2012 | Ross |
| 2012/0276990 | A1 | 11/2012 | Arezina |
| 2012/0290336 | A1 | 11/2012 | Rosenblatt |
| 2012/0296174 | A1 | 11/2012 | McCombie |
| 2012/0300753 | A1 | 11/2012 | Brown |
| 2012/0311322 | A1 | 12/2012 | Koyun |
| 2012/0315984 | A1 | 12/2012 | Carrico et al. |
| 2012/0322563 | A1 | 12/2012 | Nguyen et al. |
| 2012/0324135 | A1 | 12/2012 | Goodman |
| 2012/0330740 | A1 | 12/2012 | Pennington et al. |
| 2013/0005433 | A1 | 1/2013 | Holch |
| 2013/0005453 | A1 | 1/2013 | Nguyen et al. |
| 2013/0013389 | A1 | 1/2013 | Vitti et al. |
| 2013/0017877 | A1 | 1/2013 | Dahl |
| 2013/0017884 | A1 | 1/2013 | Price |
| 2013/0023339 | A1 | 1/2013 | Davis |
| 2013/0053133 | A1 | 2/2013 | Schueller |
| 2013/0053136 | A1 | 2/2013 | Lemay et al. |
| 2013/0053148 | A1 | 2/2013 | Nelson et al. |
| 2013/0059650 | A1 | 3/2013 | Sylla et al. |
| 2013/0065667 | A1 | 3/2013 | Nelson et al. |
| 2013/0065668 | A1 | 3/2013 | Lemay et al. |
| 2013/0065678 | A1 | 3/2013 | Nelson et al. |
| 2013/0065686 | A1 | 3/2013 | Lemay et al. |
| 2013/0085943 | A1 | 4/2013 | Takeda et al. |
| 2013/0090155 | A1 | 4/2013 | Johnson |
| 2013/0104193 | A1 | 4/2013 | Gatto et al. |
| 2013/0124413 | A1 | 5/2013 | Itwaru |
| 2013/0130777 | A1 | 5/2013 | Lemay et al. |
| 2013/0130778 | A1 | 5/2013 | Anderson et al. |
| 2013/0132745 | A1 | 5/2013 | Schoening et al. |
| 2013/0137509 | A1 | 5/2013 | Weber et al. |
| 2013/0137510 | A1 | 5/2013 | Weber et al. |
| 2013/0137516 | A1 | 5/2013 | Griswold et al. |
| 2013/0165199 | A1 | 6/2013 | Lemay |
| 2013/0165208 | A1 | 6/2013 | Nelson |
| 2013/0165209 | A1 | 6/2013 | Lemay |
| 2013/0165210 | A1 | 6/2013 | Nelson |
| 2013/0165231 | A1 | 6/2013 | Nelson |
| 2013/0165232 | A1 | 6/2013 | Nelson |
| 2013/0190077 | A1 | 7/2013 | Arezina et al. |
| 2013/0196747 | A1 | 8/2013 | Nguyen |
| 2013/0196755 | A1 | 8/2013 | Nelson |
| 2013/0196776 | A1 | 8/2013 | Nguyen |
| 2013/0210513 | A1 | 8/2013 | Nguyen |
| 2013/0210514 | A1 | 8/2013 | Nguyen |
| 2013/0210530 | A1 | 8/2013 | Nguyen |
| 2013/0225279 | A1 | 8/2013 | Patceg et al. |
| 2013/0244772 | A1 | 9/2013 | Weber |
| 2013/0252713 | A1 | 9/2013 | Nelson |
| 2013/0260889 | A1 | 10/2013 | Lemay et al. |
| 2013/0275314 | A1 | 10/2013 | Bowles |
| 2013/0299574 | A1 | 11/2013 | Theobald |
| 2013/0316808 | A1 | 11/2013 | Nelson |
| 2013/0317987 | A1 | 11/2013 | Tsutsui |
| 2013/0324237 | A1 | 12/2013 | Adiraju et al. |
| 2013/0337890 | A1 | 12/2013 | Earley et al. |
| 2013/0344942 | A1 | 12/2013 | Price et al. |
| 2014/0006129 | A1 | 1/2014 | Heath |
| 2014/0018153 | A1 | 1/2014 | Nelson et al. |
| 2014/0045586 | A1 | 2/2014 | Allen et al. |
| 2014/0057703 | A1 | 2/2014 | LeStrange |
| 2014/0057716 | A1 | 2/2014 | Massing et al. |
| 2014/0080578 | A1 | 3/2014 | Nguyen |
| 2014/0087865 | A1 | 3/2014 | Carrico et al. |
| 2014/0094273 | A1 | 4/2014 | Nguyen |
| 2014/0094295 | A1 | 4/2014 | Nguyen |
| 2014/0121005 | A1 | 5/2014 | Nelson et al. |
| 2014/0179431 | A1 | 6/2014 | Nguyen |
| 2014/0200065 | A1 | 7/2014 | Anderson |
| 2014/0221099 | A1 | 8/2014 | Johnson |
| 2014/0248941 | A1 | 9/2014 | Nelson et al. |
| 2014/0274306 | A1 | 9/2014 | Crawford, III |
| 2014/0274309 | A1 | 9/2014 | Nguyen |
| 2014/0274319 | A1 | 9/2014 | Nguyen |
| 2014/0274320 | A1 | 9/2014 | Nguyen |
| 2014/0274342 | A1 | 9/2014 | Nguyen |
| 2014/0274357 | A1 | 9/2014 | Nguyen |
| 2014/0274360 | A1 | 9/2014 | Nguyen |
| 2014/0274367 | A1 | 9/2014 | Nguyen |
| 2014/0274388 | A1 | 9/2014 | Nguyen |
| 2014/0323206 | A1 | 10/2014 | Gagner et al. |
| 2014/0357353 | A1 | 12/2014 | Popovich |
| 2015/0012305 | A1 | 1/2015 | Truskovsky |
| 2015/0065231 | A1 | 3/2015 | Anderson et al. |
| 2015/0072762 | A1 | 3/2015 | Curtin |
| 2015/0087408 | A1 | 3/2015 | Siemasko et al. |
| 2015/0089595 | A1 | 3/2015 | Telles |
| 2015/0133223 | A1 | 5/2015 | Carter |
| 2015/0170473 | A1 | 6/2015 | Hematji et al. |
| 2015/0187158 | A1 | 7/2015 | Johnson et al. |
| 2015/0187177 | A1 | 7/2015 | Warner et al. |
| 2015/0243133 | A1 | 8/2015 | Nicholas |
| 2015/0279158 | A1 | 10/2015 | Sanford et al. |
| 2015/0319613 | A1 | 11/2015 | Shmilov |
| 2016/0019746 | A1 | 1/2016 | Lyons et al. |
| 2016/0071373 | A1 | 3/2016 | Anderson et al. |
| 2016/0093166 | A1 | 3/2016 | Panambur et al. |
| 2017/0024738 | A1 | 1/2017 | Vaidyanathan |
| 2017/0092054 | A1 | 3/2017 | Petersen et al. |
| 2021/0275929 | A1 | 9/2021 | Warner |
| 2022/0254227 | A1 | 8/2022 | Warner |

FOREIGN PATENT DOCUMENTS

| | | |
|---|---|---|
| EP | 1895483 | 3/2008 |
| GB | 2033638 | 5/1980 |
| GB | 2062923 | 5/1981 |
| GB | 2096376 | 10/1982 |
| GB | 2097570 | 11/1982 |
| GB | 2335524 | 9/1999 |
| JP | 2001-243376 | 9/2001 |
| JP | 2002-123619 | 4/2002 |
| JP | 2007-082934 | 4/2007 |
| JP | 2007-141055 | 6/2007 |
| JP | 2007-328388 | 12/2007 |
| JP | 2008-027117 | 7/2008 |
| JP | 2008-171203 | 7/2008 |
| JP | 2008-228848 | 10/2008 |
| JP | 2008-287446 | 11/2008 |
| JP | 2009-015829 | 1/2009 |
| JP | 2009-048376 | 3/2009 |
| JP | 2009-258799 | 11/2009 |
| JP | 2010-009161 | 1/2010 |
| PH | 1-2005-000454 | 5/2007 |
| RU | 95103479 | 3/1995 |
| RU | 2161821 | 7/2008 |
| WO | WO 02/22223 | 3/2002 |
| WO | WO 2005/073933 | 8/2005 |
| WO | WO 2007/142980 | 12/2007 |
| WO | WO 2008/027621 | 3/2008 |
| WO | WO 2009/026309 | 2/2009 |

(56) References Cited

FOREIGN PATENT DOCUMENTS

| | | |
|---|---|---|
| WO | WO 2009/026320 | 2/2009 |
| WO | WO 2009/062148 | 5/2009 |
| WO | WO 2010/017252 | 2/2010 |
| WO | WO 2012/112602 | 8/2012 |

OTHER PUBLICATIONS

EZ Pay® Ticketing Advertisement, written by IGT, published in 2013 (1 page).
IGT Advantage® sb NexGen® II Advertisement, written by IGT, published in 2010 (2 pages).
"JCM Global, Techfirm Inc. and NRT Technology Corp. to Present First Fully Integrated NFC-Based Interactive Mobile Wager Network That Connects Player, Mobile Wager Wallet, QuickJack™ ATM and Gaming Device" online article published Oct. 1, 2012, retrieved from http://finance.yahoo.com/news/jcm-global-techfirm-inc-nrt-150000276.html (5 pages).
Australian Examination Report No. 1 for Application No. 2022241468 dated Oct. 20, 2023 (5 pages).
Australian Examination Report No. 1 for Application No. 2017210629 dated Sep. 27, 2021 (7 pages).

* cited by examiner

1000

SYSTEM AND METHOD FOR TRANSFERRING FUNDS FROM A FINANCIAL INSTITUTION DEVICE TO A CASHLESS WAGERING ACCOUNT ACCESSIBLE VIA A MOBILE DEVICE

PRIORITY CLAIM

This application is a continuation of, claims priority to and the benefit of U.S. patent application Ser. No. 17/158,565, filed on Jan. 26, 2021, which is a continuation of, claims priority to and the benefit of U.S. patent application Ser. No. 15/244,857, filed on Aug. 23, 2016, the entire contents of which are each incorporated by reference herein.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Gaming machines which provide players awards for obtaining winning symbol combinations in plays of primary or base games are well known. Such gaming machines generally require the player to place or make a primary or base wager to activate the primary or base game.

For many players, prior to funding such primary or base wagers, the player visits an automated teller machine which dispenses an amount of cash that is either withdrawn from a financial institution account (if a banking debit card is inserted or swiped into a card reader of the automated teller machine) or advanced from a credit account (if a credit card is inserted or swiped into a card reader of the automated teller machine). Following receipt of the amount of cash from the automated teller machine, these players deposit some or all of the received amount of cash into a gaming machine. The gaming machine proceeds to convert the received amount of cash to a quantity of credits of a credit balance and enable the player to wager such credits on one or more plays of one or more primary or base games.

To fund such primary or base wagers, many of these gaming machines additionally or alternatively receive a ticket voucher (i.e., a bearer instrument redeemable for cash or game play on a gaming machine) from a player, establish a quantity of credits of a credit balance based on the received ticket voucher and enable a player to wager such credits on one or more plays of one or more primary or base games.

To fund such primary or base wagers, many of these gaming machines additionally or alternatively receive a quantity of credits applied utilizing a player account card, such as a player tracking card associated with a player account. For these gaming machines, a player deposits cash or uses a credit card or debit card at a kiosk or player services desk to establish a balance in their player account. A quantity of credits associated with the established balance of the player's account are redeemable at the gaming machine upon the player accessing their player account. The redeemed quantity of credits are then available for the player to utilize on one or more plays of one or more primary or base games.

To fund such primary or base wagers, it has been proposed that many of these gaming machines may additionally or alternatively receive a quantity of credits via an electronic fund transfer, utilizing credit cards and/or debit cards. Such proposed gaming machines enable the player to receive funds directly at the gaming machine via an electronic fund transfer facilitated by a credit card and/or a debit card processed at the gaming machine. Following receipt of such funds, a quantity of credits associated with the received funds are available for the player to utilize on one or more plays of one or more primary or base games.

To fund such primary or base wagers, many of these gaming machines additionally or alternatively receive a quantity of promotional credits applied utilizing a player tracking card. For certain of these gaming machines, after a player has redeemed a promotional ticket at a kiosk or player services desk, the quantity of promotional credits associated with the promotional ticket are transferred to the player's account and subsequently redeemed at the gaming machine upon the player accessing their player account. For certain of these gaming machines, after a player has earned a quantity of promotional credits, such as after a player has converted a quantity of player tracking points to promotional credits, the quantity of earned or converted promotional credits are transferred to the player's account and subsequently redeemed at the gaming machine upon the player accessing their player account. The redeemed quantity of promotional credits are then available for the player to utilize on one or more plays of one or more primary or base games. These promotional tickets are typically mailed or otherwise provided to a player by a gaming establishment to reward the player with an amount of free play and/or to encourage the player to try out a new game.

In addition to receiving cash, ticket vouchers, promotional tickets and/or promotional funds in association with a bonusing or promotions system to establish a credit balance to wager from, many known gaming machines utilizes ticket vouchers when a player wishes to leave the gaming machine and has credits remaining on the gaming machine. Specifically, such gaming machines convert the credits remaining on the credit balance of the gaming machine to a cash value which the gaming machine then outputs, via a printer, as a ticket voucher. The ticket voucher is associated with the cashed out value which is printed on the ticket. Data associated with the cashed out value and the ticket voucher, such as a ticket voucher identifier, are stored on one or more servers and verified when the ticket voucher is subsequently redeemed. Such subsequent redemption includes utilizing the printed ticket voucher to add credits to another gaming machine or redeeming the printed ticket voucher for its cash value, such as at a kiosk or a gaming establishment cashier.

While the utilization of such ticket vouchers decreases certain known problems previously associated with gaming machines that dispensed coins or cash, the utilization of ticket vouchers and/or promotional tickets is still associated with various incurred labor and material costs. For example, the utilization of ticket vouchers is associated with the labor costs of having to periodically remove a cash box including received ticket vouchers and cash from the gaming machine, replace the removed cash box with an empty one and refill the blank ticket voucher stacks housed by the gaming machine. The utilization of such ticket vouchers is further associated with the various labor costs of counting the cash and ticket vouchers removed from the gaming machine. Specifically, any removed cash is transported to a secure area where one or more individuals are involved in counting and recording the various sums of cash and/or ticket vouchers removed from each gaming machine. The cash amounts removed from each gaming machine are reconciled with other information sources, such as from hard meters on the gaming machine or records from a server that generates and validates ticket vouchers. The reconciliation process increases the tracking of the earnings from the gaming machine for taxation purposes. Additionally, the utilization of promotional ticket is associated with the various costs of printing such promotional tickets, mailing such promotional tickets to players prior to such players visiting the gaming establishment and/or staffing a player service desk with personal to redeem such promotional tickets.

From a security standpoint, the utilization of such ticket vouchers typically requires that a technician and one or more security providers are involved in operations where cash is removed from a gaming machine. The security providers track the cash being retrieved and transported to deter theft. Additionally, since removing cash requires the gaming machine cabinet to be opened, the security providers observe the operation to reduce the occurrence of tampering with the gaming machine hardware.

Additionally, certain problems exist from a security standpoint regarding the proper identification and authentication of a user associated with a player account. That is, while a user can swipe a magnetic card tied to a player account and access the funds associated with that player account, such a transaction is not secure without additional authentication measures entered for each transaction. Such additional authentication may be relatively costly and relatively cumbersome to implement thus representing a barrier to adoption of properly securing the transfer of funds or fund data.

Accordingly, in light of the costs and security concerns associated with utilizing ticket vouchers and/or electronic fund transfers at a gaming machine, gaming establishments are in a continuing need to provide gaming systems which reduce such costs and heighten security without otherwise sacrificing the level of excitement and entertainment players associate with playing such gaming machines.

SUMMARY

The present disclosure relates generally to systems and methods for transferring funds from a financial institution account to a cashless wagering account and then to an electronic gaming machine ("EGM") without utilizing any physical forms of currency.

In various embodiments, the system disclosed herein facilitates, independent of any physical currency or ticket vouchers, a transfer of funds, such as via a transfer of fund data, from a financial institution account to a cashless wagering account utilizing both a mobile device and a financial institution device, such as an automated teller machine ("ATM"), a gaming establishment kiosk or a processing card industry ("PCI") terminal. In these embodiments, the cashless wagering account is accessible via the mobile device such that upon a completion of the transfer, the system enables a user or player to subsequently establish a credit balance on an EGM utilizing an application running on the mobile device. As such, the system disclosed herein provides: (i) a first direct transfer of an amount of funds, such as via a transfer of fund data, from a financial institution account to a cashless wagering account, and (ii) a second direct transfer of part or all of the amount of the previously transferred funds, such as via a transfer of fund data, from the cashless wagering account to a credit balance on an EGM. Such transfers of funds or fund data which occur without utilizing any physical forms of currency or physical ticket vouchers associated with any forms of currency alleviate certain security concerns historically associated with physical-currency based systems and provide an environmental benefit in the reduction of waste historically produced in association with physical-currency based systems. Moreover, such transfers of funds or fund data which occur without utilizing any physical forms of currency or physical ticket vouchers associated with any forms of currency reduce labor and material costs associated with maintaining a physical currency-based system and provide an enhanced tracking of the movement of funds between multiple financial systems to combat the ever increasing concerns about possible money-laundering activities.

Specifically, in certain embodiments, the system includes a financial institution device, such as an automated teller machine ("ATM"), a gaming establishment kiosk or any suitable device which communicates over a financial institution network with one or more financial institutions. In these embodiments, the financial institution device includes at least one card reader, at least one user authentication device, such as a secure Personal Identification Number ("PIN") pad, and at least one wireless interface.

In operation of certain embodiments, if a player decides to transfer an amount of funds from a financial institution account to a cashless wagering account, the user or player causes a card associated with their financial institution account to engage (i.e., swiped by or be inserted into) a card reader of the financial institution device. Following the engagement of the card associated with the financial institution account with the card reader of the financial institution device, the identification of the user by the financial institution device using the information encoded on the card associated with the financial institution account and an authentication by the user (e.g., the user utilizes the user authentication device to enter a PIN), the financial institution device enables the user to input an amount of funds to be transferred from the financial institution.

After the financial institution device communicates, via the financial institution network, with the financial institution to determine that the user inputted amount of funds are available to be transferred from the financial institution, the financial institution device (and specifically one or more components of the cashless wagering system housed in the financial institution device) communicates with a cashless wagering system to determine a cashless wagering account to credit with the user inputted amount of funds. That is, rather than distributing the available requested amount of funds in the form of one or more forms of currency or physical monetary instruments, the system disclosed herein bypasses this distribution step and determines a cashless wagering account, managed by the gaming establishment, to direct such funds to. Such a removal of the step of distributing physical monetary currency to the user is associated with significant security improvements as users can avoid having to carry large sums of cash and the associated threat of theft (and possibly accompanying physical harm).

In certain embodiments, the system utilizes a mobile device to determine the cashless wagering account to credit with the user inputted amount of funds. In such embodiments, a cashless wagering system, activates the wireless interface of the financial institution device, wherein the wireless interface is configured to receive information, such as information associated with one or more accounts and instructions to initiate a transfer of funds to a cashless wagering account utilizing a mobile device. In these embodiments, in addition to activating the wireless interface, the financial institution device displays one or more messages informing the player to activate or launch an application on the mobile device. The mobile device application is associated with one or more cashless wagering accounts associated with the user such that the user may view their cashless wagering account balances via the mobile device application.

In addition to informing the user to activate or launch an application on the mobile device, the one or more displayed messages inform the user to cause the mobile device to engage the financial institution device, such as prompting the player to tap the mobile device to a designated portion of the financial institution device. Such an engagement between the mobile device and the financial institution device (or a component of a cashless wagering system located inside the financial institution device), causes a pairing or linkage to occur between the mobile device (and specifically one or more applications being run or executed on the mobile device) and the financial institution device (or the component of the cashless wagering system located inside the financial institution device).

After the user causes the mobile device to engage the financial institution device (e.g., the player taps the mobile device to a card reader or other designated location(s) of the financial institution device) and a secure connection is established between the mobile device and the financial institution device (or the component of the cashless wagering system located inside the financial institution device), the cashless wagering system causes the application being run or executed on the mobile device to prompt the player to confirm the transfer of the amount of funds from the financial institution account to the cashless wagering account.

In these embodiments, following the user confirming, via the application being run or executed on the mobile device, the transaction, the mobile device application communicates, via a wireless communication protocol, the information necessary to complete the transaction to the cashless wagering system. In such embodiments, this information includes identifying information regarding a cashless wagering account associated with the user, encrypted authentication information regarding the cashless wagering account associated with the user, such as an encrypted PIN associated with their cashless wagering account, and the amount of the funds to be transferred from the financial institution account.

Following the communication of the information needed to facilitate the transaction, the cashless wagering system completes the transaction and communicates a completed transaction confirmation to the financial institution device (which may communicate such a confirmation to the financial institution via the financial institution network). In certain embodiments, the cashless wagering system further communicates the completed transaction confirmation to the mobile device application which displays an acknowledgement to the user of the completed transaction at least in the form of an updated cashless wagering account balance. In certain embodiments, the financial institution device communicates a cashless wagering system generated completed transaction confirmation to the mobile device application which displays an acknowledgement to the user of the completed transaction at least in the form of an updated cashless wagering account balance.

In various embodiments, following the direct transfer of an amount of funds from a user's financial institution account to a user's cashless wagering account utilizing one or more of a financial institution device and a mobile device, the system enables the user to establish a credit balance on an EGM utilizing the application running on the mobile device (and without utilizing any physical forms of currency or physical ticket vouchers associated with any forms of currency). In such embodiments, the system enables the user to access the funded cashless wagering account via the application executed on the mobile device to facilitate the transfer of funds, such as via the transfer of fund data, from the accessed cashless wagering account to the EGM utilizing the mobile device application.

In these embodiments, following the direct transfer of an amount of funds, such as via a transfer of fund data, from a user's financial institution account to a user's cashless wagering account, the user goes to an EGM and utilizing the mobile device application which is linked or otherwise paired with the EGM, the system facilitates the transfer of part or all of the amount of funds, such as via the transfer of fund data, to the EGM. That is, independent of the utilization of any cash or any ticket vouchers, the system of the present disclosure utilizes one or more cashless wagering systems, the EGM (and more specifically the EGM interface board), one or more applications executed on a mobile device, and one or more EGM-to-mobile device communication protocols (or component(s) associated with EGM-mobile device communication protocols) to facilitate the further movement of the financial institution transferred funds or fund data to an EGM.

Specifically, in certain embodiments, following accessing the mobile device application and obtaining, if needed, an authorization token from the cashless wagering system that can be used to interact with the user's cashless wagering account, the mobile device application designates part or all of the amount of funds previously transferred from the financial institution account to now be transferred to the EGM. In different embodiments, the amount of funds to be transferred is determined by the player, determined automatically by the mobile device application and/or determined by the cashless wagering system.

In these embodiments, following the transfer designation and any actions which establish a direct or indirect communication line between the mobile device and the EGM, the EGM communicates with the cashless wagering system to complete the transfer of the designated amount of funds to the EGM. In certain embodiments, the facilitation of a transfer of the designated amount of funds from the cashless wagering account to the EGM via a mobile device is accomplished by one or more wireless communication protocols between the EGM and the mobile device.

Following such a transfer of funds or fund data from the player's cashless wagering account to the EGM (at least partially facilitated by an application executed on a mobile device), the transferred amount of funds establishes a quantity of credits of a credit balance (or adds an amount of funds to a preexisting credit balance) for the player to wager on one or more plays of one or more primary or base games.

Accordingly, certain embodiments of the present disclosure utilize a mobile device as an interface of an electronic wallet or e-wallet to: (i) facilitate a transfer of funds, such as via the transfer of fund data, from a financial institution account, accessed via a financial institution device, to a cashless wagering account, and (ii) facilitate a further transfer of part or all of such funds, such as via the transfer of fund data, from the cashless wagering account to an EGM. These different mobile device facilitated transfers of funds or fund data occur without utilizing any physical forms of currency and without utilizing any physical ticket vouchers associated with any forms of currency to provide for a relatively more efficient gaming experience by users, a more personalized display of information to users while also overcoming certain of the known security concerns and labor cost concerns associated with both cash-based gaming and ticket voucher-based gaming. For example, the additional authentication implemented in association with each transaction pertaining to the mobile device application combats certain security concerns which arise when a user access funds associated with a player account without entering any authenticating information. Additionally, such a configuration thus reduces the use of paper ticket vouchers (and any ink associated with the production of such paper ticket vouchers) to reduce the amount of waste produced by gaming establishments. Such a reduction in the amount of waste produced by gaming establishments provides an environmental benefit of implementing the system disclosed herein.

Additional features and advantages are described herein, and will be apparent from the following Detailed Description and the figures.

DETAILED DESCRIPTION

Figure 1:
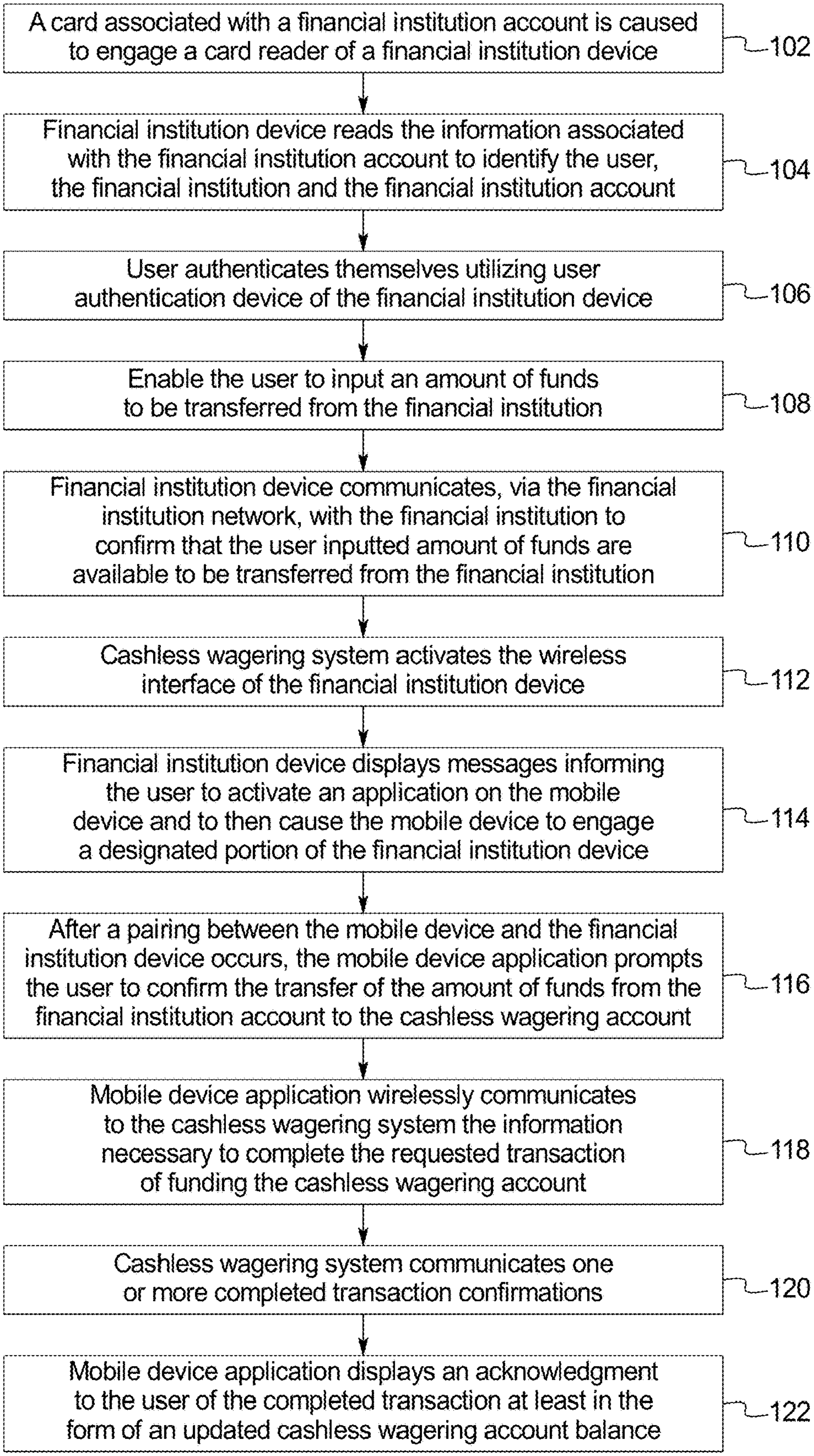
FIG. 1 is a flowchart of an example of the system transferring funds from a financial institution account to a cashless wagering account to be available to be subsequently transferred to an EGM without utilizing any physical forms of currency.

Transferring Funds From a Financial Institution Account to a Cashless Wagering Account and then to an EGM In various embodiments, the system disclosed herein facilitates, independent of any physical currency or ticket vouchers, a transfer of funds, such as via a transfer of fund data, from a financial institution account to a cashless wagering account utilizing both a mobile device and a financial institution device, such as an automated teller machine ("ATM"), a gaming establishment kiosk or a processing card industry ("PCI") terminal. In these embodiments, the cashless wagering account is accessible via the mobile device such that upon a completion of the transfer, the system enables a user or player to subsequently establish a credit balance on an EGM utilizing an application running on the mobile device. As such, the system disclosed herein provides: (i) a first direct transfer of an amount of funds, such as via a transfer of fund data, from a financial institution account to a cashless wagering account, and (ii) a second direct transfer of part or all of the amount of the previously transferred funds, such as via a transfer of fund data, from the cashless wagering account to a credit balance on an EGM. Such transfers of funds or fund data which occur without utilizing any physical forms of currency or physical ticket vouchers associated with any forms of currency alleviate certain security concerns historically associated with physical-currency based systems and provide an environmental benefit in the reduction of waste historically produced in association with physical-currency based systems. Moreover, such transfers of funds or fund data which occur without utilizing any physical forms of currency or physical ticket vouchers associated with any forms of currency reduce labor and material costs associated with maintaining a physical currency-based system and provide an enhanced tracking of the movement of funds between multiple financial systems to combat the ever increasing concerns about possible money-laundering activities.

It should be appreciated that while the player's credit balance, the player's wager, and any awards are displayed as an amount of monetary credits or currency in the embodiments described below, one or more of such player's credit balance, such player's wager, and any awards provided to such player may be for non-monetary credits, promotional credits, non-cashable credits, free game play credits, and/or player tracking points or credits.

It should be additionally appreciated that while the below-described embodiments pertain to transferring funds from a financial institution account to a cashless wagering account and then to an electronic gaming machine (such as a slot machine, a video poker machine, a video lottery terminal, a video keno machine, or a video bingo machine) without utilizing any physical forms of currency, such embodiments may additionally or alternatively pertain to transferring funds from a financial institution account to a cashless wagering account and then to any one or more of an electronic gaming table, a table configured to enable a play of a table game and also receive a transfer of funds or fund data from a cashless wagering account, and/or a gaming network without utilizing any physical forms of currency.

It should be further appreciated that any functionality or process described herein may be implemented via one or more servers, such as one or more gaming establishment management system servers (e.g., one or more cashless wagering system servers) and/or one or more financial institution servers, an EGM, one or more financial institution devices or a mobile device application. For example, while certain data or information described herein is explained as being communicated from an EGM to a mobile device via one or more wireless communication protocols, such data or information may additionally or alternatively be communicated from one or more servers to a mobile device via one or more wireless communication protocols. Accordingly: (i) while certain functions, features or processes are described herein as being performed by an EGM, such functions, features or processes may alternatively be performed by one or more servers, such as one or more gaming establishment management system servers (e.g., one or more cashless wagering system servers) and/or one or more financial institution servers, one or more financial institution devices or one or more mobile device applications, (ii) while certain functions, features or processes are described herein as being performed by one or more mobile device applications, such functions, features or processes may alternatively be performed by one or more servers, such as one or more gaming establishment management system servers (e.g., one or more cashless wagering system servers) and/or one or more financial institution servers, one or more financial institution devices or one or more EGMs, (iii) while certain functions, features or processes are described herein as being performed by one or more servers, such as one or more gaming establishment management system servers (e.g., one or more cashless wagering system servers), these functions, features or processes may alternatively be performed by one or more EGMs, one or more financial institution devices or one or more mobile device applications, and (iv) while certain functions, features or processes are described herein as being performed by one or more financial institution devices, such functions, features or processes may alternatively be performed by one or more EGMs, one or more servers, such as one or more gaming establishment management system servers (e.g., one or more cashless wagering system servers) and/or one or more financial institution servers, or one or more mobile device applications.

Fund Transfer from Financial Institution to Cashless Wagering System

FIG. 1 is a flowchart of an example process or method of operating the system of the present disclosure. In various embodiments, the process is represented by a set of instructions stored in one or more memories and executed by one or more processors. Although the process is described with reference to the flowchart shown in FIG. 1, many other processes of performing the acts associated with this illustrated process may be employed. For example, the order of certain of the illustrated blocks or diamonds may be changed, certain of the illustrated blocks or diamonds may be optional, or certain of the illustrated blocks or diamonds may not be employed.

Figure 3:
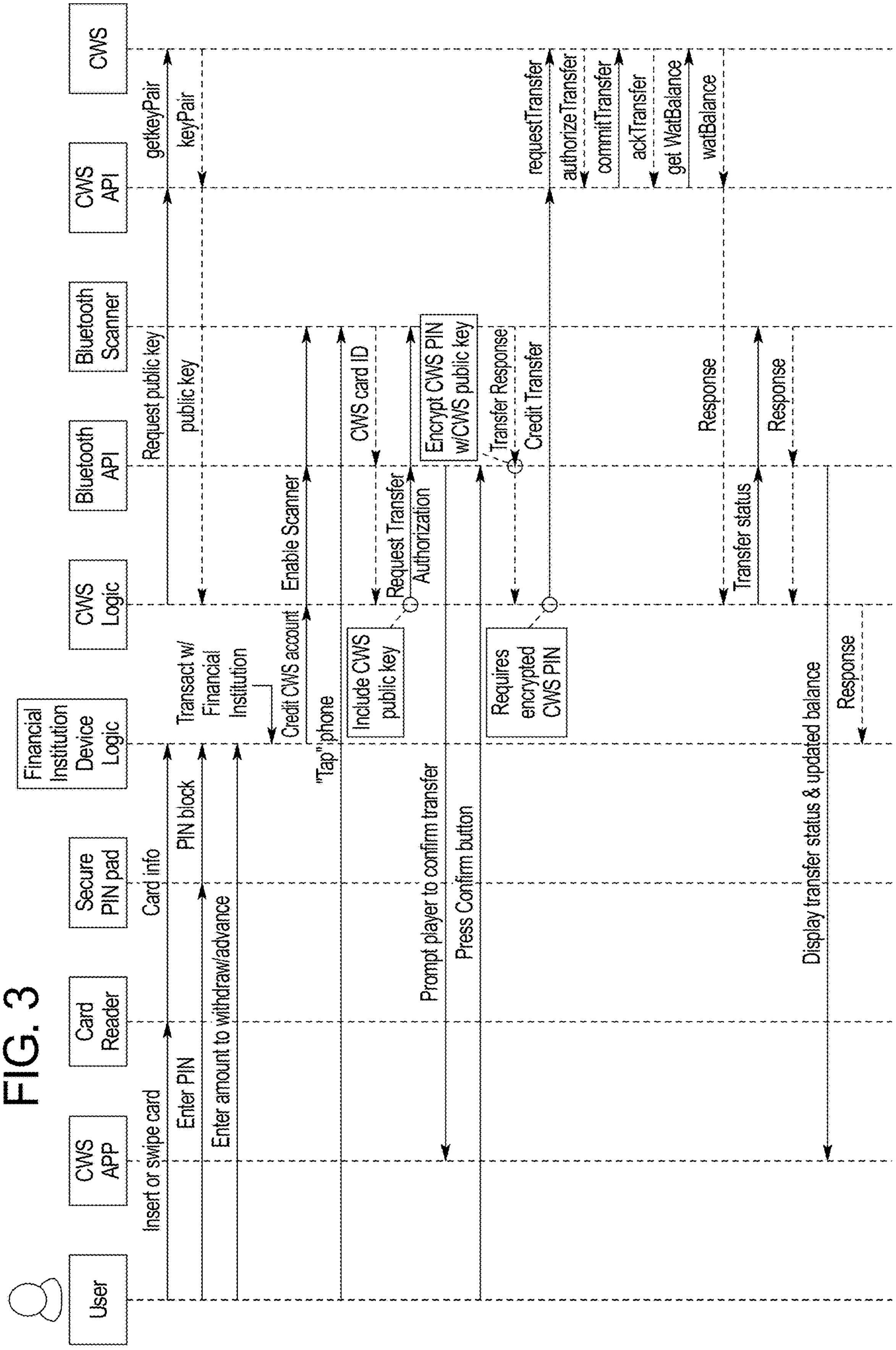
FIG. 3 is a flow diagram of certain of the messages which are communicated between certain of the components of FIG. 2 to facilitate the transfer of funds from a financial institution account to a cashless wagering account to be available to be subsequently transferred to an EGM without utilizing any physical forms of currency.

In various embodiments, as indicated by block 102 of FIG. 1 and as seen in FIG. 3, upon a user or player deciding to transfer an amount of funds from a financial institution account to a cashless wagering account, the user causes a card associated with a financial institution account to engage a card reader of a financial institution device. In one such embodiment in which the user intends to withdrawn funds from a financial institution banking account, the card associated with a financial institution account includes a financial institution debit card which the user inserts into or otherwise swipes by a card reader of the financial institution device. In another such embodiment, in which the user intends to receive an advance of funds from a financial institution credit account, the card associated with a financial institution account includes a financial institution credit card which the user inserts into or otherwise swipes by a card reader financial institution device.

Figure 2:
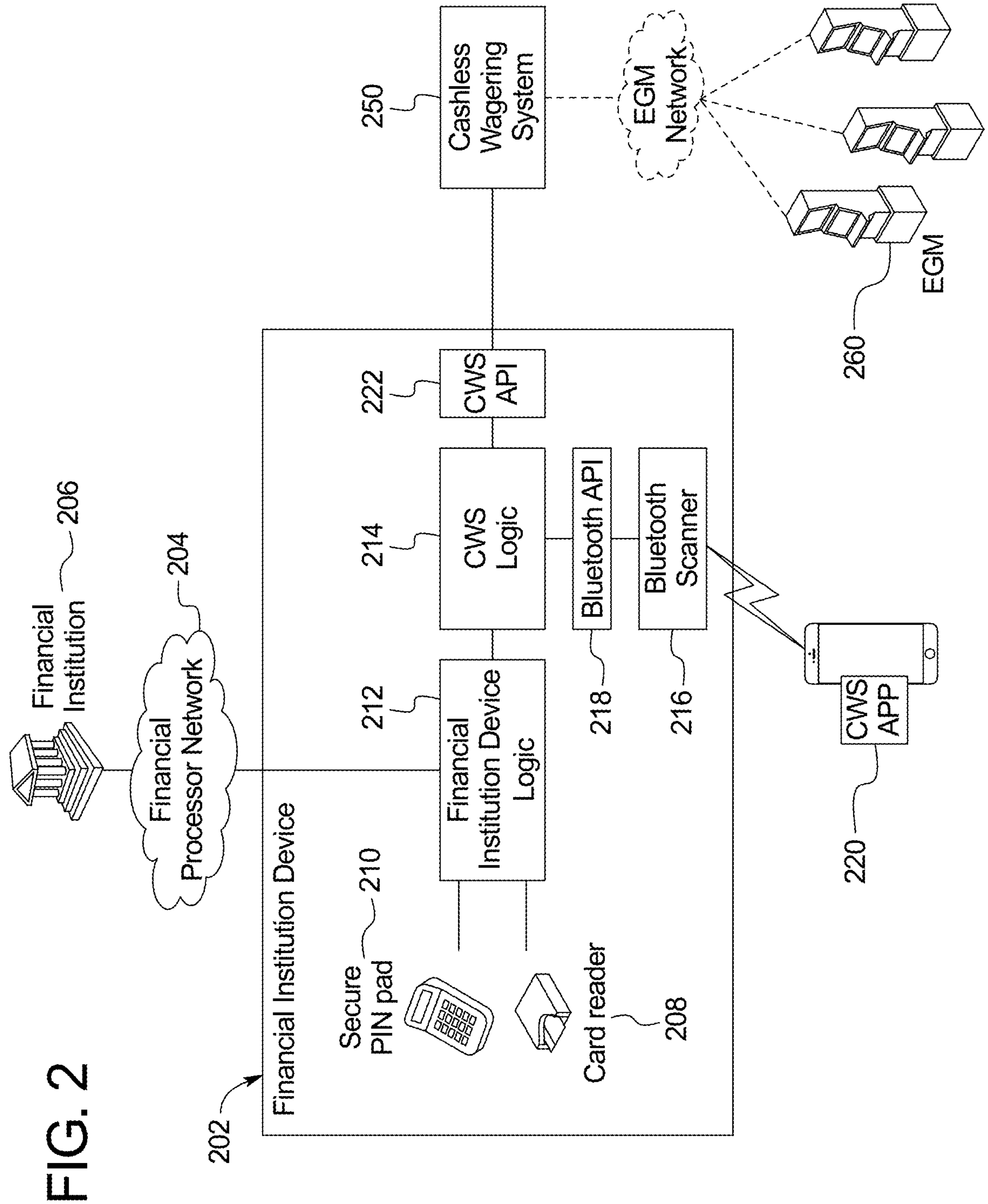
FIG. 2 is a schematic block diagram of certain of the components utilized to transfer funds from a financial institution account to a cashless wagering account to be available to be subsequently transferred to an EGM without utilizing any physical forms of currency.

In certain embodiments, as seen in FIG. 2, the financial institution device 202 includes an ATM, a financial institution kiosk, a gaming establishment kiosk, a financial institution point-of-sale terminal, a cashier terminal or any suitable device which communicates over a financial institution network 204 with one or more financial institutions 206.

In one embodiment, the financial institution device includes a card reader 208 configured to read the encoded information contained on various magnetic stripes of various cards associated with the user. In another such embodiment, the financial institution device includes a card reader configured to read various information stored by various smart cards or integrated circuit cards associated with the user. In another such embodiment, the financial institution device includes a card reader configured to read the encoded information contained on various magnetic stripes of various cards associated with the user as well as read various information stored by various smart cards or integrated circuit cards associated with the user. In these embodiments, the card reader of the financial institution device is capable of identifying information associated a plurality of different cards or types of cards from a plurality of different systems, such as one or more financial institution systems, one or more cashless wagering account systems and/or one or more player tracking systems.

In another embodiment, the financial institution device includes a plurality of card readers which are each configured to read information associated with one or more different systems. In this embodiment, for security reasons, different systems are required to be maintained separately such that different card readers are needed to access information for each system. In one such embodiment, the financial institution device includes a first card reader configured to read the encoded information contained on a magnetic stripe of one or more cards of the user associated with one or more systems. In this embodiment, the financial institution device includes a second card reader configured to read the encoded information contained on a magnetic stripe of one or more different cards of the user associated with one or more different systems. For example, the financial institution device includes a first card reader configured to read the encoded information contained on the magnetic stripe of the user's financial institution card. In this example, the financial institution device includes a second card reader configured to read the encoded information contained on one or more of the magnetic stripes of one or more gaming establishment accounts associated with the user, such as a user's player tracking account card and/or a user's cashless wagering account card.

In another such embodiment, the financial institution device includes a first card reader configured to read the information stored by one or more smart cards or integrated circuit cards associated of the user associated with one or more systems. In this embodiment, the financial institution device includes a second card reader configured to read the information stored by one or more smart cards or integrated circuit cards associated of the user associated with one or more different systems. In another such embodiment, the financial institution device includes a plurality of hybrid card readers which are each configured to read the encoded information contained on one or more magnetic stripes of one of more of the user's cards associated with one or more systems as well as read various information stored by various smart cards or integrated circuit cards of the user associated with one or more different systems.

In another such embodiment, the financial institution device additionally or alternatively includes one or more card readers which support one or more contactless payment systems, such as a mobile payment solutions facilitated by a mobile device or a contactless card system facilitated by a credit card, debit card, smart card, such as using Apple Pay™ or Android Pay™.

In another embodiment wherein one or more financial institution applications running or being executed on a mobile device function as a financial institution card, the financial institution device does not include any card readers. In this embodiment, the information associated with a financial institution card is stored in association with one or more financial institution mobile device applications wherein the financial institution device is configured to communicate with such financial institution mobile device applications to retrieve this information without the need of physical financial institution card.

In certain embodiments, the financial institution device also includes at least one user authentication device 210 such as a secure PIN pad, or a biometric identifier associated with one or more biometric sensors. The financial institution device includes one or more display devices, such as any display device disclosed herein, configured to display information, including one or more messages, to the user. The financial institution device also includes at least one wireless interface which, as described in more detail below, is configured to facilitate the communication of information between the financial institution device and a mobile device. It should be appreciated that the financial institution device (or any component of the cashless wagering system housed in the financial institution device) is configured to communicate with one or more mobile devices utilizing one or more wireless communication protocols including, but not limited to: Bluetooth™, Bluetooth™ Low Energy ("BLE"), one or more cellular communication standards (e.g., 3G, 4G, LTE), one or more Wi-Fi compatible standards, and one or more short range communication protocols (e.g., a near field communication ("NFC") protocol).

Returning to FIGS. 1 and 3, following the engagement of the card associated with the financial institution account with the card reader of the financial institution device, as indicated by block 104 of FIG. 1, the financial institution device reads the information associated with the financial institution account to identify the user, the financial institution and the financial institution account. Specifically, one or more processors of the financial institution device executing one or more sets of instructions stored by one or more memory devices of the financial institution device (i.e., the financial institution device logic 212 of FIG. 2) operates with the card reader of the financial institution device to identify relevant information associated with the user which is stored on or otherwise indicated by the swiped or inserted financial institution card. While not shown in FIG. 1, if the financial institution device is unable to read the information associated with the financial institution account to identify the user, the financial institution device displays one or more error messages to the user, such as an error message prompting the user to reswipe or reinsert their financial institution card.

Following zero, one or more prompts to the user, the user authenticates themselves utilizing one or more user authentication devices of the financial institution device as indicated in block 106 of FIG. 1 and FIG. 3. For example, the financial institution device prompts the user to utilize the secure PIN pad to enter a PIN which is used by the financial institution device to verify that the user is the legitimate owner of the swiped or inserted card. While not shown in FIG. 1, if the financial institution device is unable to authenticate the user, the financial institution device displays one or more error messages to the user, such as an error message instructing the user to enter different authenticating information. In certain embodiments, after displaying a designated quantity of error messages, after a designated period of time without a response from the user, or after a designated quantity of failed attempts to authenticate the user, the financial institution device cancels or otherwise aborts the transaction.

Following a valid authentication by the user, the financial institution device enables the user to input an amount of funds to be transferred from the financial institution as indicated in block 108 of FIG. 1 and FIG. 3. While not shown in FIG. 1, if the user fails to input an amount of funds to be transferred, the financial institution device displays one or more error messages to the user, such as an error message instructing the user to enter an amount of funds. In certain embodiments, after displaying a designated quantity of error messages, or after a designated period of time without a response from the user, the financial institution device cancels or otherwise aborts the transaction.

The financial institution device then communicates, via the financial institution network, with the financial institution to confirm that the user inputted amount of funds are available to be transferred from the financial institution as indicated in block 110 of FIG. 1 and FIG. 3. Specifically, one or more processors of the financial institution device executing one or more sets of instructions stored by one or more memory devices of the financial institution device communicates, via the financial institution network, with one or more financial institution servers to confirm an availability of funds to be transferred. While not shown in FIG. 1, if the financial institution device is unable to confirm that the user inputted amount of funds are available to be transferred from the financial institution, the financial institution device displays one or more error messages to the user, such as an error message instructing the user to input another amount of funds. In certain embodiments, after displaying a designated quantity of error messages, after a designated period of time without a response from the user, or after a designated quantity of a user inputting unavailable amounts of funds to be transferred, the financial institution device cancels or otherwise aborts the transaction.

After confirming that the requested amount of funds are available for transfer, as indicated in block 112 of FIG. 1 and FIG. 3, a cashless wagering system (or any other suitable gaming establishment management system) activates the wireless interface of the financial institution device. That is, one or more components of a cashless wagering system (or one or more components of any other suitable gaming establishment management system) located on or inside the financial institution device activates the wireless interface of the financial institution device. Specifically, as seen in FIG. 2, in association with a cashless wagering system 250 (or any other suitable gaming establishment management system), one or more processors of one or more components of the cashless wagering system (or any other suitable gaming establishment management system) located inside the financial institution device (i.e., the cashless wagering system logic or CWS logic 214 of FIG. 2) execute one or more sets of instructions stored by one or more memory devices to communicate with the wireless interface housed in the financial institution device to activate the wireless interface. In certain embodiments, the wireless interface includes a Bluetooth™ communication protocol wherein a gaming establishment management system server, such as a cashless wagering system server activates a Bluetooth™ scanner 216 housed in the financial institution device via a Bluetooth™ application programming interface ("API") 218. It should be appreciated that, as described in more detail below, any suitable wireless interface communication protocols including, but not limited to Wi-Fi, cellular, NFC, and/or BLE communication protocols may be implemented in association with the financial institution device.

Following the activation of the wireless interface of the financial institution device, as indicated in block 114 of FIG.

1 and FIG. 3, the financial institution device displays one or more messages informing the user to activate or launch an application on the mobile device (220 of FIG. 2) and to then cause the mobile device to tap or otherwise engage a designated portion of the financial institution device (or otherwise place the mobile device a designated distance from a designated portion of the financial institution device). While not shown in FIG. 1, if the user fails to activate or launch the application on the mobile device and/or fails to cause the mobile device to tap or otherwise engage a designated portion of the financial institution device (or otherwise place the mobile device a designated distance from a designated portion of the financial institution device), the financial institution device displays one or more error messages or reminder messages to the user. In certain embodiments, after displaying a designated quantity of error or reminder messages or after a designated period of time without a response from the user, the financial institution device cancels or otherwise aborts the transaction.

As described in more detail below, the mobile device application is associated with one or more cashless wagering accounts associated with the user and further enables the user to request different actions which are executed, at least in part, utilizing one or more EGMs. As further described below, such an engagement between the mobile device and the financial institution device (or a component of a gaming establishment management system, such as a component of a cashless wagering system located inside the financial institution device), causes a pairing or linkage to occur between the mobile device (and specifically one or more applications being run or executed on the mobile device) and the financial institution device (or a component of a gaming establishment management system, such as a component of a cashless wagering system located inside the financial institution device).

In certain embodiments, the system disclosed herein tracks one or more identifiers, such as one or more names or addresses, in association with the financial institution accounts and the gaming establishment management system accounts, such as the cashless wagering system accounts. In these embodiments, the system utilizes the account identifiers associated with the different accounts to determine any inconsistencies between identifiers, such as if the financial institution account which funds are being drawn from is associated with a different name (or a different surname) than the cashless wagering account which the funds are being directed to. In certain such embodiments, if one or more inconsistencies are detected, the system cancels the transaction or otherwise requests additional information from the user. Such a configuration of correlating information between different accounts of different systems reduces or prevents fraud.

Figure 4A:
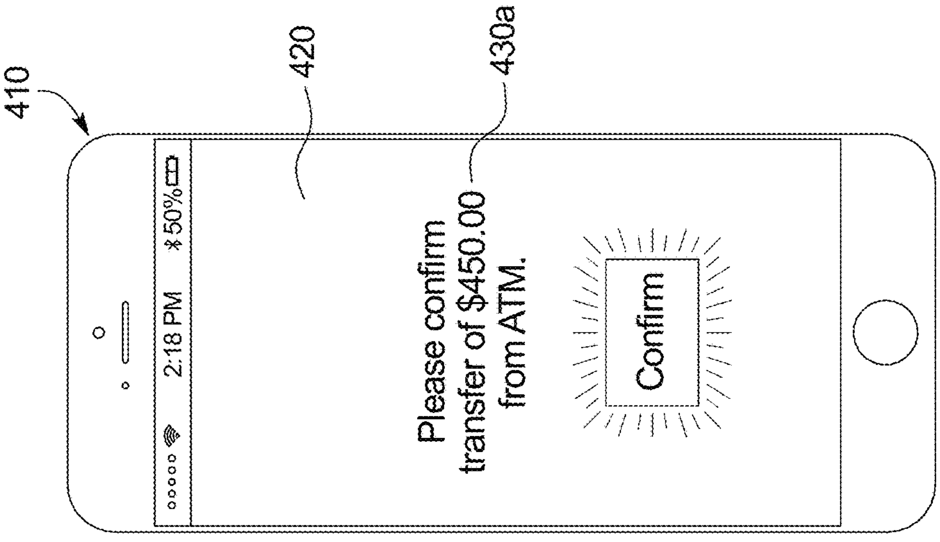
FIGS. 4A, 4B, 4C, 4D, 4E, 4F, 4G, and 4H are example graphical user interfaces displayed on a mobile device in connection with actions initiated at a mobile device and completed at an EGM.

After the user causes the mobile device to engage the financial institution device (e.g., the player taps the mobile device to a card reader or other designated location(s) of the financial institution device) and a pairing or linkage between the mobile device (and specifically one or more applications being run or executed on the mobile device) and the financial institution device (or a component of a gaming establishment management system, such as a component of a cashless wagering system located inside the financial institution device) occurs, as indicated in block 116 of FIG. 1 and FIG. 3, the application being run or executed on the mobile device prompts the user to confirm the transfer of the amount of funds from the financial institution account to the cashless wagering account. For example, as seen in FIG. 4A, if the user has a previous cashless wagering account balance of $0.45 and the user has requested a transfer of $450.00 from the user's financial institution account to the user's cashless wagering account, the mobile device application 420 of the mobile device 410 proceeds with displaying a prompt to the user to confirm the $450.00 transfer amount 430*a*.

In one such embodiment, the gaming establishment management system, such as the cashless wagering system, causes the mobile device to prompt the user to amount of the transaction to be completed. In this embodiment, one or more processors of the component of the gaming establishment management system, such as the component of the cashless wagering system located inside the financial institution device execute one or more sets of instructions stored by one or more memory devices to prompt the user to make one or more mobile device inputs to proceed with the requested transaction. Such a confirmation adds an additional layer of security to the system disclosed herein by installing an additional safeguard against an inadvertent transfer of funds or fund data to a cashless wagering account or an unintended amount of funds transferred to a cashless wagering account. While not shown in FIG. 1, if the user fails to confirm the transfer of the amount of funds from the financial institution account to the cashless wagering account, the mobile device (and specifically the mobile device application) displays one or more error messages or reminder messages to the user. In certain embodiments, after displaying a designated quantity of error or reminder messages or after a designated period of time without a response from the user, the financial institution device cancels or otherwise aborts the transaction.

As indicated in block 118 of FIG. 1 and FIG. 3, following the user confirming, via the application being run or executed on the mobile device, the transaction, the mobile device application wirelessly communicates, via the implemented wireless communication protocol, the information necessary to complete the requested transaction of funding the cashless wagering account to the cashless wagering system (or any other suitable gaming establishment management system). In another embodiment, following the user confirming, via the application being run or executed on the mobile device, the transaction, the mobile device application wirelessly communicates the information necessary to complete the requested transaction of funding the cashless wagering account to the financial institution device which then communicates such information to the cashless wagering system (or any other suitable gaming establishment management system). In such embodiments, this information includes identifying information regarding a cashless wagering account associated with the user, encrypted authentication information regarding the cashless wagering account associated with the user, such as an encrypted PIN associated with the cashless wagering account, and the amount of the funds to be transferred from the financial institution account.

Following the communication of the information needed to facilitate the requested transaction, the cashless wagering system (or any other suitable gaming establishment management system) completes the requested transaction as indicated in block 120 of FIG. 1 and FIG. 3. Specifically, as seen in FIG. 2, one or more processors of one or more components of the gaming establishment management system, such as one or more components of the cashless wagering system located inside the financial institution device execute one or more sets of instructions stored by one or more memory devices to operate with a gaming establishment management system API, such as a cashless wagering system API 222 to complete the transfer of funds or fund data to the cashless wagering account. Such a transfer of funds or fund data includes the cashless wagering system updating the balance of the cashless wagering account to which such funds or fund data was transferred to. Accordingly, one or more processors of the component of the gaming establishment management system, such as one or more components of the cashless wagering system located inside the financial institution device represent the connection between the financial institution and the gaming establishment management system, such as the cashless wagering system necessary to facilitate the financial institution device initiated transfer of funds or fund data from the financial institution to the cashless wagering system account.

Following the completed transfer of funds of fund data to the cashless wagering account, as indicated in block 122 of FIG. 1 and FIG. 3, the components of a gaming establishment management system, such as the components of the cashless wagering system located inside the financial institution device communicates one or more completed transaction confirmations. In one embodiment, the component of a gaming establishment management system, such as the component of the cashless wagering system located inside the financial institution device communicates one or more completed transaction confirmations to the financial institution device. In one such embodiment, the financial institution device in turn communicates, via the financial institution network, a completed transaction confirmation to the financial institution.

Figure 4B:
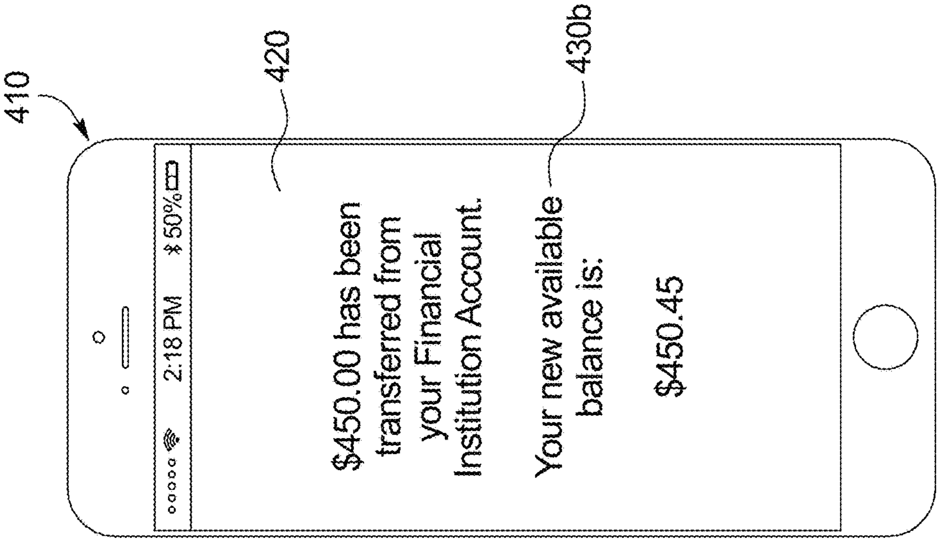

In another embodiment, the component of a gaming establishment management system, such as the component of the cashless wagering system located inside the financial institution device additionally or alternatively communicates one or more completed transaction confirmations to the mobile device application. In this embodiment, as indicated by block 124 of FIG. 1 and FIG. 3, the mobile device application displays an acknowledgement to the user of the completed transaction at least in the form of an updated cashless wagering account balance. For example, as seen in FIG. 4B, the mobile device application 420 of the mobile device 410 proceeds with displaying an acknowledgement to the user of the completed transfer of $450.00 and the updated cashless wagering account balance of $450.45 430*b*.

Figure 4C:
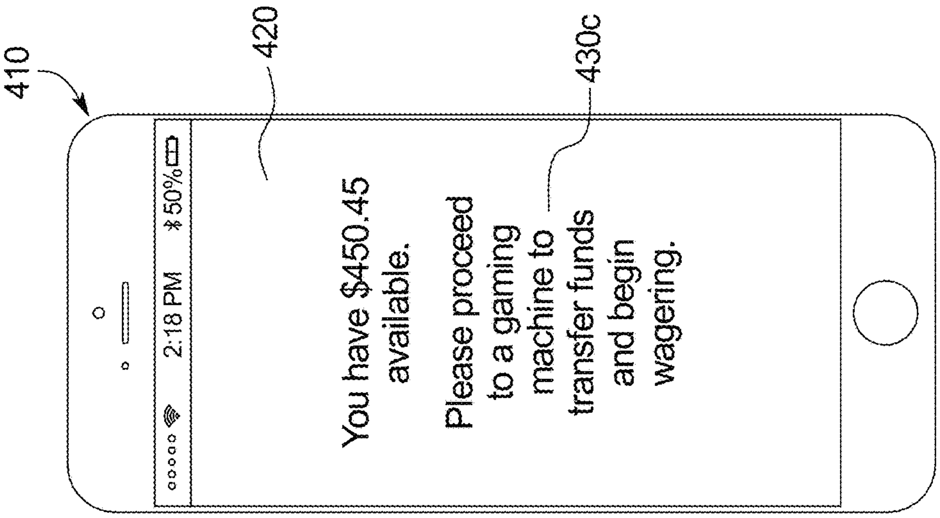

Following this completed transfer, the amount of funds or fund data transferred from the financial institution account to the cashless wagering account is available to be utilized in association with one or more of the below-described actions requested by the user, including but not limited to the below-described mobile device facilitated transfer of an amount of funds or funds data from the cashless wagering account to an EGM. As such, in certain embodiments, the mobile device application displays one or more messages to the user to utilize this transferred in amount of funds at one or more EGMs. For example, as seen in FIG. 4C, the mobile device application 420 of the mobile device 410 proceeds with displaying such messages to the user 430*c*.

Accordingly, the present disclosure provides that after confirming with the financial institution that the requested amount of funds are available to be transferred, the financial institution device communicates with a cashless wagering system to determine a cashless wagering account to credit with the user inputted amount of funds. That is, unlike traditional financial institution devices, such as traditional ATMs which proceed with distributing the available requested amount of funds in the form of one or more forms of currency or physical monetary instruments, the system disclosed herein bypasses this physical currency distribution step and determines a cashless wagering account, managed by the gaming establishment, to direct such funds or such fund data to. Such a removal of the step of distributing physical monetary currency to the user is associated with significant security improvements as users can avoid having to carry large sums of cash and the associated threat of theft (and possibly accompanying physical harm).

In certain embodiments, the system disclosed herein is configured to generate or run various reports associated with the above-described transfers of funds or fund data from financial institution accounts to cashless wagering accounts. In one such embodiment, such reports are available to be run on an individual financial institution device basis for fund reconciliation purposes.

In certain embodiments, the system disclosed herein is configured to track and correlate the above-described transfers of funds or fund data from financial institution accounts to cashless wagering accounts with the below-described transfers of funds or fund data from such cashless wagering accounts to one or more EGMs. In one such embodiment, the system tracks and correlates such transactions to detect and reduce (or prevent) money-laundering activities.

In another embodiment, in addition to the above-described financial institution device facilitated transfer of an amount of funds from a financial institution account to a cashless wagering account, the financial institution device facilitates a transfer of an amount of funds from a cashless wagering account to a financial institution account. In such embodiments, after the user has authenticated themselves at the financial institution device and after the mobile device establishes communication with the financial institution device, the user utilizes the mobile device application as an interface to cause a transfer of an amount of funds or fund data, such as a user's winnings from one or more games played, from a cashless wagering account to the user's financial institution device.

It should be appreciated that while the transfer of an amount of funds or fund data disclosed herein is described as being facilitated by an application running or being executed on a mobile device, other non-currency mediums may be utilized to facilitate such a transfer. In one such embodiment, a player tracking card may be utilized at a financial institution device to facilitate the transfer of an amount of funds or fund data from a financial institution account to a cashless wagering account. In another such embodiment, a gaming establishment issued smart card or key fob may be utilized at a financial institution device to facilitate the transfer of an amount of funds or fund data from a financial institution account to a cashless wagering account.

It should be further appreciated that as described above, certain situations arise in which the system cancels or otherwise aborts the attempted transaction of transferring an amount of funds or fund data from a financial institution account to a cashless wagering account. In addition to these situations in which the system cancels the attempted transaction, the user may make one or more inputs to cancel the attempted transaction. In one embodiment, when one or more of these situations occur, the system cancels the attempted transaction. In this embodiment, based on where in the above-described process the cancellation occurs, the financial institution device, the financial institution server, the gaming establishment management system server, such as the cashless wagering system server and/or the mobile device communicate one or more cancellation messages. For example, if a cancellation occurs after the financial institution server has authorized the transaction of a transfer of an amount of funds (and possibly reduced the user's financial institution account by the amount of funds to reflect the authorized transaction), the financial institution device communicates a cancellation message to the financial institution server. In this example, upon receipt of the cancellation message, the financial institution server proceeds to credit the authorized amount of funds back to the user's financial institution account. In another embodiment, when one or more of these situations occur, the system modifies the above-described process. In one such embodiment, based on where in the above-described process the cancellation occurs, the financial institution device provides the requested amount of funds to the user independent of funding the cashless wagering account. For example, if a cancellation occurs after the financial institution server has authorized the transaction of a transfer of an amount of funds (and possibly reduced the user's financial institution account by the amount of funds to reflect the authorized transaction), the financial institution device proceeds with distributing the amount of funds to the user in the form of currency, or a non-currency medium, such as a voucher.

Linking Mobile Device to Financial Institution Device

In various embodiments, as described above, prior to completing a transaction between a financial institution and a cashless wagering system (such as completing a transfer of any funds from a financial institution account to a cashless wagering account), a pairing or linkage occurs between the mobile device and the financial institution device. The pairing or linkage between the mobile device and the financial institution device occurs via one or more applications being run or executed on the mobile device.

In various embodiments, the mobile device application is a location based digital wallet enabled application, such as a Passbook-enabled or Wallet-enabled application, which is accessible when the user enters a gaming establishment. In certain embodiments, the mobile device application is downloaded to the mobile device from an application store. In certain embodiments, the mobile device application is downloaded to the mobile device from one or more websites affiliated with the gaming establishment (which are accessible directly by the user and/or by a link opened when the user scans a QR code associated with the financial institution device).

In certain embodiments, after a user or player has opened an application on a mobile device and confirmed the amount of funds to be transferred, the system determines if the mobile device application is associated with an active authorization token previously created by the system. In these embodiments, an authorization token is a system created time-based token which is stored by the mobile device and expires after a designated period of time to provide an additional level of user authentication.

If the system determines that the application is not associated with an active authorization token, the mobile device application prompts the user to provide identifying information, such as a personal identification number or biometric identifier. The mobile device application stores the provided identifying information as mobile device encrypted data. Following the user providing identifying information, the mobile device application prompts the user to cause the mobile device to engage the financial institution device, such as prompting the user to tap the mobile device to a designated portion of the financial institution device. It should be appreciated that any reference herein to a user tapping the mobile device to (or otherwise placing the mobile device a designated distance from) a designated portion of the financial institution device (or a component associated with the financial institution device) may or may not include the user pressing a fingerprint scanner (if the mobile device is equipped with such a fingerprint scanner) while concurrently engaging the financial institution device. In other embodiments, the mobile device application verifies the identifying information of the user by communicating with a verification/authentication server over one or more wireless communication protocols, such as WiFi protocol, a cellular communication protocol (e.g., 3G or LTE), to obtain the active authorization token.

In certain embodiments, following the user causing the mobile device to engage the financial institution device (e.g., the user taps the mobile device to a card reader or other designated location(s) of the financial institution device), the mobile device application communicates, via a wireless communication protocol, the provided identifying information and the requested action to be performed to the financial institution device or to a component associated with the financial institution device. For example, upon the user tapping the mobile device to (or otherwise placing the mobile device a designated distance from) a wireless communication interface on the financial institution device, such as a card reader or other designated location(s) of the financial institution device, the mobile device application sends the identifying information and the requested action to a component of a gaming establishment management system located inside the financial institution device, such as a component of a cashless wagering system.

Following the communication of the identifying information and the requested action to the financial institution device or a component associated with the financial institution device, the system determines if the identifying information is valid. If the system determines that the identifying information is invalid, the system communicates an invalid identifying information response to the mobile device. For example, an identifying information status message is communicated to the mobile device which reports whether the identifying information is valid or invalid. The mobile device application then displays one or more messages regarding the invalid identifying information and prompts the user to provide identifying information, such as a personal identification number or biometric identifier. In certain such embodiments, if the mobile device receives a communication that the identifying information is invalid (or alternatively in association with the initial creation of a token) and if the mobile device includes a fingerprint scanner, the mobile device application prompts the user to press the fingerprint scanner while engaging the financial institution device, such as tapping the mobile device to a designated portion of the financial institution device.

On the other hand, if the system determines that the identifying information is valid, the system creates an authorization token. The system associates the authorization token with a timestamp of when the authorization token will expire. In certain embodiments, a cashless ticketing system includes a key distribution center which generates a session key to encrypt all cashless messages. The session key is rotated periodically at a configurable rate from 1 hour to 24 hours. In these embodiments, the system utilizes this session key to sign the token data and create a token. As such, the token time-to-live will be less than or equal to the session key rotation period. In other embodiments, such authorization tokens are managed utilizing software (and not a key distribution center).

In certain embodiments, the authorization token expires after a designated period of time as an additional level of security in the transfer of fund data between the financial institution device and the mobile device. Such a designated amount of time which an authorization token remains valid enables the user to utilize one or more financial institution devices within a designated period of time without having to reprovide such identifying information each time the user visits such a financial institution device. That is, the mobile device application disclosed herein is configured to communicate with one or more financial institution devices (without having to reauthenticate itself repeatedly) during the designated amount of time which the authorization token remains value.

Following the creation of an authorization token, the system communicates the created authorization token to the mobile device, such as via one or more messages including the created authorization token, for storage by the mobile device application.

On the other hand, following a determination that the mobile device application is associated with a previously created and stored authentication token, the mobile device application prompts the user to cause the mobile device to engage the financial institution device, such as prompting the user to tap the mobile device to a designated portion of the financial institution device.

Following the user causing the mobile device to engage the financial institution device (e.g., the user taps the mobile device to a card reader or other designated location(s) of the financial institution device), the mobile device application communicates, via a wireless communication protocol, the previously stored authorization token and the requested action to be performed, such as a confirmation of the inputted transaction to the financial institution device or to a component associated with the financial institution device. For example, upon the user tapping the mobile device to a card reader or other designated location(s) of the financial institution device, the mobile device application sends the stored authorization token and the requested action to a component of a cashless wagering system located inside the financial institution device.

Following the communication of the stored authorization token and the requested action to the financial institution device or a component associated with the financial institution device, the system determines if the communicated authorization token is still valid (i.e., active and non-expired).

If the system determines that the communication authorization token is invalid, the system communicates an invalid authorization token response to the mobile device. Such an invalid authorization token response may be communicated via any suitable wireless communication protocol including, but not limited to, Wi-Fi, cellular, NFC, Bluetooth™, or BLE. The mobile device application then displays one or more messages regarding the invalid authorization token and prompts the user to provide identifying information, such as a personal identification number or biometric identifier, to obtain another authentication token.

On the other hand, if the system determines that the stored authorization token is valid, the system proceeds with executing the requested action.

In certain other embodiments, for each interaction or requested action between the financial institution device and the mobile device described herein, the system requires the user to reengage the financial institution device with the mobile device to reestablish or confirm the pairing between the financial institution device and the mobile device. In certain other embodiments, for each interaction between the financial institution device and the mobile device that occur a designated amount of time after the last engagement of the financial institution device with the mobile device, the system requires the user to reengage the financial institution device with the mobile device to reestablish or confirm the pairing between the financial institution device and the mobile device.

Mobile Device/Financial Institution Device Communications

As indicated above, in various embodiments, the facilitation of the transfer of funds between a cashless wagering account maintained for a user and a financial institution account is accomplished by one or more wireless communication protocols between the financial institution device (or a component associated with the financial institution device) and the mobile device.

In certain embodiments, the communication with the mobile device can occur through one or more wireless interfaces of the financial institution device (or components of the financial institution device). Such wireless interfaces are configured to receive information, such as information associated with one or more accounts and instructions to initiate a transfer of funds to a cashless wagering account utilizing the financial institution device and a mobile device.

In one embodiment, the wireless interface is integrated into the cabinet of the financial institution device and the financial institution device processor is configured to communicate directly with and send control commands to the wireless interface. In another embodiment, the wireless interface is integrated into a device mounted to and/or within the gaming machine cabinet, such as a card reader (i.e., a component associated with the financial institution device). In certain embodiments where the wireless interface is embedded in a secondary device, the financial institution device processor sends control commands to control the wireless interface via a secondary controller.

In certain embodiments disclosed herein, the wireless interface implements an NFC protocol to facilitate the transfer of funds from a financial institution account to a cashless wagering account.

In certain embodiments which utilize the NFC implementation, the mobile device application registers a mobile device application with one or more processors of the mobile device. In these embodiments, when the mobile device is detected by an NFC reader of a component of a cashless wagering system located inside the financial institution device, the component of the cashless wagering system located inside the financial institution device communicates one or more data messages to the mobile device (or to one or more servers which then communicate such data messages to the mobile device). Such data messages are commands generated by the component of the cashless wagering system located inside the financial institution device when the mobile device is detected in the NFC reader field. The processor of the mobile device communicates the data message to the registered mobile device application. The mobile device application responds, such as communicating a triggering message, and a communication channel is opened between the component of the cashless wagering system located inside the financial institution device and the mobile device application (or between the component of the cashless wagering system located inside the financial institution device, one or more servers and the mobile device application). This open communication channel enables the component of the cashless wagering system located inside the financial institution device to send, though the NFC reader, additional data messages to the mobile device (or to the mobile device via one or more servers) which are responded to by the mobile device application of the mobile device.

It should be appreciated that as long as the mobile device remains within the NFC field, the component of the cashless wagering system located inside the financial institution device is configured to communicate with the mobile device and send data, such as status updates, as necessary. However, once the mobile device is removed from the NFC field, the communication channel is closed and such status updates must be discontinued.

In other embodiments, to facilitate the transfer of funds from a financial institution account to a cashless wagering account, the wireless interface implements one or more of any of the wireless communication protocols described herein including, but not limited to any suitable Wi-Fi communication protocol, any suitable cellular communication protocol, any suitable Bluetooth™ communication protocol, and/or any suitable BLE communication protocol.

It should be appreciated that Wi-Fi, cellular, Bluetooth™, BLE communication protocols can be used in lieu of or in combination with NFC. For instance, an NFC communication can be used to instantiate a Wi-Fi or Bluetooth™ communication between the financial institution device, zero, one or more servers and a mobile device, such as secure pairing using one of these protocols. That is, in one embodiment, an NFC interface on a financial institution device can be used to set-up a higher speed communication between the financial institution device, zero, one or more servers and the NFC enabled mobile device. The higher speed communication rates can be used for expanded content sharing. For instance, a NFC and Bluetooth enabled financial institution device can be tapped by an NFC and Bluetooth enabled mobile device for instant Bluetooth pairing between the devices and zero, one or more servers. Instant Bluetooth pairing between a financial institution device, an NFC enabled mobile device and zero, one or more servers, can save searching, waiting, and entering codes. In another example, a financial institution device can be configured as an NFC enabled router, such as a router supporting a Wi-Fi communication standard. Tapping an NFC enabled mobile device to an NFC enabled and Wi-Fi enabled financial institution device can be used to establish a Wi-Fi connection between the devices and zero, one or more servers.

In certain embodiments which implement a Wi-Fi, cellular and/or Bluetooth™ communications protocol, the system utilizes one or more QR codes generated by the financial institution device to facilitate the communication of data between the mobile device and the financial institution device. In such embodiments, the QR code is used to identify the financial institution device that is displaying the QR code to identify the server to which the mobile device should connect. It should be appreciated that the QR code enables the financial institution device to establish a secure tunnel or path from the mobile device to a Wi-Fi network and then to a wired network and finally to the financial institution device. In these embodiments, a communication tunnel wrapper (i.e., a Wi-Fi/Bluetooth™ tunnel wrapper) is utilized to establish a connection between the financial institution device and the mobile device and to transport any data messages described herein between the financial institution device, zero, one or more servers and the mobile device.

More specifically, in certain embodiments, the user requests, via an input at the financial institution device and/or the mobile device, the generation of a QR code by the financial institution device. In response to the user's request, the financial institution device displays a QR code.

In certain embodiments, the QR code includes a nonce which prevents a third-party (e.g., another user) from sniping the user's login attempt. Such an on-demand QR code remains valid for a designated amount of time such that if the use does not scan the QR code within the designated amount of time, another QR code is necessary to be scanned to connect the mobile device to the financial institution device. For example, a QR code is displayed for 30 seconds after which the QR code is no longer displayed. In this example, if another use attempts to scan the QR code after this 30 second window, that other use would need to request, via an input at the financial institution device, the generation of another separate QR code. As such, to avoid the QR code at a given financial institution device from always have the same data embedded in it because an intruder could scan the QR code and then try to login an hour later to that same financial institution device, the system disclosed herein requires the user to engage a button on the financial institution device (or a component of the financial institution device) to display the QR code. This engagement triggers a new QR code that has a unique nonce in it. When the mobile device connects to the scalable server, a validation occurs of the nonce scanned and presented to the scalable server. Only if the nonce matches will the system enable the connection.

In these embodiments, the user scans the QR code with the mobile device application. If the gaming system determines that the QR code is valid (i.e., not expired), the mobile device application will connect to the financial institution device. It should be appreciated that as long as the established connection between the mobile device and the financial institution device remains active, one or more servers and mobile device may communicate data, such as status updates, as necessary. It should be further appreciated that in association with the Wi-Fi or Bluetooth™ or mobile device network communications protocol described herein, any action requested by the user via the mobile device application does not require a new engagement between the mobile device and the financial institution device, such as a new scanning of the QR code to send such a requested action from the mobile device to the financial institution device (or to send a requested action from the mobile device to one or more servers and then from one or more servers to the financial institution device).

In certain embodiments which utilize the NFC communication protocol described herein, which utilize the Wi-Fi, cellular and/or Bluetooth™ communication protocols described herein and/or which utilize any other communication protocol described herein, any action requested by the user via the mobile device application requires a new engagement between the mobile device and the financial institution device (or component associated with the financial institution device), such as a new tap of the mobile device to a card reader or other designated location(s) of the financial institution device. In certain other embodiments which utilize the NFC communication protocol described herein, which utilize the Wi-Fi, cellular and/or Bluetooth™ communication protocols described herein and/or which utilize any other communication protocol described herein, certain actions requested by the user via the mobile device application requires a new engagement between the mobile device and the financial institution device, such as a new tap of the mobile device to a card reader or other designated location(s) of the financial institution device and other actions requested by the user via the mobile device application do not require any new engagement between the mobile device and the financial institution device.

Linking Mobile Device to EGM

In various embodiments, after transferring an amount of funds to a cashless wagering account from a financial institution account but prior to enabling a user or player to take any action related to such funds (such as initiating a transfer of such funds from a mobile device to an EGM), a pairing or linkage occurs between the mobile device and the EGM. The pairing or linkage between the mobile device and the EGM occurs via one or more applications being run or executed on the mobile device.

In certain embodiments, the mobile device application is the same mobile device application as described above in relation to transferring an amount of funds from a financial institution account to a cashless wagering account. In certain embodiment, the mobile device application utilized to operate with an EGM is a different mobile device application than the above-described mobile device application utilized to transfer an amount of funds from a financial account to a cashless wagering account. In these embodiments, the mobile device application is a location based digital wallet enabled application, such as a Passbook-enabled or Wallet-enabled application, which is accessible when the player enters a gaming establishment. In certain embodiments, the mobile device application is downloaded to the mobile device from an application store. In certain embodiments, the mobile device application is downloaded to the mobile device from one or more websites affiliated with the gaming establishment (which are accessible directly by the player and/or by a link opened when the player scans a QR code associated with the EGM).

In certain embodiments, after a player has opened an application on a mobile device and selected an action to be performed, such as selected to transfer part or all of the funds transferred from the financial institution account to an EGM, the system determines if the mobile device application is associated with an active authorization token previously created by the system. In these embodiments, an authorization token is a time-based token which expires after a designated period of time and which is associated with an additional level of player authentication beyond a player's application username and application password.

If the system determines that the application is not associated with an active authorization token previously created by the system, the mobile device application prompts the player to provide identifying information, such as a personal identification number or biometric identifier. The mobile device application stores the provided identifying information as mobile device encrypted data. Following the player providing identifying information, the mobile device application prompts the player to cause the mobile device to engage the EGM, such as prompting the player to tap the mobile device to a designated portion of the EGM. It should be appreciated that any reference herein to a player tapping the mobile device to a designated portion of the EGM may or may not include the player pressing a fingerprint scanner (if the mobile device is equipped with such a fingerprint scanner) while concurrently engaging the EGM. In other embodiments, the mobile device application verifies the identifying information of the player by communicating with a verification/authentication server over one or more wireless communication protocols, such as WiFi protocol, a cellular communication protocol (e.g., 3G or LTE), to obtain the active authorization token.

In certain embodiments, following the player causing the mobile device to engage the EGM (e.g., the player taps the mobile device to a card reader or other designated location (s) of the EGM), the mobile device application communicates, via a wireless communication protocol, the provided identifying information and the requested action to be performed to the EGM or to a component associated with the EGM. For example, upon the player tapping the mobile device to a card reader or other designated location(s) of the EGM (or otherwise moving the mobile device to within a designated distance of the card read or other designated locations(s) of the EGM), the mobile device application sends the identifying information and the requested action to a component of a gaming establishment management system located inside the EGM, such as a NexGen® player tracking component of an IGT Advantage® system.

Following the communication of the identifying information and the requested action to the EGM or a component associated with the EGM, the system determines if the identifying information is valid. For example, a designated gaming system component configured to operate with a player tracking system determines whether the identifying information is valid.

If the system determines that the identifying information is invalid, the system communicates an invalid identifying information response to the mobile device. For example, an identifying information status message is communicated to the mobile device which reports whether the identifying information is valid or invalid. The mobile device application then displays one or more messages regarding the invalid identifying information and prompts the player to provide identifying information, such as a personal identification number or biometric identifier. In certain such embodiments, if the mobile device receives a communication that the identifying information is invalid (or alternatively in association with the initial creation of a token) and if the mobile device includes a fingerprint scanner, the mobile device application prompts the player to press the fingerprint scanner while engaging the EGM, such as tapping the mobile device to a designated portion of the EGM.

On the other hand, if the system determines that the identifying information is valid, the system creates an authorization token. The system associates the authorization token with a timestamp of when the authorization token will expire. In certain embodiments, a cashless ticketing system includes a key distribution center which generates a session key to encrypt all cashless messages. The session key is rotated periodically at a configurable rate from 1 hour to 24 hours. In these embodiments, the system utilizes this session key to sign the token data and create a token. As such, the token time-to-live will be less than or equal to the session key rotation period. In other embodiments, such authorization tokens are managed utilizing software (and not a key distribution center).

In certain embodiments, the authorization token expires after a designated period of time as an additional level of security in the transfer of fund data between the EGM and the mobile device. Such a designated amount of time which an authorization token remains valid enables the player to move from one EGM to another EGM and, as described below, transfer funds to/from each EGM and a cashless wagering account, without having to reprovide such identifying information each time the player switches EGMs. That is, the mobile device application disclosed herein is configured to communicate with one or more EGMs (without having to reauthenticate itself repeatedly) during the designated amount of time which the authorization token remains value.

Following the creation of an authorization token, the system communicates the created authorization token to the mobile device, such as via one or more messages including the created authorization token, for storage by the mobile device application and proceeds with executing the below-described requested action and communicating a requested action response to the mobile device. For example, upon the creation of the authorization token, the component of a gaming establishment management system located inside the EGM, such as a NexGen® player tracking component of an IGT Advantage® system, communicates the created authorization token to the mobile device and proceeds with executing the requested action.

On the other hand, following a determination that the mobile device application is associated with a previously created and stored authentication token, the mobile device application prompts the player to cause the mobile device to engage the EGM, such as prompting the player to tap the mobile device to a designated portion of the EGM.

Following the player causing the mobile device to engage the EGM (e.g., the player taps the mobile device to a card reader or other designated location(s) of the EGM), the mobile device application communicates, via a wireless communication protocol, the previously stored authorization token and the requested action to be performed to the EGM or to a component associated with the EGM. For example, upon the player tapping the mobile device to a card reader or other designated location(s) of the EGM, the mobile device application sends the stored authorization token and the requested action (e.g., a transfer part or all of the funds transferred from the financial institution account to an EGM) to a component of a gaming establishment management system located inside the EGM, such as a NexGen® player tracking component of an IGT Advantage® system. NexGen® and IGT Advantage® are trademarks of IGT, the Applicant of the present application.

Following the communication of the stored authorization token and the requested action (e.g., a transfer part or all of the funds transferred from the financial institution account to an EGM) to the EGM or a component associated with the EGM, the system determines if the communicated authorization token is still valid. For example, a gaming system component configured to operate with a player tracking system determines whether the authorization token is valid (i.e., active and non-expired).

If the system determines that the communication authorization token is invalid, the system communicates an invalid authorization token response to the mobile device. The mobile device application then displays one or more messages regarding the invalid authorization token and prompts the player to provide identifying information, such as a personal identification number or biometric identifier, to obtain another authentication token.

On the other hand, if the system determines that the stored authorization token is valid, the system proceeds with executing the requested action. For example, upon the determination that the communicated authorization token is valid, the component of a gaming establishment management system located inside the EGM proceeds with executing the requested action of transferring part or all of the funds transferred from the financial institution account to an EGM and communicates a requested action response to the mobile device.

In certain embodiments, the system enables a player to interact with the EGM via the mobile device as described herein, without having to continually reengage the EGM with the mobile device for each requested action. In these embodiments, after initially establishing a secure connection with the EGM, subsequent interactions between the mobile device application and the EGM occur without any subsequent physical interaction between the mobile device and the EGM. That is, to avoid having the player retrieve the mobile device and repeat the physical operation of engaging the EGM with the mobile device, certain embodiments enable the player to execute one or more functions without repeating the above-described physical operation of engaging the EGM with the mobile device. In certain such embodiments, the mobile device application utilizes one or more display devices of the EGM to display to the player information and/or player selectable prompts which are otherwise displayable via the display device of the mobile device.

In certain other embodiments, for each interaction or requested action between the EGM and the mobile device described herein, the system requires the player to reengage the EGM with the mobile device to reestablish or confirm the pairing between the EGM and the mobile device. In certain other embodiments, for each interaction between the EGM and the mobile device that occur a designated amount of time after the last engagement of the EGM with the mobile device, the system requires the player to reengage the EGM with the mobile device to reestablish or confirm the pairing between the EGM and the mobile device.

Utilizing Paired Mobile Device Application at EGM

As described above, in various embodiments, after pairing the mobile device with the EGM, the mobile device application communicates one or more requested actions to be performed to the EGM. As described below, such requested actions generally pertain to an action associated with a player account, an action associated with an initiation of a transfer of monetary funds or an action associated with a transfer of promotional credits. It should be appreciated that while certain data or information pertaining to one or more of the below-described requested actions are communicated from an EGM to a mobile device, such data or information may additionally or alternatively be communicated: (i) from one or more servers to a mobile device via one or more wireless communication protocols, or (ii) from an EGM to one or more servers via one or more wireless communication protocols and then from one or more servers to a mobile device via one or more wireless communication protocols.

Monetary Fund Transfers

In certain embodiments, the action to be performed includes enabling the player to facilitate the transfer of funds, such as part or all of the funds transferred from the financial institution account, from the cashless wagering account to the EGM utilizing the mobile device application. In certain such embodiments, following the launching of the mobile device application, such as following the player selecting an image associated with an electronic casino loyalty account card stored via a digital wallet application or following the mobile device application retrieving data associated with a cashless wagering account stored via a digital wallet application, the mobile device application determines an amount of funds to be transferred from the cashless wagering account to the EGM.

In certain embodiments, the cashless wagering account is associated with one or more external accounts, such as one or more credit card accounts, one or more debit card accounts and/or one or more third-party maintained accounts (i.e., one or more PayPal® accounts). In certain embodiments, the cashless wagering account is associated with a gaming establishment or a group of gaming establishments, wherein the player establishes a cashless wagering account by a deposit of funds (such as at a kiosk as described below) to be subsequently utilized in association with the mobile device application.

In certain embodiments, the gaming system includes an automatic reload feature wherein if a cashless wagering account falls below a threshold level, the gaming system automatically transfers an amount from the external account and/or the gaming establishment account to the cashless wagering account. It should be appreciated that, in certain embodiments, the gaming system enables the player to enable or disable such an automatic reload feature.

Figure 4E:
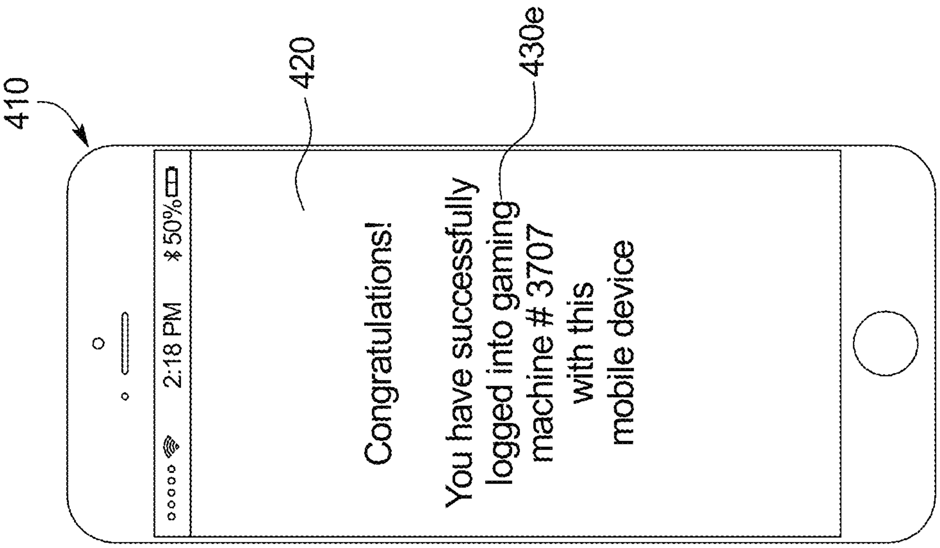
Figure 4D:
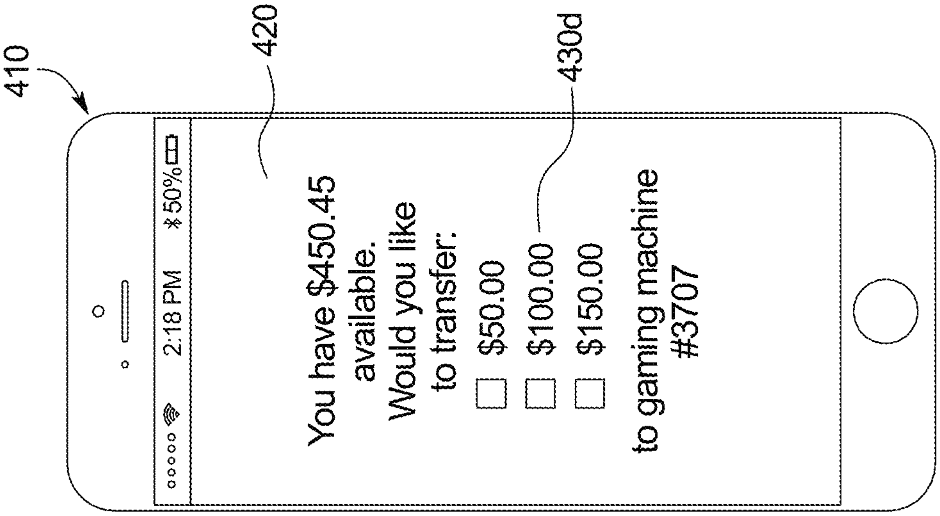

In one embodiment, the mobile device application enables the player to select an amount to be transferred from a listing of available amounts of funds to be transferred from the cashless wagering account to the EGM. For example, as seen in FIG. 4D, the mobile device application 420 of the mobile device 410 proceeds with displaying a listing of available, selectable amounts to be transferred from the cashless wagering account to the EGM 430*d*.

In different embodiments, the listing of available amounts to be transferred is previously selected by the player, selected by a gaming establishment or selected by a third-party. In certain embodiments, the mobile device application enables the player, a gaming establishment and/or a third-party to modify the listing of available amount of funds. In another embodiment, the mobile device application determines the listing of available amount of funds based on one or more characteristics associated with the player, such as the player's prior amounts transferred, the player's wagering history, and/or the player's status. In another embodiment, the mobile device application determines the listing of available amount of funds based on one or more characteristics associated with the EGM, such as based on the denomination, game type, minimum bet and/or maximum available wager amount of the EGM. In a first example, if the EGM is a collection of $1 poker games, then the listing of available amounts displayed are $40, $80, and $120. In a second example, if the EGM includes a penny slots game, then the listing of available amounts displayed are $20, $40, and $60.

In one embodiment, the mobile device application includes more than one listing of available amounts of funds to be transferred. In this embodiment, the mobile device application includes one listing of available amounts for an initial transfer of funds to the EGM for a gaming session (i.e., a first listing of amounts to initially establish a credit balance of an EGM) and another listing of available amounts for a subsequent transfer of funds to the EGM for an existing gaming session (i.e., a second listing of amounts to modify a previously established credit balance of the EGM).

In another embodiment, the mobile device application determines a default amount of funds to be transferred from the cashless wagering account to the EGM. In one such embodiment, the default amount of funds includes the last amount of funds transferred from the cashless wagering account to the EGM. In another such embodiment, the default amount of funds includes the last amount of funds transferred from the EGM to the cashless wagering account. The mobile device application displays to the player such a default amount of funds to be transferred.

In different embodiments, the default amount to be transferred is previously selected by the player, selected by a gaming establishment or selected by a third-party. In certain embodiments, the mobile device application enables the player, a gaming establishment and/or a third-party to modify the default amount of funds displayed by the mobile device application. In another embodiment, the mobile device application determines the default amount of funds based on one or more characteristics associated with the player, such as the player's prior amounts transferred, the player's wagering history, the player's credit balance, or the player's status.

In one embodiment, the mobile device application includes more than one default amount of funds to be transferred. In this embodiment, the mobile device application includes one default amount for an initial transfer of funds to the EGM for a gaming session (i.e., a first default amount to initially establish a credit balance of an EGM) and another default amount for a subsequent transfer of funds to the EGM for an existing gaming session (i.e., a second default amount to modify a previously established credit balance of the EGM).

In certain embodiments, following the determination of an amount of funds to be transferred from the cashless wagering account to the EGM, the mobile device application prompts the player to cause the mobile device to engage the EGM, such as prompting the player to tap the mobile device to a card reader or other designated location(s) of the EGM. After such engagement (or after the determination of an amount of funds to be transferred if no mobile device to EGM engagement is required), the mobile device application communicates, via a wireless communication protocol, data associated with the determined amount of funds to be transferred from the cashless wagering account to the EGM. The EGM proceeds with operating with a cashless wagering system to log the player into a cashless wagering account associated with the player and request the determined amount of funds to be transferred from the cashless wagering account to the EGM.

In another embodiment, rather than prompting the player to engage the EGM with the mobile device and the subsequent engagement of the EGM with the mobile device, the mobile device application automatically determines to transfer a default amount of funds, such as the last transferred amount of funds, from the cashless wagering account to the EGM. In this embodiment, the mobile device application communicates, via a wireless communication protocol, data associated with the determined amount of funds to be transferred from the cashless wagering account to the EGM. The EGM proceeds with operating with a cashless wagering system to log the player into a cashless wagering account associated with the player and request the determined amount of funds to be transferred from the cashless wagering account to the EGM.

Following the EGM requesting the determined amount of funds, the cashless wagering system determines whether to authorize the transfer of the determined amount of funds. If the cashless wagering system determines not to authorize the determined amount of funds, the cashless wagering system communicates a denial to the EGM and/or the mobile device application, wherein the EGM and/or mobile device application display a denial of fund transfer to the player.

On the other hand, if the cashless wagering system determines to authorize the determined amount of funds, the cashless wagering system updates the cashless wagering account associated with the player and communicates an authorization to the EGM. The cashless wagering system reduces a balance of the cashless wagering account by the reduced amount of funds. The EGM proceeds with updating a credit balance of the EGM to account for the determined amount of funds. In certain embodiments, the EGM further proceeds with communicating a transfer of funds confirmation to the mobile device, wherein the mobile device application displays a confirmation of the transfer of the amount of funds and/or the updated credit balance of the EGM. Such a transfer amount of funds is available for wagering by the player.

Accordingly, certain embodiments of the present disclosure utilize a mobile device as an interface of an electronic wallet or e-wallet to: (i) facilitate a transfer of funds, such as via the transfer of fund data, from a financial institution account, accessed via a financial institution device, to a cashless wagering account, and (ii) facilitate a further transfer of part or all of such funds, such as via the transfer of fund data, from the cashless wagering account to an EGM. These different mobile device facilitated transfers of funds or fund data occur without utilizing any physical forms of currency and without utilizing any physical ticket vouchers associated with any forms of currency to provide for a relatively more efficient gaming experience by users, a more personalized display of information to users while also overcoming certain of the known security concerns and labor cost concerns associated with both cash-based gaming and ticket voucher-based gaming. Such a configuration thus reduces the use of paper ticket vouchers (and any ink associated with the production of such paper ticket vouchers) to reduce the amount of waste produced by gaming establishments. Such a reduction in the amount of waste produced by gaming establishments provides an environmental benefit of implementing the system disclosed herein.

In certain embodiments, the action to be performed additionally or alternatively includes automatically transferring funds from a cashless wagering account to the EGM utilizing the mobile device application. In one such embodiment, the gaming system includes an automatic reload feature wherein if a credit balance of the EGM falls below a threshold level, the mobile device automatically transfers an amount of funds from the cashless wagering account to the EGM to facilitate additional wagering opportunities. It should be appreciated that, in certain embodiments, the gaming system enables the player to enable or disable such an automatic reload feature.

In certain embodiments, the action to be performed additionally or alternatively includes enabling the player to transfer funds from a virtual ticket voucher to the EGM utilizing the mobile device application. In these embodiments, the mobile device application is associated with one or more virtual ticket vouchers. Detailed examples of virtual ticket vouchers and wireless communication protocols are described in: (i) U.S. Published Patent Application No. 2013/0023339, entitled "METHODS AND APPARATUS FOR PROVIDING SECURE LOGON TO A GAMING MACHINE USING A MOBILE DEVICE"; (ii) U.S. Published Patent Application No. 2014/0162768, entitled "METHODS AND APPARATUS FOR PROVIDING SECURE LOGON TO A GAMING MACHINE USING A MOBILE DEVICE"; (iii) U.S. Pat. No. 8,956,222, entitled "MOBILE DEVICE INTERFACES AT AN ELECTRONIC GAMING MACHINE"; (iv) U.S. Published Patent Application No. 2013/0260889, entitled "EMAILING OR TEXTING AS COMMUNICATION BETWEEN MOBILE DEVICE AND EGM"; (v) U.S. Published Patent Application No. 2013/0065668, entitled "REDEMPTION OF VIRTUAL TICKETS USING A PORTABLE ELECTRONIC DEVICE"; (vi) U.S. Patent No. 2014/0121005, entitled "VIRTUAL TICKET-IN AND TICKET-OUT ON A GAMING MACHINE"; (vii) U.S. Published Patent Application No. 2013/0065678, entitled "RETROFIT DEVICES FOR PROVIDING VIRTUAL TICKET-IN AND TICKET-OUT ON A GAMING MACHINE"; (viii) U.S. Published Patent Application No. 2013/0065686, entitled "BILL ACCEPTORS AND PRINTERS FOR PROVIDING VIRTUAL TICKET-IN AND TICKET-OUT ON A GAMING MACHINE"; (ix) U.S. Pat. No. 8,961,306, entitled "FEEDBACK TO PLAYER OF DEVICE CONNECTION STATE"; (x) U.S. Pat. No. 8,613,668, entitled "DIRECTIONAL WIRELESS COMMUNICATION"; (xi) U.S. Published Patent Application No. 2013/0316808, entitled "METHOD AND APPARATUS FOR ENTERING SENSITIVE DATA FOR AN ELECTRONIC GAMING MACHINE FROM A PORTABLE ELECTRONIC DEVICE"; (xii) U.S. Pat. No. 8,622,836, entitled "USE OF WIRELESS SIGNAL STRENGTH TO DETERMINE CONNECTION"; and (xiii) U.S. Published Patent Application No. 2014/0248941, entitled "TRANSFER VERIFICATION OF MOBILE PAYMENTS"; the entire contents of each of which are incorporated herein by reference.

In certain embodiments, following the launching of the mobile device application, such as following the player selecting an image associated with an electronic casino loyalty account card stored via a digital wallet application, the mobile device application determines an amount of funds to be transferred to the EGM via the redemption of a virtual ticket voucher. In these embodiments, the mobile device application displays to the player images representing any virtual ticket vouchers associated with the mobile device. The mobile device application enables the player to select one or more images representing one or more virtual ticket vouchers associated with the mobile device. In these embodiments, similar to as described above with respect to the transfer of funds from a cashless wagering account to an EGM via a mobile device application, following the determination of which virtual ticket vouchers are to be transferred from the mobile device application to the EGM, the mobile device application prompts the player to cause the mobile device to engage the EGM. The mobile device application then communicates, via a wireless communication protocol, data associated with the selected virtual ticket voucher to be transferred. The EGM then communicates with one or more servers, such as a virtual ticket voucher server, to request the selected virtual ticket voucher (and more specifically the amount of funds associated with the selected virtual ticket voucher) be transferred from to the EGM. The server then determines whether to authorize the transfer of the selected virtual ticket voucher. If the transfer of the selected virtual ticket voucher is authorized: (i) the server updates a database of virtual ticket vouchers to reflect the redemption of the selected virtual ticket voucher, (ii) the EGM proceeds with updating a credit balance of the EGM to account for the amount of funds associated with the selected virtual ticket voucher, (iii) a transfer of funds confirmation is communicated to and displayed by the mobile device, and (iv) the amount of funds associated with the selected virtual ticket voucher are available for wagering by the player.

In certain other embodiments, following a full or partial depletion of a credit balance of the EGM, the EGM wirelessly communicates with the mobile device and queries the mobile device for the presence of any additional virtual ticket vouchers associated with the mobile device application. That is, when the credit balance of the EGM is empty, when the credit balance of the EGM has less than an amount of credits to repeat a previous wager, when the credit balance of the EGM has less credits than a minimum wager and/or when the credit balance of the EGM is below a designated threshold amount, the EGM communicates with the mobile device to determine if the mobile device application is associated with any additional available virtual ticket vouchers. If no additional virtual ticket vouchers are available, the EGM prompts the player to fund the credit balance of the EGM via another funding avenue disclosed herein. On the other hand, if at least one virtual ticket voucher is available, the EGM operates with the mobile device to facilitate the transfer of such at least one virtual ticket voucher to the EGM. In one such embodiment, the mobile device application communicates a listing of available virtual ticket vouchers to the EGM. The EGM proceeds with displaying the listing of available virtual ticket vouchers and enables the player to select one or more of the available virtual ticket vouchers to redeem. If the player selects one or more of the available virtual ticket vouchers, the EGM communicates the player's selection to the mobile device and the mobile device application proceeds with transferring such virtual ticket vouchers to the EGM as described herein. It should be appreciated that this embodiment enables a player to utilize a mobile device to facilitate the transfer funds, such as transfer of funds associated with one or more virtual ticket vouchers associated with the mobile device, without having to reengage the EGM with the mobile device.

In certain other embodiments, following a full or partial depletion of a credit balance of the EGM, the EGM wirelessly communicates with the mobile device (or communicates with one or more server which communicate with the EGM) and queries the mobile device for the presence of any additional virtual ticket vouchers associated with the mobile device application. If no additional virtual ticket vouchers are available, the EGM prompts the player to fund the credit balance of the EGM via another funding avenue disclosed herein. On the other hand, if at least one virtual ticket voucher is available, the mobile device application proceeds with automatically transferring the at least one virtual ticket voucher to the EGM as described herein. It should be appreciated that this embodiment enables a player to automatically transfer funds, such as transfer of funds associated with one or more virtual ticket vouchers associated with the mobile device, via the mobile device without the player having to reengage the EGM with the mobile device and without the player having to prompt either the EGM or the mobile device application to initiate such a transfer. It should be further appreciated that, in certain embodiments, the gaming system enables the player to enable or disable such an automatic "transfer of virtual ticket vouchers" feature.

In another embodiment, the EGM periodically communicates information to the mobile device regarding the status or amount of the credit balance of the EGM. In one such embodiment, based on this communicated information, the mobile device application determines when to alert the player to potentially transfer additional funds to the EGM utilizing the mobile device application. For example, the mobile device application could vibrate the mobile device, or create a sound, which alerts the player to view the mobile device application and select which additional funds to virtually insert into or load on the EGM. In another such embodiment, based on this communicated information, the mobile device application determines when to automatically transfer one or more additional and available virtual ticket vouchers to the EGM.

In certain embodiments, the action to be performed additionally or alternatively includes enabling the player to transfer funds from an EGM to a cashless wagering account facilitated by the mobile device application. That is, the system of this disclosure enables a player to transfer winnings from the EGM back to a cashless wagering account in association with the mobile device application. In certain such embodiments, following the launching of the mobile device application, such as following the player selecting an image associated with an electronic casino loyalty account card stored via a digital wallet application or following the mobile device application retrieving data associated with a cashless wagering account stored via a digital wallet application, and receiving one or more "cash out" inputs from the player, the mobile device application determines an amount of funds to be transferred from the EGM to the cashless wagering account.

In one embodiment, the mobile device application enables the player to select an amount to be transferred from the EGM to the cashless wagering account. In one such embodiment, the mobile device application enables the player to select a portion of the credit balance of the EGM (i.e., less than the entire credit balance) to be transferred from the EGM to the cashless wagering account. In various examples, the mobile device application automatically selects an amount of any winnings (i.e., an amount of the credit balance over the initial credit balance), an amount of winnings over a designated amount, an amount of a last win (i.e., an award amount associated with the last played game) or an amount of a last win over a designated amount (i.e., an award amount associated with the last played game over a designated award amount) to be transferred from the EGM to the cashless wagering account. In another embodiment, the mobile device application determines to transfer the credit balance of the EGM from the EGM to the cashless wagering account.

In certain embodiments, following the determination of an amount of funds to be transferred from the EGM to the cashless wagering account, the mobile device application prompts the player to cause the mobile device to engage the EGM, such as prompting the player to tap the mobile device to a card reader or other designated location(s) of the EGM.

In certain other embodiments, the system determines to facilitate the transfer funds from the EGM to the cashless wagering account independent of any input by the player and/or independent of any engagement between the mobile device and the EGM. In one such embodiment, if the system determines that no activity has occurred for a designated amount of time, as a precautionary measure, the system transfers the credit balance of the EGM from the EGM to the cashless wagering account used to transfer funds to the EGM. In another embodiment, if the system determines that another player is attempting to log onto the EGM, as a precautionary measure, the system transfers the credit balance of the EGM from the EGM to the cashless wagering account used to transfer funds to the EGM.

After any engagement between the mobile device and the EGM (or after the determination of an amount of funds to be transferred if no mobile device to EGM engagement is required), the mobile device application communicates, via a wireless communication protocol, data associated with the determined amount of funds to be transferred from the EGM to the cashless wagering account. The EGM proceeds with operating with a cashless wagering system to log the player into a cashless wagering account associated with the player (or confirm that the player remains logged into the cashless wagering account) and request the determined amount of funds to be transferred from the EGM to the cashless wagering account. Following such a request, the EGM proceeds with updating a credit balance of the EGM to account for the determined amount of funds transferred from the EGM to the cashless wagering account. The cashless wagering system additionally updates the cashless wagering account associated with the player (i.e., the cashless wagering system adds the determined amount of funds to the cashless wagering account) and communicates a confirmation to the EGM. The EGM further proceeds with communicating a transfer of funds confirmation to the mobile device, wherein the mobile device application displays a confirmation of the transfer of the amount of funds and/or the updated credit balance of the EGM. Such a transferred amount of funds is available in the player's cashless wagering account to be transferred to another EGM.

In certain embodiments, as described above, the cashless wagering account is associated with one or more external accounts, such as one or more credit card accounts, one or more debit card accounts and/or one or more third-party maintained accounts (i.e., one or more PayPal® accounts). In certain such embodiments, the gaming system enables a player to transfer an amount of funds to such an external account. For example, after a player utilizes the mobile device application to "cash out" an amount of winnings from the EGM to the cashless wagering account, the system enables the player to proceed with transferring, facilitated by the mobile device application, part or all of the amount of winnings to one or more external accounts.

In certain embodiments, the action to be performed additionally or alternatively includes automatically transferring funds from the EGM to a cashless wagering account utilizing the mobile device application. In one such embodiment, the gaming system includes an automatic "cash out" feature wherein if a credit balance of the EGM reaches above a threshold level, the mobile device automatically transfers an amount of funds from the EGM to the cashless wagering account. It should be appreciated that, in certain embodiments, the gaming system enables the player to enable or disable such an automatic "cash out" feature.

It should be appreciated that the EGM to/from mobile device fund data transfers of the present disclosure may occur in addition to or as an alternative from cash-based fund transfers and/or ticket voucher-based fund transfers. In one such embodiment, an EGM of the present disclosure is funded via any of a mobile device fund transfer, a cash-based fund transfer or a ticket voucher-based fund transfer. In another embodiment, a credit balance of an EGM of the present disclosure is cashed out via any of a mobile device fund transfer, a cash-based fund transfer or a ticket voucher-based fund transfer. In another embodiment, an EGM of the present disclosure is funded via a mobile device fund transfer or a cash-based fund transfer (but is not funded via any ticket voucher-based fund transfer). In another embodiment, a credit balance of an EGM of the present disclosure is cashed out via a mobile device fund transfer or a cash-based fund transfer (but is not cashed out via any ticket voucher-based fund transfer). In another embodiment, an EGM of the present disclosure is funded via a mobile device fund transfer or a ticket voucher-based fund transfer (but is not funded via any cash-based fund transfer). In another embodiment, a credit balance of an EGM of the present disclosure is cashed out via a mobile device fund transfer or a ticket voucher-based fund transfer (but is not cashed out via any cash-based fund transfer). In another embodiment, an EGM of the present disclosure is funded via a mobile device fund transfer (but is not funded via a cash-based fund transfer nor a ticket voucher-based fund transfer). In another embodiment, a credit balance of an EGM of the present disclosure is cashed out via a mobile device fund transfer (but is not cashed out via a cash-based fund transfer nor a ticket voucher-based fund transfer).

It should additionally be appreciated that the mobile device facilitated fund data transfers of the present disclosure may occur in addition to or as an alternative from cash-based fund transfers and/or ticket voucher-based fund transfers. In one such embodiment, an EGM of the present disclosure is funded via any of a mobile device fund transfer, a cash-based fund transfer or a ticket voucher-based fund transfer. In another embodiment, a credit balance of an EGM of the present disclosure is cashed out via any of a mobile device fund transfer, a cash-based fund transfer or a ticket voucher-based fund transfer. In another embodiment, an EGM of the present disclosure is funded via a mobile device fund transfer or a cash-based fund transfer (but is not funded via any ticket voucher-based fund transfer). In another embodiment, a credit balance of an EGM of the present disclosure is cashed out via a mobile device fund transfer or a cash-based fund transfer (but is not cashed out via any ticket voucher-based fund transfer). In another embodiment, an EGM of the present disclosure is funded via a mobile device fund transfer or a ticket voucher-based fund transfer (but is not funded via any cash-based fund transfer). In another embodiment, a credit balance of an EGM of the present disclosure is cashed out via a mobile device fund transfer or a ticket voucher-based fund transfer (but is not cashed out via any cash-based fund transfer). In another embodiment, an EGM of the present disclosure is funded via a mobile device fund transfer (but is not funded via a cash-based fund transfer nor a ticket voucher-based fund transfer). In another embodiment, a credit balance of an EGM of the present disclosure is cashed out via a mobile device fund transfer (but is not cashed out via a cash-based fund transfer nor a ticket voucher-based fund transfer).

Promotional Funds

In certain embodiments, the action to be performed additionally or alternatively includes transferring promotional funds from a player account to the EGM utilizing the mobile device application. In certain such embodiments, rather than utilizing physical promotional tickets which represent promotional and non-cashable credits (i.e., credits that may be used for free game play at an EGM but not otherwise convertible to money), the system utilizes an electronic or virtual ticket to represent promotional and non-cashable funds. In other such embodiments, rather than a player redeeming a physical promotional ticket at a kiosk or player services desk to cause an amount of promotional credits associated with the physical promotional ticket to be associated with a player tracking account, the system utilizes the mobile device application to redeem such promotional and non-cashable credits.

In certain embodiments, to obtain promotional funds, such as one or more electronic or virtual promotional tickets, a gaming establishment communicates data associated with promotional funds, such as an electronic or virtual promotional ticket, to the mobile device application. It should be appreciated that data associated with promotional funds, such as one or more electronic promotional tickets, could be communicated to the mobile devices of a plurality of players (e.g., a gaming establishment communicates to each player with a registered mobile device application a promotional ticket of promotional credits for free play of a new gaming machine the gaming establishment is currently promoting) and/or could be communicated to the mobile device of a particular player (e.g., a gaming establishment communicates to a promotional ticket of promotional credits to a valued player, wherein the promotional credits are redeemable for free play of any gaming machine in the gaming establishment).

In one such embodiment of communicating data associated with promotional funds, such as an electronic or virtual promotional ticket, to the mobile device application, one or more servers, such as a gaming establishment promotional server, send a message, such as an email or text message, to a player. The message includes a hyperlink and/or an attachment associated with the promotional funds, such as an electronic promotional ticket. When the player accesses the hyperlink and/or attachment via the player's mobile device, the mobile device activates or launches the mobile device application and the associated promotional funds, such as the associated electronic promotional ticket, are transferred to the mobile device application.

In another such embodiment of a gaming establishment communicating data associated with promotional funds, such as an electronic or virtual promotional ticket, to the mobile device application, one or more servers, such as a gaming establishment promotional server, send a message, such as an email or text message, to a player. The message of this embodiment does not include any hyperlink or attachment associated with any promotional funds, such as any electronic promotional tickets and thus no promotional funds are transferred to the mobile device application via this message. Rather, the message of this embodiment notifies the player that an account associated with the player has been credited with promotional funds. Such a message could include information associated with the available promotional funds (e.g., an amount of promotional credits, a promotional fund identifier, and/or a time window which the promotional funds may be redeemed). In this embodiment, when the mobile device application is activated or launched by a player, the mobile device application queries one or more servers, such as a gaming establishment promotional server, for any promotional funds available to the player. In this embodiment, the one or more servers transfer data associated with any promotional funds available to the player to the mobile device application.

In another such embodiment of communicating data associated with promotional funds, such as an electronic or virtual promotional ticket, to the mobile device application, one or more servers, such as a gaming establishment promotional server, send a message to the mobile device application to associate the mobile device application with promotional funds, such as one or more electronic or virtual promotional tickets. Such a message could be sent via email, text, tcp/ip or other suitable networking technology that communicates the promotional funds, such as the electronic or virtual promotional ticket and/or information associated with the electronic promotional ticket (e.g., an amount of promotional credits, a promotional ticket identifier, and/or a time window which the electronic promotional ticket may be redeemed) to the mobile device application.

In another such embodiment of communicating data associated with promotional funds, such as an electronic or virtual promotional ticket, to the mobile device application, when the mobile device application is activated or launched by a player, the mobile device application queries one or more servers, such as a gaming establishment promotional server, for any promotional funds, such as any electronic or virtual promotional tickets, available to the player. That is, in certain embodiments, following the launching of the mobile device application, such as following the player selecting an image associated with an electronic casino loyalty account card stored via a digital wallet application or following the mobile device application retrieving data associated with a player account stored via a digital wallet application, the system determines if any promotional funds are to be transferred to the EGM facilitated by the mobile device application. In this embodiment, if the server determines that promotional funds are available for the player, such as one or more electronic or virtual promotional tickets are available for the player and/or an amount of promotional funds are associated with the player's account, the server transfers data associated with any promotional funds available to the player to the mobile device application.

In another such embodiment of communicating data associated with promotional funds, such as an electronic or virtual promotional ticket, to the mobile device application, when the mobile device and/or mobile device application detects that the mobile device is located in a gaming establishment associated with the mobile device application, the mobile device application queries one or more servers, such as a gaming establishment promotional server, for any promotional funds, such as any electronic or virtual promotional tickets, available to the player and/or an amount of promotional funds associated with the player's account. In this embodiment, if the server determines that promotional funds are available for the player, such as one or more electronic or virtual promotional tickets are available and/or an amount of promotional funds are associated with the player's account, the server transfers data associated with any promotional funds available to the player to the mobile device application.

It should be appreciated that in certain of these embodiments of communicating data associated with promotional funds, such as an electronic or virtual promotional ticket, to the mobile device application, the promotional funds, such as the electronic or virtual promotional tickets, are stored by the mobile device in association with the mobile device application. For example, data communicated to the mobile device application includes the electronic promotional ticket which is redeemable at the EGM via the mobile device application. In other embodiments of communicating data associated with promotional funds, such as an electronic or virtual promotional ticket, to the mobile device application, the promotional funds, such as the electronic or virtual promotional tickets, are stored by one or more servers, such as a gaming establishment promotional server, but viewable via the mobile device application. For example, the electronic promotional ticket reside on the server, such as a gaming establishment promotional server, and the data communicated to the mobile device application includes identifying information associated the electronic promotional ticket (e.g., an amount of promotional credits, a promotional ticket identifier, and/or a time window which the electronic promotional ticket may be redeemed). Accordingly, in each of these embodiments, the mobile device stores, in association with the mobile device application, data associated with promotional funds, such as one or more electronic promotional tickets, to replace the use of and certain downsides or disadvantages associated with paper promotional tickets.

Following the mobile device application obtaining data associated with promotional funds, such as an electronic or virtual promotional ticket, to the mobile device application, the promotional funds, such as the electronic or virtual promotional tickets, are accessible by the mobile device in association with the mobile device application. That is, as described above in relation to how funds are facilitated to be transferred from a mobile device to an EGM via the mobile device application, promotional funds, such as one or more electronic promotional tickets (or promotional credits associated with such electronic promotional tickets), are viewable via the mobile device application and transferable from the mobile device to the EGM via the mobile device application.

Player Accounts

Figure 4F:
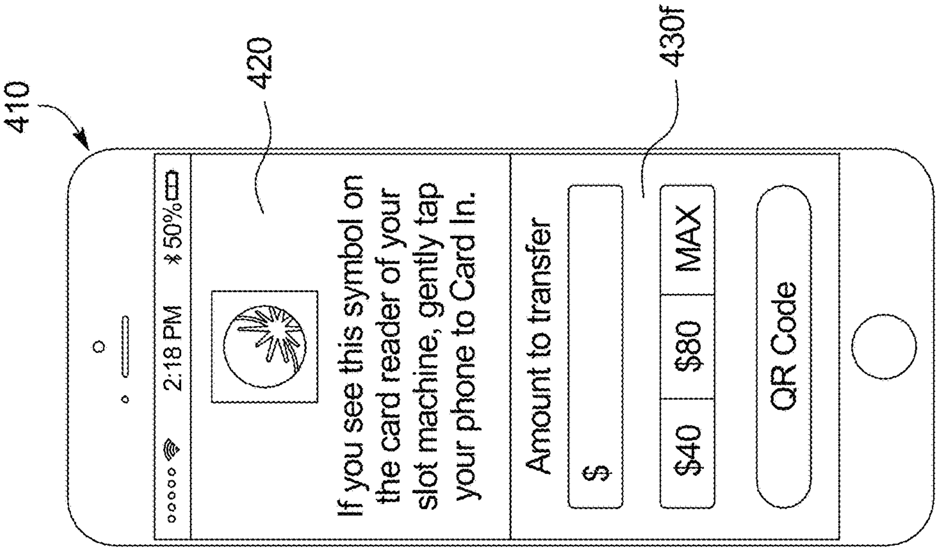

In certain embodiments, the action to be performed additionally or alternatively includes enabling the player to log into a casino loyalty account, such as a player tracking account, via a wireless communication protocol, utilizing the mobile device application. In certain such embodiments, following the launching of the mobile device application, such as following the player selecting an image associated with an electronic casino loyalty account card stored via a digital wallet application or following the mobile device application retrieving data associated with a player loyalty account stored via a digital wallet application, as seen in FIG. 4F, the mobile device application prompts the player to cause the mobile device to engage the EGM, such as prompting the player to tap the mobile device to a card reader or other designated location(s) of the EGM. After such engagement (or after the launching of the mobile device application if no mobile device to EGM engagement is required), the mobile device application communicates, via a wireless communication protocol, player loyalty account data stored by the mobile device to the EGM. The EGM proceeds with operating with a player loyalty system (i.e., a player tracking system) to log the player into the player loyalty account at that EGM. For example, as seen in FIG. 4E, the mobile device application 420 of the mobile device 410 proceeds with displaying a confirmation message that the player is logged into the player loyalty account 430*e*. Thereafter, any game play activity is associated with this player loyalty account (just as if the player would have inserted a physical player tracking card into a player tracking card reader of the EGM).

Figure 4G:
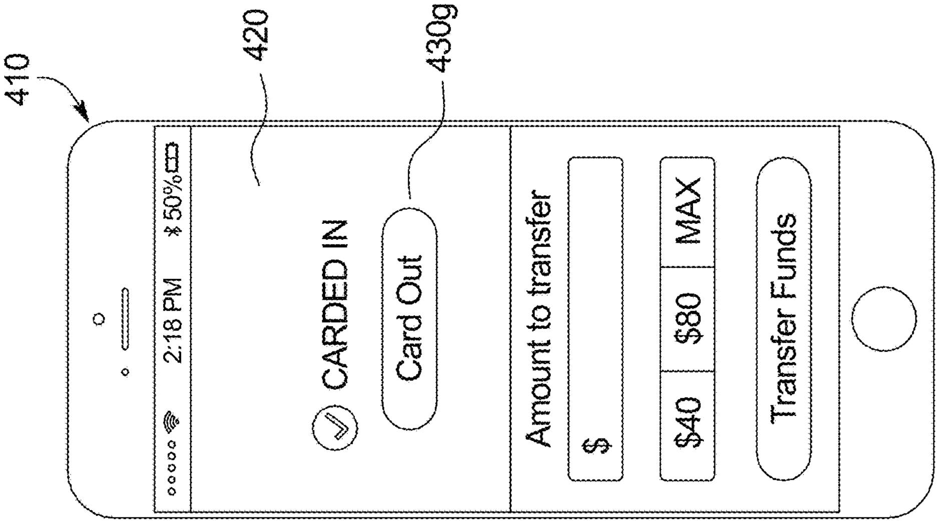

In certain embodiments, the action to be performed includes enabling the player to log out of a casino loyalty account, such as a player tracking account, via a wireless communication protocol, utilizing the mobile device application. In different embodiments, upon receiving one or more "cash out" inputs from the player, if the system determines that no activity has occurred for a designated amount of time, or if the system determines that another player is attempting to log onto the EGM, the mobile device application facilitates a logging out of the casino loyalty account. Specifically, the EGM proceeds with operating with a player loyalty system (i.e., a player tracking system) to log the player out of the player loyalty account at that EGM to complete the player tracking session at the EGM. For example, as seen in FIG. 4G, the mobile device application 420 of the mobile device 410 proceeds with displaying an icon 430*g* which enables the player to log out of the player loyalty account.

In certain embodiments, the action to be performed additionally or alternatively includes enabling the player to log into a cashless wagering account, via a wireless communication protocol, utilizing the mobile device application. In certain such embodiments, following the launching of the mobile device application, such as following the player selecting an image associated with an electronic casino loyalty account card stored via a digital wallet application or following the mobile device application retrieving data associated with a cashless wagering account stored via a digital wallet application, the mobile device application prompts the player to cause the mobile device to engage the EGM, such as prompting the player to tap the mobile device to a card reader or other designated location(s) of the EGM. After such engagement (or after the launching of the mobile device application if no mobile device to EGM engagement is required), the mobile device application communicates, via a wireless communication protocol, player cashless wagering account data stored by the mobile device to the EGM. The EGM proceeds with operating with a cashless wagering system to log the player into a cashless wagering account associated with the player. In one embodiment, the system determines a balance of the cashless wagering account associated with the player and causes the EGM to communicate, via one or more wireless communication protocols, the determined cashless wagering account balance to the mobile device. In another embodiment, the system determines a balance of the cashless wagering account associated with the player and communicates, via one or more wireless communication protocols, the determined cashless wagering account balance to the mobile device.

Securing Transactions Between Mobile Device and EGM

While the facilitation of the transfer of funds to and from an EGM via a mobile device has many advantages described herein, certain security concerns arise when transferring fund data wirelessly between an EGM and a mobile device (or between an EGM and the mobile device via one or more servers). For example, a malicious person may attempt to intercept such a wireless communication and steal the funds being transferred. Such a malicious person may devise electronics, such as an antenna or other electronics placed on or near the EGM to insert their mobile device between a "cash out" input and the mobile device engaging the EGM.

More specifically, when facilitating the transfer of deposited funds and/or an amount of winnings from the EGM to a cashless wagering account via the mobile device application, as described herein a player initiates an engagement of the EGM with the mobile device, such as tapping the mobile device to a card reader or other designated location(s) of the EGM. However, before the engagement of the EGM with the player's mobile device is complete, an intruder utilizes such devised electronics to beat the player to the completion of the engagement. In this example, when the player subsequently actuates a "cash out" button on the EGM, the EGM proceeds with transferring the amount of the credit balance of the mobile device of the intruder. Such a concern is also present when a player attempts to wirelessly transfer funds to an EGM via a mobile device wherein the intruder device intercepts such a transfer and reroutes the funds to the mobile device of the intruder.

In view of these security concerns, certain embodiments of the present disclosure utilize a time window, such as ten seconds, in association with one or more requested actions.

In one such embodiment, after receiving an initiation of an engagement of the EGM with the mobile device, the EGM assigns or otherwise associates a time window with such an engagement. If one mobile device is attempted to be paired with the EGM within the associated time window before an action is requested, the EGM determines that only one mobile device is communicating with the EGM and the EGM proceeds with executing the requested action, such as a requested fund transfer as described herein. On the other hand, if more than one mobile device is attempted to be paired with the EGM within the associated time window before an action is requested, the EGM determines that an intruder device may be present. In such a situation, the EGM cancels the requested action and/or prompts the player to reengage the EGM with the mobile device.

In another such embodiment, after receiving a requested action from the mobile device, the EGM assigns or otherwise associates a time window with such a requested action. Following the requested action, if one mobile device is attempted to be paired with the EGM within the associated time window, the EGM determines that only one mobile device is communicating with the EGM and the EGM proceeds with executing the requested action, such as a requested fund transfer as described herein. On the other hand, following the requested action, if more than one mobile device is attempted to be paired with the EGM within the associated time window, the EGM determines that an intruder device may be present. In such a situation, the EGM cancels the requested action and/or prompts the player to reengage the EGM with the mobile device.

It should be appreciated that in addition to thwarting an isolated attempt by an intruder to intercept a wireless fund transfer, the system is configured to identify if a device is involved in multiple attempted engagements with an EGM over a designated threshold or time window. In this embodiment, such a device may be prohibited from being involved in further wireless fund transfers. For example, if multiple engagements are detected involving a single device within a twenty-four hour period, then that mobile device could be banned from participating in any future engagements. Alternatively, that device could be prevented from participating in engagements for a designated period of time, such as a cooling-off period.

Mobile Device/EGM Communications

As indicated above, in various embodiments, the insertion and removal of an electronic player tracking card (i.e., the logging in and logging out of the player from the player tracking system), and/or the facilitation of the transfer of funds between a cashless wagering account maintained for a player and an EGM is accomplished by one or more wireless communication protocols between the EGM and the mobile device.

In certain embodiments, the communication with the mobile device can occur through one or more wireless interfaces of the EGM. Such wireless interfaces are configured to receive information, such as information associated with one or more accounts and instructions to initiate a transfer of funds to and from a cashless wagering account and the EGM utilizing a mobile device.

In one embodiment, the wireless interface is integrated into the cabinet of the EGM and the EGM processor is configured to communicate directly with and send control commands to the wireless interface. In another embodiment, the wireless interface is integrated into a device mounted to and/or within the gaming machine cabinet, such as a card reader or a player tracking unit. In certain embodiments where the wireless interface is embedded in a secondary device, such as a player tracking unit, the EGM processor sends control commands to control the wireless interface via a secondary controller, such as a player tracking controller.

In certain embodiments disclosed herein, the wireless interface implements a near field communication (NFC) protocol to facilitate the insertion and removal of an electronic player tracking card (i.e., the logging in and logging out of the player from the player tracking system) and/or the transfer of funds between a cashless wagering account maintained for a player and an EGM.

NFC is typically used for communication distances of 4 cm or less. NFC, enables for simplified transactions, data exchange, and connections with a touch. Formed in 2004, the Near Field Communication Forum (NFC Forum) promotes sharing, pairing, and transactions between NFC devices and develops and certifies device compliance with NFC standards. NFC's short range helps keep encrypted identity documents private. Thus, as described above, a tap of a mobile device with an NFC chip to an EGM can cause a transfer of funds to an EGM and/or serve as keycard or ID card for a loyalty program.

Figure 5A:
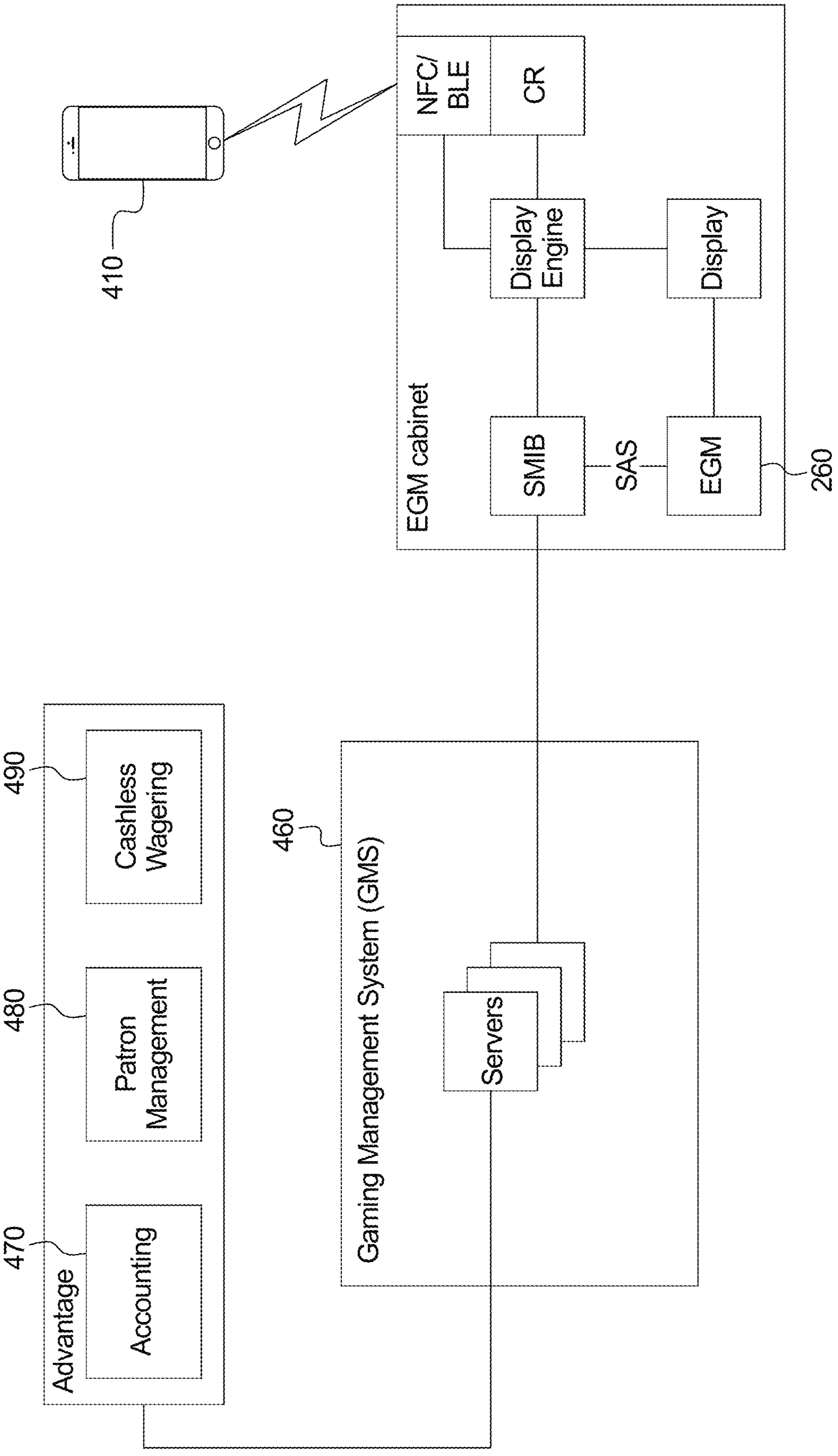
FIGS. 5A and 5B are example wireless configurations of the system of the present disclosure.

As seen in FIG. 5A, utilizing an NFC implementation, the mobile device 410 communicates with the EGM 260 via an NFC protocol. As seen in FIG. 5A, the EGM housing (which includes the EGM 260 and various system components) operates with a gaming establishment management system 460 which operates with one or more servers, such as one or more accounting servers 470, patron management servers 480 and cashless wagering servers 490 of the above-described cashless wagering system 250.

In certain embodiments which utilize the NFC implementation, the mobile device application registers a mobile device application with one or more processors of the mobile device. In these embodiments, when the mobile device is detected by an NFC reader of a component of a gaming establishment management system located inside the EGM, such as a NexGen® player tracking component of an IGT Advantage® system, the component of the gaming establishment management system located inside the EGM communicates one or more data messages, such as a Select Application Protocol Data Unit (APDU) to the mobile device (or to one or more servers which then communicate such data messages to the mobile device). Such data messages are commands generated by the component of the gaming establishment management system located inside the EGM when the mobile device is detected in the NFC reader field. The processor of the mobile device communicates the data message to the mobile device application. The mobile device application responds, such as communicating a triggering message, and a communication channel is opened between the component of the gaming establishment management system located inside the EGM and the mobile device application (or between the component of the gaming establishment management system located inside the EGM, one or more servers and the mobile device application). This open communication channel enables the component of the gaming establishment management system located inside the EGM to send, though the NFC reader, additional data messages to the mobile device (or to the mobile device via one or more servers) which are responded to by the mobile device application of the mobile device.

It should be appreciated that as long as the mobile device remains within the NFC field, the component of the gaming establishment management system located inside the EGM is configured to communicate with the mobile device and send data, such as status updates, as necessary. However, once the mobile device is removed from the NFC field, the communication channel is closed and such status updates must be discontinued.

In various embodiments, in addition to the Select APDU, the component of the gaming establishment management system located inside the EGM is configured to communicate other commands to the mobile device. Such commands include the following data messages:

(i) a Card Inserted APDU which confirms that the player is logged into the player tracking system (e.g., an electronic player tracking card is associated with the EGM);

(ii) a Card Removed APDU which confirms that the player is logged out of the player tracking system (e.g., an electronic player tracking card is removed or no longer associated with the EGM);

(iii) a New Card Scanned APDU which reports that a physical card is detected in the player tracking card reader;

(iv) a PIN Status APDU which reports a personal identification number verification status;

(v) a Transfer Status APDU which reports a transfer request status;

(vi) a Balance Status APDU which reports a balance request status; and (vii) a Disconnect APDU which informs the mobile device application to drop the connection with the EGM, such as when the EGM cashout button is pressed, when the gaming system determines that the player card is "abandoned" or when the EGM credit balance reaches zero and remains at zero for a designated period of time, such as thirty seconds.

In other embodiments, the wireless interface implements a Wi-Fi, cellular and/or Bluetooth™ communications protocol to facilitate the insertion and removal of an electronic player tracking card (i.e., the logging in and logging out of the player from the player tracking system) and/or the transfer of funds between a cashless wagering account maintained for a player and an EGM.

In such embodiments, Bluetooth™ pairing occurs when two Bluetooth devices agree to communicate with each other and establish a connection. In order to pair two Bluetooth wireless devices, a password (passkey) is exchanged between the two devices. The Passkey is a code shared by both Bluetooth devices, which proves that both users have agreed to pair with each other. After the passkey code is exchanged, an encrypted communication can be set up between the pair devices. In Wi-Fi paring, every pairing can be set up with WPA2 encryption or another type of encryption scheme to keep the transfer private. Wi-Fi Direct is an example of a protocol that can be used to establish point-to-point communications between two Wi-Fi devices. The protocol enables for a Wi-Fi device pair directly with another without having to first join a local network.

Figure 5B:
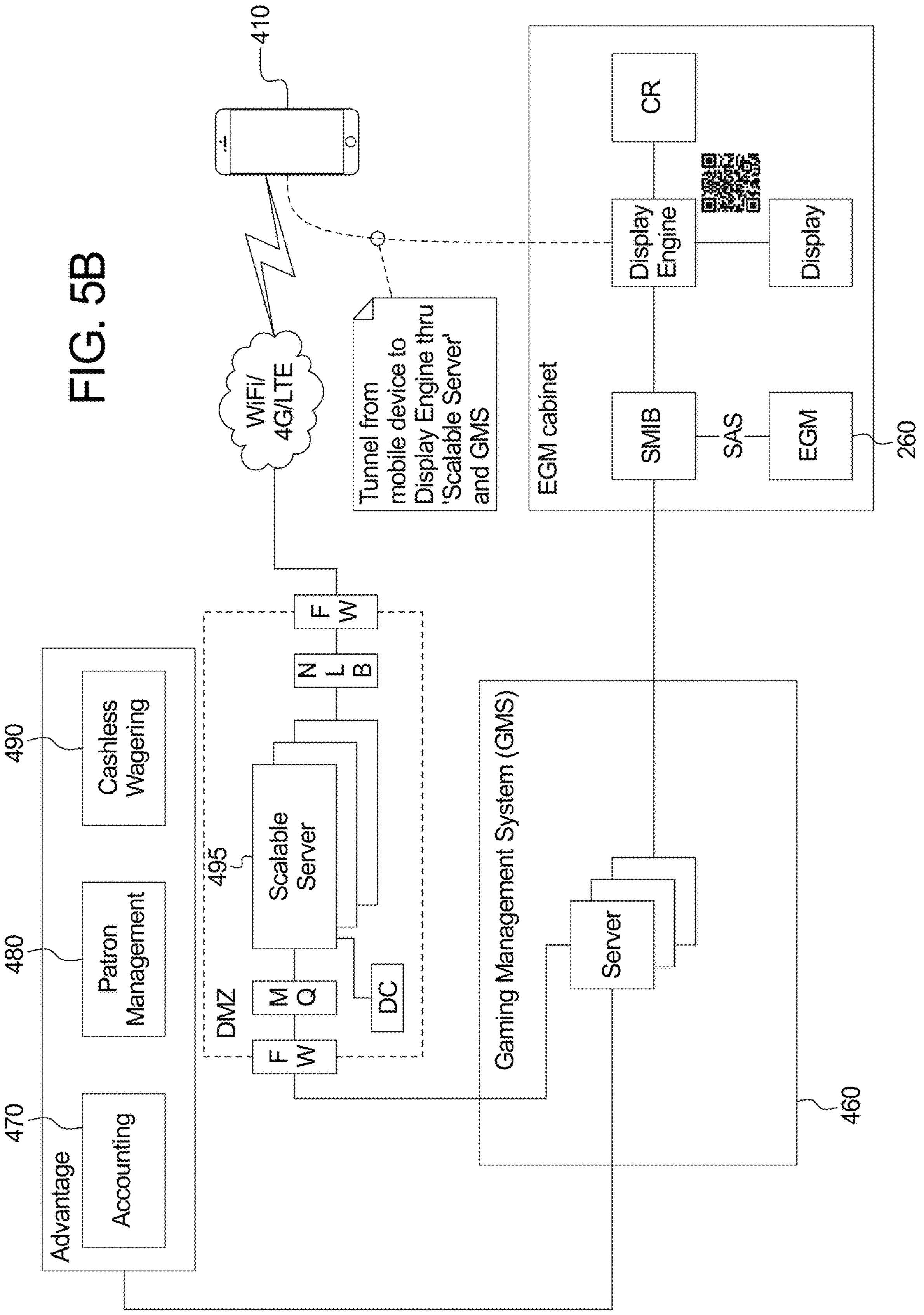
Figure 6:
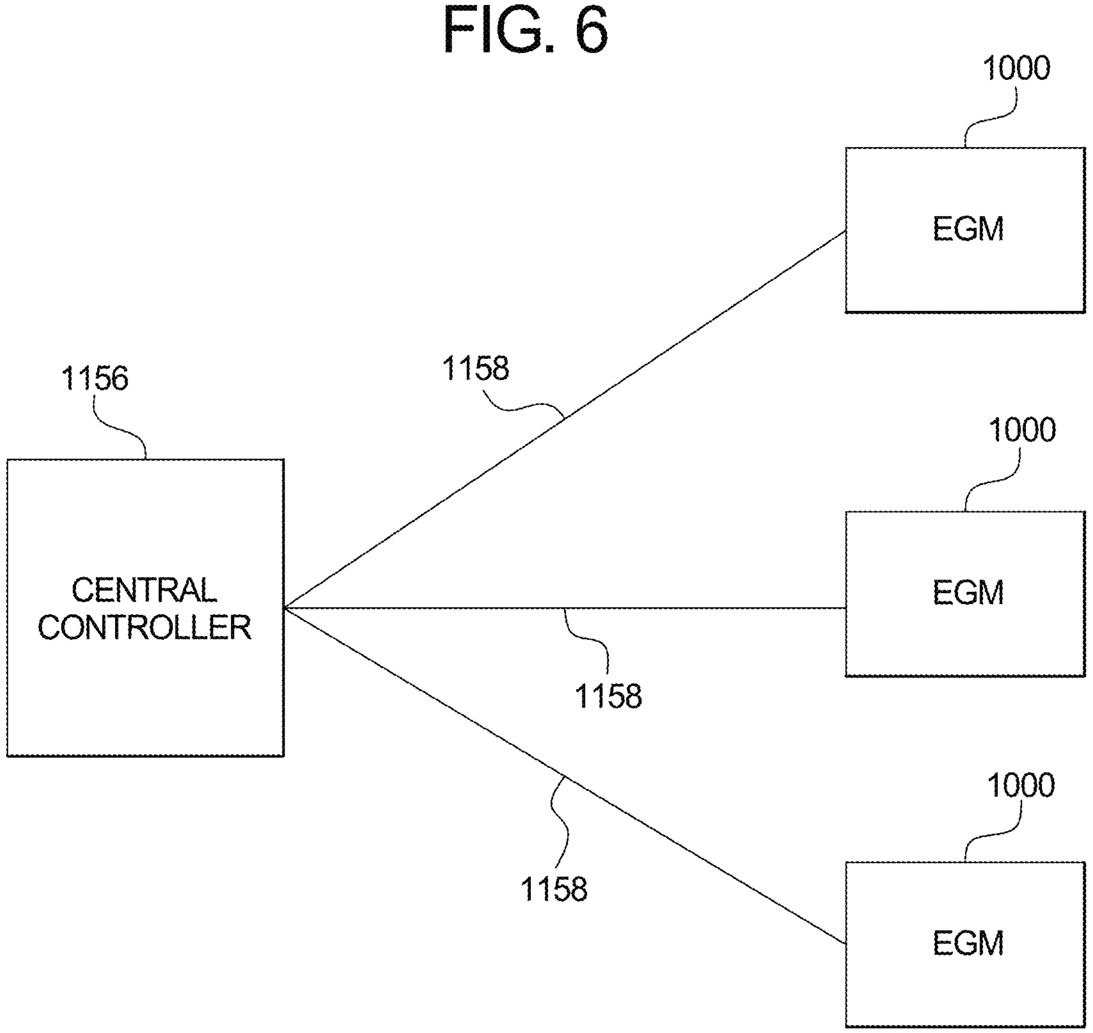
FIG. 6 is a schematic block diagram of one embodiment of a network configuration of the gaming system disclosed herein.

As seen in FIG. 5B, utilizing a Wi-Fi/Bluetooth™ communications protocol implementation, the mobile device 410 communicates with the EGM 260 via a Wi-Fi/Bluetooth™ communications protocol. As seen in FIG. 5B, the EGM housing (which includes the EGM 260 and various system components) operates with a gaming establishment management system 460 which operates with one or more servers, such as one or more accounting servers 470, patron management servers 480 and cashless wagering servers 490 of the above-described cashless wagering system 250.

It should be appreciated that Wi-Fi, cellular or Bluetooth™ communication protocols can be used in lieu of or in combination with NFC. For instance, an NFC communication can be used to instantiate a Wi-Fi or Bluetooth™ communication between the EGM, zero, one or more servers and a mobile device, such as secure pairing using one of these protocols. That is, in one embodiment, an NFC interface on an EGM can be used to set-up a higher speed communication between the EGM, zero, one or more servers and the NFC enabled mobile device. The higher speed communication rates can be used for expanded content sharing. For instance, an NFC and Bluetooth enabled EGM can be tapped by an NFC and Bluetooth enabled mobile device for instant Bluetooth pairing between the devices and zero, one or more servers. Instant Bluetooth pairing between an EGM, an NFC enabled mobile device and zero, one or more servers, can save searching, waiting, and entering codes. In another example, an EGM can be configured as an NFC enabled router, such as a router supporting a Wi-Fi communication standard. Tapping an NFC enabled mobile device to an NFC enabled and Wi-Fi enabled EGM can be used to establish a Wi-Fi connection between the devices and zero, one or more servers.

In certain embodiments which implement a Wi-Fi, cellular and/or Bluetooth™ communications protocol, the gaming system utilizes one or more QR codes generated by the EGM to facilitate the communication of data between the mobile device and the gaming system. In such embodiments, the QR code is used to identify the EGM that is displaying the QR code to identify the server to which the mobile device should connect. It should be appreciated that the QR code enables the gaming system to establish a secure tunnel or path from the mobile device to the gaming establishment's Wi-Fi network and then to the gaming establishment's wired network and finally to the EGM. In these embodiments, a communication tunnel wrapper (i.e., a Wi-Fi/Bluetooth™ tunnel wrapper) is utilized to establish a connection between the gaming system and the mobile device and to transport any data messages described herein between the EGM, zero, one or more servers and the mobile device.

More specifically, in certain embodiments, the player requests, via an input at the EGM and/or the mobile device, the generation of a QR code by the EGM. In response to the player's request, the EGM or a player tracking unit displays a QR code. In certain embodiments, the QR code includes a nonce which prevents a third-party (e.g., another player) from sniping the player's login attempt. Such an on-demand QR code remains valid for a designated amount of time such that if the player does not scan the QR code within the designated amount of time, another QR code is necessary to be scanned to connect the mobile device to the EGM.

Figure 4H:
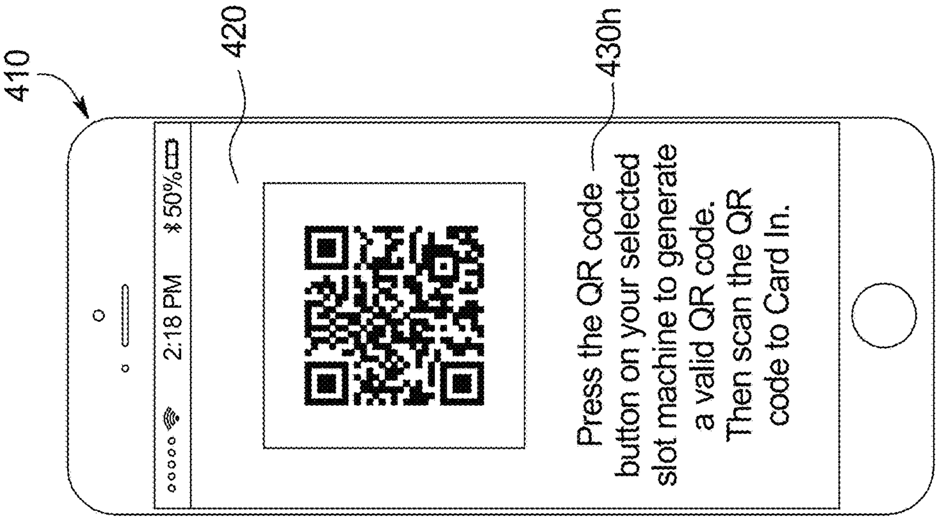

In these embodiments, as seen in FIG. 4H, the player scans the QR code with the mobile device application. If the gaming system determines that the QR code is valid (i.e., not expired), the mobile device application will connect to the gaming system. It should be appreciated that as long as the established connection between the mobile device and the gaming system remains active, one or more gaming system servers and mobile device may communicate data, such as status updates, as necessary. It should be further appreciated that in association with the Wi-Fi or Bluetooth™ or mobile device network communications protocol described herein, any action requested by the player via the mobile device application does not require a new engagement between the mobile device and the EGM, such as a new scanning of the QR code to send such a requested action from the mobile device to the EGM (or to send a requested action from the mobile device to one or more servers and then from one or more servers to the EGM).

In certain embodiments, following the scanning of a valid QR code, the mobile device application connects to one or more servers. Such servers use websockets secured with a transport layer security protocol or other similar mechanisms. In one such embodiment, the servers operate with one or more translators and zero, one or more components of the gaming system, similarly using websockets secured with a transport layer security protocol, to communicate data to the EGM or a component of the EGM. It should be appreciated that in certain embodiments, one or more of the servers are scalable servers configured to scale to accept connections from thousands of mobile devices.

In certain embodiments, after establishing a connection with one or more servers, the mobile device application transmits a connect command to the gaming system. In response to receiving a connect command from the mobile device, the gaming system sends an APDU Select Application Request to the mobile device. This APDU serves to encapsulate APDU commands between the gaming system and the mobile device. In these embodiments, if the mobile device application does not receive this APDU within a designated period of time, such as within five seconds, the mobile device application displays an error message to the player and directs the player to rescan the QR code.

In addition to the connect command communicated from the mobile device application to the gaming system, the mobile device application of these embodiments is configured to send a disconnect command to the gaming system. Such a disconnect command functions to tear-down the connection to the server. That is, after the server receives the disconnect command from the mobile device application, the server sends this disconnect command to the translator and close the websocket to the mobile device application. In these embodiments, if the websocket is not closed or otherwise terminated within a designated period of time, such as five seconds, the mobile device application may retry communicating this command or close the websocket. It should be appreciated that if the mobile device connection is severed before this command is received by the gaming system, the sever sends this command on behalf of the mobile device application;

In another embodiment, the mobile device application is configured to send a trigger command to the gaming system, such as a component of the gaming establishment management system located inside the EGM. In this embodiment, the trigger command is associated with an action requested by the player, such as a transfer of funds to or from the EGM. In such embodiments, when the gaming system receives the trigger command from the mobile device application, the gaming system will communicate the appropriate APDU request to the mobile device application. If the mobile device application does not receive this APDU within a designated amount of time, such as five seconds, the mobile device application will display an error message to the player and enable the player to retry the requested action.

In other embodiments, the mobile device application communicates with the gaming system through a tunnel established over the mobile device's Wi-FI network or the mobile device's network connection. In such embodiments, the mobile device application will connect to one or more gaming system servers which use websockets secured with a transport layer security protocol. The gaming system server operates with one or more translators, similarly using websockets secured with a transport layer security protocol to communicate data to the EGM or a component of the EGM.

In certain embodiments which utilize the NFC communication protocol described herein, which utilize the Wi-Fi, cellular and/or Bluetooth™ communication protocols described herein and/or which utilize any other communication protocol described herein, any action requested by the player via the mobile device application requires a new engagement between the mobile device and the EGM, such as a new tap of the mobile device to a card reader or other designated location(s) of the EGM. In certain other embodiments which utilize the NFC communication protocol described herein, which utilize the Wi-Fi, cellular and/or Bluetooth™ communication protocols described herein and/or which utilize any other communication protocol described herein, certain actions requested by the player via the mobile device application requires a new engagement between the mobile device and the EGM, such as a new tap of the mobile device to a card reader or other designated location(s) of the EGM and other actions requested by the player via the mobile device application do not require any new engagement between the mobile device and the EGM.

Funding Accounts

As indicated above, in various embodiments, the electronic transfer of funds to an EGM is facilitated by a mobile device application and drawn from one or more accounts, such as a cashless wagering account. In certain of these embodiments, as described above, a cashless wagering account is funded via a transfer of funds or fund data from a financial institution device. In certain of these embodiments, as described above, a cashless wagering account is associated with a third-party account, such as a bank account or a credit card account, from which funds are drawn from to fund the cashless wagering account.

In certain embodiments, in addition to the above-described funding of a cashless wagering account via a transfer of funds or fund data from a financial institution device, the funds to be wagered are deposited in a cashless wagering account via a kiosk that accepts money. In certain embodiments, a player that has an amount of cash utilizes a kiosk to convert the cash to an amount deposited into a cashless wagering account (which is subsequently transferred to an EGM utilizing a mobile device application). In other embodiments, a player that has an amount of cash utilizes a kiosk to convert the cash to a balance of a mobile device application (which is subsequently transferred to an EGM utilizing the mobile device application). In other embodiments, the funds to be wagered are deposited in a cashless wagering account via a kiosk that accepts printed ticket vouchers. In certain embodiments, a player that has one or more printed ticket vouchers utilizes a kiosk to convert the printed ticket voucher to an amount deposited into a cashless wagering account (which is subsequently transferred to an EGM utilizing a mobile device application). In other embodiments, a player that has one or more printed ticket vouchers utilizes a kiosk to convert the printed ticket vouchers to a balance of a mobile device application (which is subsequently transferred to an EGM utilizing the mobile device application).

In certain embodiments, in addition to the above-described funding of a cashless wagering account via a transfer of funds or fund data from a financial institution device, the funds to be wagered are deposited in a cashless wagering account via the EGM. In certain embodiments, a player that has an amount of cash utilizes an EGM to convert the cash to an amount deposited into a cashless wagering account (which is subsequently transferred back to the EGM utilizing a mobile device application). In other embodiments, a player that has an amount of cash utilizes an EGM to convert the cash to a balance of a mobile device application (which is subsequently transferred back to the EGM utilizing the mobile device application). In other embodiments, the funds to be wagered are deposited in a cashless wagering account via an EGM that accepts printed ticket vouchers. In certain embodiments, a player that has one or more printed ticket vouchers utilizes an EGM to convert the printed ticket voucher to an amount deposited into a cashless wagering account (which is subsequently transferred back to the EGM utilizing a mobile device application). In other embodiments, a player that has one or more printed ticker vouchers utilizes an EGM to convert the printed ticket vouchers to a balance of a mobile device application (which is subsequently transferred back to the EGM utilizing the mobile device application).

In certain embodiments, in addition to the above-described funding of a cashless wagering account via a transfer of funds or fund data from a financial institution device, the funds to be wagered are deposited in a cashless wagering account via a gaming establishment interface, such as a casino desk. In certain embodiments, a player that has an amount of cash utilizes a gaming establishment interface, such as a casino desk to convert the cash to an amount deposited into a cashless wagering account (which is subsequently transferred to an EGM utilizing a mobile device application). In other embodiments, a player that has an amount of cash utilizes a gaming establishment interface, such as a casino desk, to convert the cash to a balance of a mobile device application (which is subsequently transferred to an EGM utilizing the mobile device application). In other embodiments, the funds to be wagered are deposited in a cashless wagering account via a gaming establishment interface that accepts printed ticket vouchers. In certain embodiments, a player that has one or more printed ticket vouchers utilizes a gaming establishment interface to convert the printed ticket voucher to an amount deposited into a cashless wagering account (which is subsequently transferred to an EGM utilizing a mobile device application). In other embodiments, a player that has one or more printed ticker vouchers utilizes a gaming establishment interface to convert the printed ticket vouchers to a balance of a mobile device application (which is subsequently transferred to an EGM utilizing the mobile device application).

In one or more of these embodiments which utilize a kiosk, an EGM and/or a gaming establishment interface enable a player to anonymously deposit an amount of money for wagering. In one or more of these embodiments which utilize a kiosk, an EGM and/or a gaming establishment interface enable a player to log into one or more player accounts and then deposit an amount of money for wagering.

More specifically and utilizing the example of a kiosk, in one embodiment, the player wirelessly pairs or otherwise connects a mobile device. In one example embodiment, the player moves the mobile device into the range of a wireless receiver of the kiosk. The kiosk and the launched or activated mobile device application of the mobile device negotiate a secure, authenticated connection with the proper functionality, versions and security settings. It should be appreciated that the kiosk wirelessly connects with the mobile device running the mobile device application in the same or similar fashion to how a mobile device is paired or connected with an EGM as described above.

After connecting the mobile device to the kiosk, the kiosk prompts the player to deposit an amount of funds into the kiosk. In one such embodiment, the kiosk prompts the player to insert one or more bills into a bill acceptor of the kiosk. In another such embodiment, the kiosk additionally or alternatively prompts the player to deposit a physical ticket voucher (associated with an amount of funds) into the kiosk. In another such embodiment, the kiosk additionally or alternatively prompts the player to deposit a card associated with an external account, such as a credit card or debit card into the kiosk. In another such embodiment, the kiosk additionally or alternatively prompts the player to enter information associated with an external account, such as a credit card account, a PayPal® account or debit card account into the kiosk. In another such embodiment, the kiosk additionally or alternatively prompts the player to deposit an amount of funds into the kiosk using a mobile device electronic fund transfer, such as using Apple Pay™ or Android Pay™.

In one embodiment, after a first amount of funds is accepted, such as after a first bill or unit of currency is accepted, by the kiosk, the kiosk and/or the mobile device application enable the player to transfer the deposited amount of funds (e.g., a “Load Phone Now” button) or continue to deposit additional amounts of funds with the kiosk. In another embodiment, for each amount of funds accepted by the kiosk, such as for each bill or unit of currency accepted by the kiosk, a virtual ticket voucher is created, as described below, and transferred first to the kiosk and then to the mobile device application in communication with the kiosk.

In certain embodiments, upon receiving an amount of funds from the player and the player indicating to transfer the deposited amount of funds in association with the mobile device application, the kiosk communicates with one or more servers, such as a cashless wagering server, to transfer an amount of money to a cashless wagering account (to be drawn upon from the mobile device application as described herein).

In another such embodiment, upon receiving an amount of funds from the player and the player indicating to transfer the deposited amount of funds in association with the mobile device application, the kiosk transfers an amount of money wirelessly to the mobile device to establish a mobile device application balance (to be transferred to an EGM for subsequent wagering).

In another such embodiment, upon receiving an amount of funds from the player and the player indicating to transfer the deposited amount of funds in association with the mobile device application, the kiosk communicates with one or more servers, such as a virtual ticket voucher server, to create a virtual ticket voucher associated with the amount of received currency. The system disclosed herein transfers the created virtual ticket voucher to the mobile device application (to be subsequently transferred to the EGM for wagering).

In one such embodiment including the deposit of an amount of funds at a kiosk resulting in the creation of a virtual ticket voucher wirelessly transferred to a mobile device, the virtual ticket voucher is encrypted with a private key only known, for security reasons, to the mobile device application. In this embodiment, one or more servers, such as a virtual ticket voucher server, encrypt the virtual ticket voucher using a public key for the mobile device application (or player account), which ensures that the only entity that can decrypt the virtual ticket voucher is the mobile device application running on the mobile device. That is, the mobile device application has a private key and a public key, wherein the mobile device application shares the public key with one or more servers, such as a virtual ticket voucher server. When the server needs to create a new virtual ticket voucher, the server encrypts the virtual ticket voucher with the public key for the mobile device application such that only the mobile device application can use the virtual ticket voucher since the mobile device application has the private key (thus providing additional security by preventing others from copying the virtual ticket voucher information and attempting to use the created virtual ticket voucher).

In another such embodiment including the deposit of an amount of funds at a kiosk resulting in the creation of a virtual ticket voucher wirelessly transferred to a mobile device, the virtual ticket voucher is additionally or alternatively digitally signed by the server to enable the mobile device application to verify that any received virtual ticket voucher was issued by the correct server. In this embodiment, the created virtual ticket voucher is transferred from the server to the kiosk over a secure communications channel and then further transferred by the kiosk to the mobile device application over a secure wireless communications channel. Such an embodiment relies upon secure transport communications between the kiosk and the server, secure communications between the kiosk and the mobile device application and the server's digital signature that cannot be changed by any intermediaries between the server and the mobile device application.

In another such embodiment including the deposit of an amount of funds at a kiosk resulting in the creation of a virtual ticket voucher wirelessly transferred to a mobile device, the virtual ticket voucher is alternatively transferred from the server to the kiosk over a secure communications channel and then further transferred by the kiosk to the mobile device application over a secure wireless communications channel without encryption or digital signatures. Such an embodiment relies upon secure transport communications between the kiosk and the server, and secure communications between the kiosk and the mobile device application wherein the server trusts that the kiosk is secure and cannot manipulate or reveal information to potential attackers about the virtual ticket vouchers that pass through the kiosk to the mobile device application.

It should be appreciated that while the above example embodiments are described in relation to transferring one or more amounts of money or units of currency from a kiosk to a mobile device application, such example embodiments may also be used to transfer one or more amounts of money or units of currency from an EGM to a mobile device application (either as an isolated transaction or as part of an operation mode of the EGM) and/or from a gaming establishment interface, such as a casino desk, to a mobile device application.

It should be further appreciated that while the above-described embodiments pertain to converting one or more amounts of money or units of currency from a kiosk to a mobile device application, in other embodiments, the system disclosed herein is configured to convert one or more virtual ticket vouchers associated with a mobile device application to one or more units of currency at a kiosk, EGM or gaming establishment interface, such as a casino desk.

Gaming Systems

The above-described embodiments of the present disclosure may be implemented in accordance with or in conjunction with one or more of a variety of different types of gaming systems, such as, but not limited to, those described below.

The present disclosure contemplates a variety of different gaming systems each having one or more of a plurality of different features, attributes, or characteristics. A "gaming system" as used herein refers to various configurations of: (a) one or more central servers, central controllers, or remote hosts; (b) one or more electronic gaming machines such as those located on a casino floor; and/or (c) one or more personal gaming devices, such as desktop computers, laptop computers, tablet computers or computing devices, personal digital assistants, mobile phones, and other mobile computing devices.

Thus, in various embodiments, the gaming system of the present disclosure includes: (a) one or more electronic gaming machines in combination with one or more central servers, central controllers, or remote hosts; (b) one or more personal gaming devices in combination with one or more central servers, central controllers, or remote hosts; (c) one or more personal gaming devices in combination with one or more electronic gaming machines; (d) one or more personal gaming devices, one or more electronic gaming machines, and one or more central servers, central controllers, or remote hosts in combination with one another; (e) a single electronic gaming machine; (f) a plurality of electronic gaming machines in combination with one another; (g) a single personal gaming device; (h) a plurality of personal gaming devices in combination with one another; (i) a single central server, central controller, or remote host; and/or (j) a plurality of central servers, central controllers, or remote hosts in combination with one another.

For brevity and clarity and unless specifically stated otherwise, the term "EGM" is used herein to refer to an electronic gaming machine (such as a slot machine, a video poker machine, a video lottery terminal (VLT), a video keno machine, or a video bingo machine located on a casino floor). Additionally, for brevity and clarity and unless specifically stated otherwise, "EGM" as used herein represents one EGM or a plurality of EGMs, "personal computing device" as used herein represents one personal computing device or a plurality of personal computing devices, and "central server, central controller, or remote host" as used herein represents one central server, central controller, or remote host or a plurality of central servers, central controllers, or remote hosts.

As noted above, in various embodiments, the gaming system includes an EGM (or personal computing device) in combination with a central server, central controller, or remote host. In such embodiments, the EGM (or personal computing device) is configured to communicate with the central server, central controller, or remote host through a data network or remote communication link. In certain such embodiments, the EGM (or personal computing device) is configured to communicate with another EGM (or personal computing device) through the same data network or remote communication link or through a different data network or remote communication link. For example, the gaming system illustrated in FIG. 7 includes a plurality of EGMs 1000 that are each configured to communicate with a central server, central controller, or remote host 1156 through a data network 1158.

In certain embodiments in which the gaming system includes an EGM (or personal computing device) in combination with a central server, central controller, or remote host, the central server, central controller, or remote host is any suitable computing device (such as a server) that includes at least one processor and at least one memory device or data storage device. As further described herein, the EGM (or personal computing device) includes at least one EGM (or personal computing device) processor configured to transmit and receive data or signals representing events, messages, commands, or any other suitable information between the EGM (or personal computing device) and the central server, central controller, or remote host. The at least one processor of that EGM (or personal computing device) is configured to execute the events, messages, or commands represented by such data or signals in conjunction with the operation of the EGM (or personal computing device). Moreover, the at least one processor of the central server, central controller, or remote host is configured to transmit and receive data or signals representing events, messages, commands, or any other suitable information between the central server, central controller, or remote host and the EGM (or personal computing device). The at least one processor of the central server, central controller, or remote host is configured to execute the events, messages, or commands represented by such data or signals in conjunction with the operation of the central server, central controller, or remote host. One, more than one, or each of the functions of the central server, central controller, or remote host may be performed by the at least one processor of the EGM (or personal computing device). Further, one, more than one, or each of the functions of the at least one processor of the EGM (or personal computing device) may be performed by the at least one processor of the central server, central controller, or remote host.

In certain such embodiments, computerized instructions for controlling any games (such as any primary or base games and/or any secondary or bonus games) displayed by the EGM (or personal computing device) are executed by the central server, central controller, or remote host. In such "thin client" embodiments, the central server, central controller, or remote host remotely controls any games (or other suitable interfaces) displayed by the EGM (or personal computing device), and the EGM (or personal computing device) is utilized to display such games (or suitable interfaces) and to receive one or more inputs or commands. In other such embodiments, computerized instructions for controlling any games displayed by the EGM (or personal computing device) are communicated from the central server, central controller, or remote host to the EGM (or personal computing device) and are stored in at least one memory device of the EGM (or personal computing device). In such "thick client" embodiments, the at least one processor of the EGM (or personal computing device) executes the computerized instructions to control any games (or other suitable interfaces) displayed by the EGM (or personal computing device).

In various embodiments in which the gaming system includes a plurality of EGMs (or personal computing devices), one or more of the EGMs (or personal computing devices) are thin client EGMs (or personal computing devices) and one or more of the EGMs (or personal computing devices) are thick client EGMs (or personal computing devices). In other embodiments in which the gaming system includes one or more EGMs (or personal computing devices), certain functions of one or more of the EGMs (or personal computing devices) are implemented in a thin client environment, and certain other functions of one or more of the EGMs (or personal computing devices) are implemented in a thick client environment. In one such embodiment in which the gaming system includes an EGM (or personal computing device) and a central server, central controller, or remote host, computerized instructions for controlling any primary or base games displayed by the EGM (or personal computing device) are communicated from the central server, central controller, or remote host to the EGM (or personal computing device) in a thick client configuration, and computerized instructions for controlling any secondary or bonus games or other functions displayed by the EGM (or personal computing device) are executed by the central server, central controller, or remote host in a thin client configuration.

In certain embodiments in which the gaming system includes: (a) an EGM (or personal computing device) configured to communicate with a central server, central controller, or remote host through a data network; and/or (b) a plurality of EGMs (or personal computing devices) configured to communicate with one another through a data network, the data network is a local area network (LAN) in which the EGMs (or personal computing devices) are located substantially proximate to one another and/or the central server, central controller, or remote host. In one example, the EGMs (or personal computing devices) and the central server, central controller, or remote host are located in a gaming establishment or a portion of a gaming establishment.

In other embodiments in which the gaming system includes: (a) an EGM (or personal computing device) configured to communicate with a central server, central controller, or remote host through a data network; and/or (b) a plurality of EGMs (or personal computing devices) configured to communicate with one another through a data network, the data network is a wide area network (WAN) in which one or more of the EGMs (or personal computing devices) are not necessarily located substantially proximate to another one of the EGMs (or personal computing devices) and/or the central server, central controller, or remote host. For example, one or more of the EGMs (or personal computing devices) are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the EGMs (or personal computing devices) are located. In certain embodiments in which the data network is a WAN, the gaming system includes a central server, central controller, or remote host and an EGM (or personal computing device) each located in a different gaming establishment in a same geographic area, such as a same city or a same state. Gaming systems in which the data network is a WAN are substantially identical to gaming systems in which the data network is a LAN, though the quantity of EGMs (or personal computing devices) in such gaming systems may vary relative to one another.

In further embodiments in which the gaming system includes: (a) an EGM (or personal computing device) configured to communicate with a central server, central controller, or remote host through a data network; and/or (b) a plurality of EGMs (or personal computing devices) configured to communicate with one another through a data network, the data network is an internet (such as the Internet) or an intranet. In certain such embodiments, an Internet browser of the EGM (or personal computing device) is usable to access an Internet game page from any location where an Internet connection is available. In one such embodiment, after the EGM (or personal computing device) accesses the Internet game page, the central server, central controller, or remote host identifies a player prior to enabling that player to place any wagers on any plays of any wagering games. In one example, the central server, central controller, or remote host identifies the player by requiring a player account of the player to be logged into via an input of a unique username and password combination assigned to the player. The central server, central controller, or remote host may, however, identify the player in any other suitable manner, such as by validating a player tracking identification number associated with the player; by reading a player tracking card or other smart card inserted into a card reader (as described below); by validating a unique player identification number associated with the player by the central server, central controller, or remote host; or by identifying the EGM (or personal computing device), such as by identifying the MAC address or the IP address of the Internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the Internet browser of the EGM (or personal computing device). Examples of implementations of Internet-based gaming are further described in U.S. Pat. No. 8,764,566, entitled "Internet Remote Game Server," and U.S. Pat. No.

8,147,334, entitled "Universal Game Server," which are incorporated herein by reference.

The central server, central controller, or remote host and the EGM (or personal computing device) are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile Internet network), or any other suitable medium. The expansion in the quantity of computing devices and the quantity and speed of Internet connections in recent years increases opportunities for players to use a variety of EGMs (or personal computing devices) to play games from an ever-increasing quantity of remote sites. Additionally, the enhanced bandwidth of digital wireless communications may render such technology suitable for some or all communications, particularly if such communications are encrypted. Higher data transmission speeds may be useful for enhancing the sophistication and response of the display and interaction with players.

EGM Components

Figure 7:
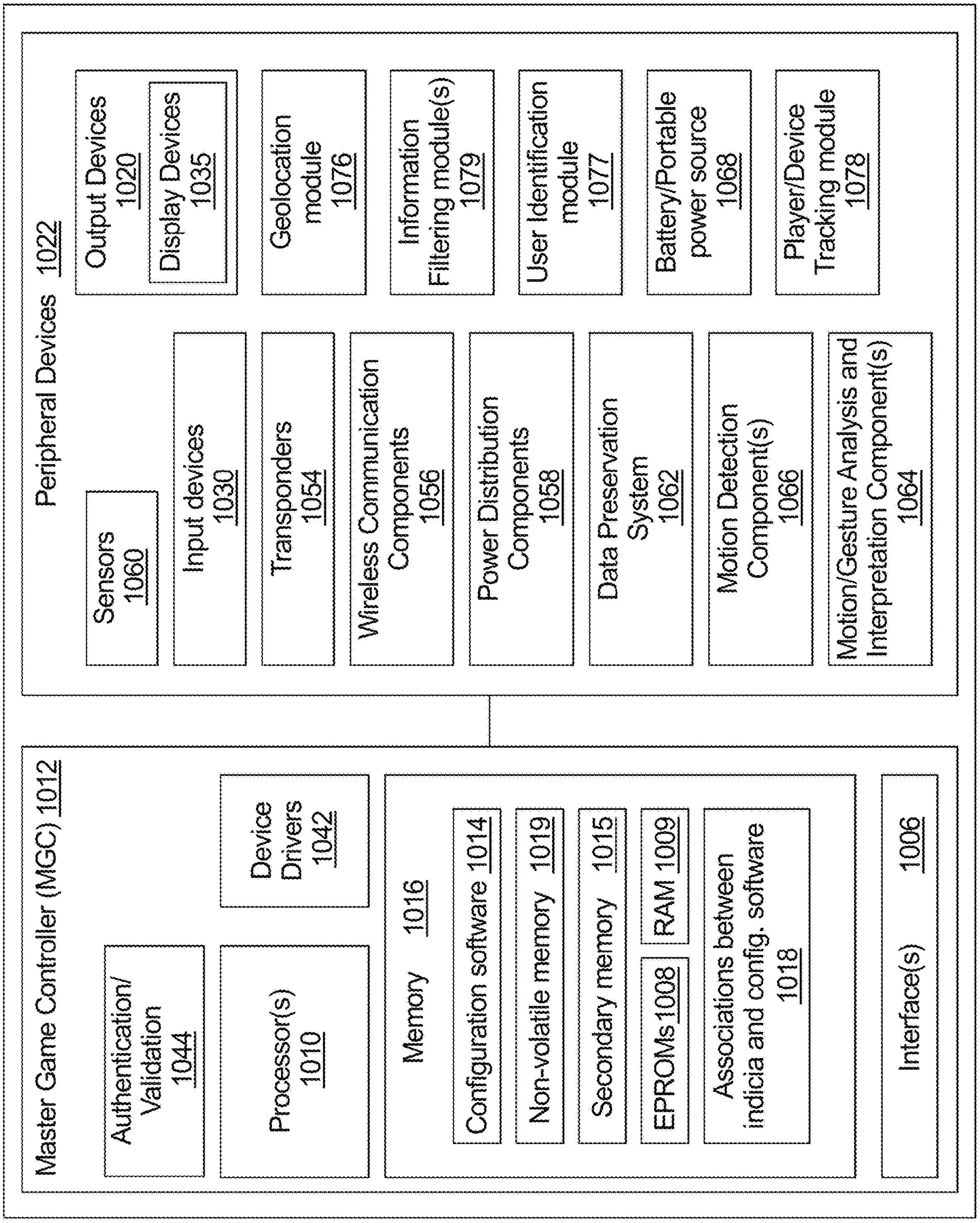
FIG. 7 is a schematic block diagram of one embodiment of an electronic configuration of an example gaming system disclosed herein.
Figure 8A:
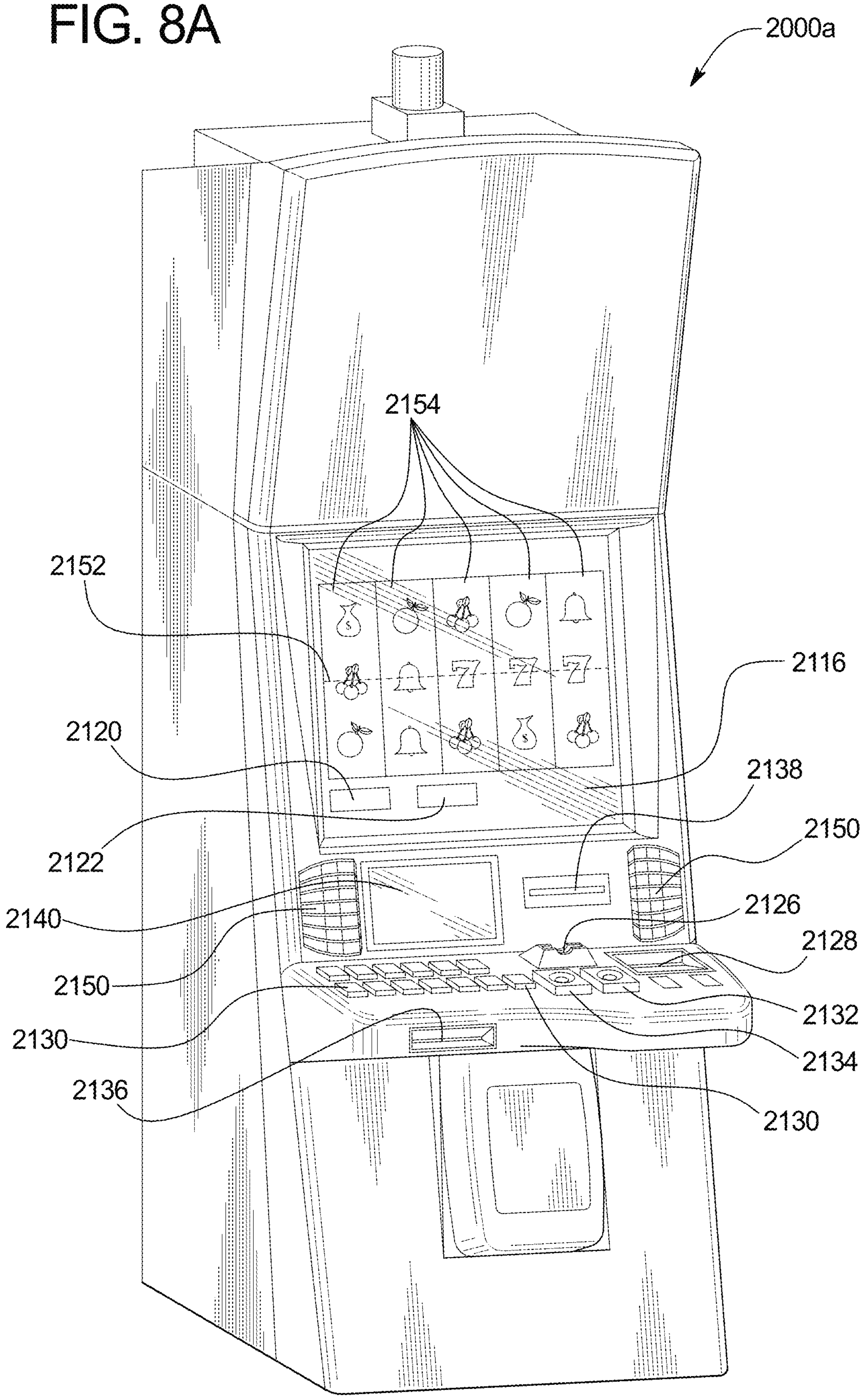
FIGS. 8A and 8B are perspective views of example alternative embodiments of the gaming system disclosed herein.
Figure 8B:
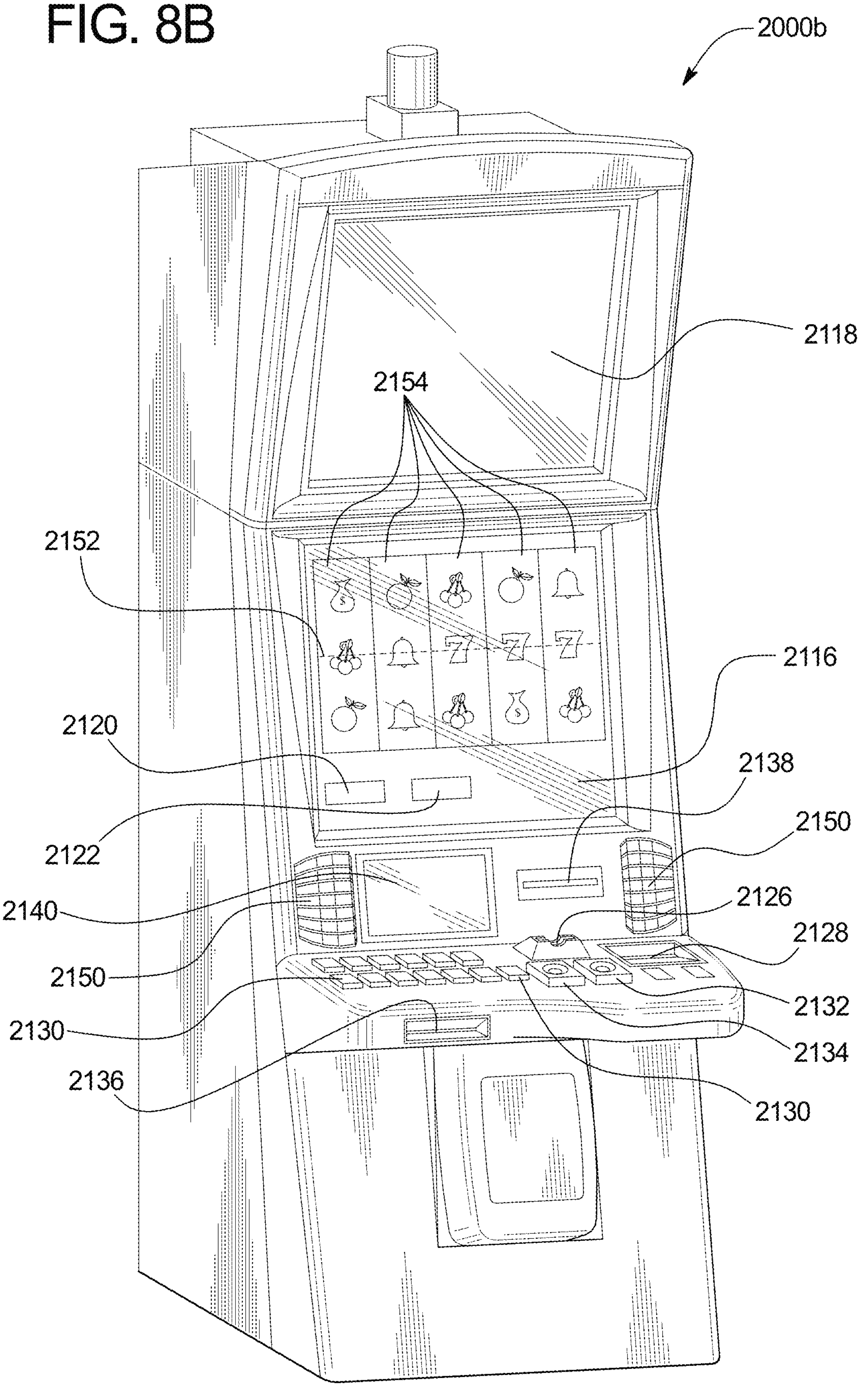

FIG. 7 is a block diagram of an example EGM 1000 and FIGS. 8A and 8B include two different example EGMs 2000*a* and 2000*b*. The EGMs 1000, 2000*a*, and 2000*b* are merely example EGMs, and different EGMs may be implemented using different combinations of the components shown in the EGMs 1000, 2000*a*, and 2000*b*.

In these embodiments, the EGM 1000 includes a master gaming controller 1012 configured to communicate with and to operate with a plurality of peripheral devices 1022.

The master gaming controller 1012 includes at least one processor 1010. The at least one processor 1010 is any suitable processing device or set of processing devices, such as a microprocessor, a microcontroller-based platform, a suitable integrated circuit, or one or more application-specific integrated circuits (ASICs), configured to execute software enabling various configuration and reconfiguration tasks, such as: (1) communicating with a remote source (such as a server that stores authentication information or game information) via a communication interface 1006 of the master gaming controller 1012; (2) converting signals read by an interface to a format corresponding to that used by software or memory of the EGM; (3) accessing memory to configure or reconfigure game parameters in the memory according to indicia read from the EGM; (4) communicating with interfaces and the peripheral devices 1022 (such as input/output devices); and/or (5) controlling the peripheral devices 1022. In certain embodiments, one or more components of the master gaming controller 1012 (such as the at least one processor 1010) reside within a housing of the EGM (described below), while in other embodiments at least one component of the master gaming controller 1012 resides outside of the housing of the EGM.

The master gaming controller 1012 also includes at least one memory device 1016, which includes: (1) volatile memory (e.g., RAM 1009, which can include non-volatile RAM, magnetic RAM, ferroelectric RAM, and any other suitable forms); (2) non-volatile memory 1019 (e.g., disk memory, FLASH memory, EPROMs, EEPROMs, memristor-based non-volatile solid-state memory, etc.); (3) unalterable memory (e.g., EPROMs 1008); (4) read-only memory; and/or (5) a secondary memory storage device 1015, such as a non-volatile memory device, configured to store gaming software related information (the gaming software related information and the memory may be used to store various audio files and games not currently being used and invoked in a configuration or reconfiguration). Any other suitable magnetic, optical, and/or semiconductor memory may operate in conjunction with the EGM disclosed herein. In certain embodiments, the at least one memory device 1016 resides within the housing of the EGM (described below), while in other embodiments at least one component of the at least one memory device 1016 resides outside of the housing of the EGM.

The at least one memory device 1016 is configured to store, for example: (1) configuration software 1014, such as all the parameters and settings for a game playable on the EGM; (2) associations 1018 between configuration indicia read from an EGM with one or more parameters and settings; (3) communication protocols configured to enable the at least one processor 1010 to communicate with the peripheral devices 1022; and/or (4) communication transport protocols (such as TCP/IP, USB, Firewire, IEEE1394, Bluetooth, IEEE 802.11x (IEEE 802.11 standards), hiperlan/2, HomeRF, etc.) configured to enable the EGM to communicate with local and non-local devices using such protocols. In one implementation, the master gaming controller 1012 communicates with other devices using a serial communication protocol. A few non-limiting examples of serial communication protocols that other devices, such as peripherals (e.g., a bill validator or a ticket printer), may use to communicate with the master game controller 1012 include USB, RS-232, and Netplex (a proprietary protocol developed by IGT).

In certain embodiments, the at least one memory device 1016 is configured to store program code and instructions executable by the at least one processor of the EGM to control the EGM. The at least one memory device 1016 of the EGM also stores other operating data, such as image data, event data, input data, random number generators (RNGs) or pseudo-RNGs, paytable data or information, and/or applicable game rules that relate to the play of one or more games on the EGM. In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a player uses such a removable memory device in an EGM to implement at least part of the present disclosure. In other embodiments, part or all of the program code and/or the operating data is downloaded to the at least one memory device of the EGM through any suitable data network described above (such as an Internet or intranet).

The at least one memory device 1016 also stores a plurality of device drivers 1042. Examples of different types of device drivers include device drivers for EGM components and device drivers for the peripheral components 1022. Typically, the device drivers 1042 utilize various communication protocols that enable communication with a particular physical device. The device driver abstracts the hardware implementation of that device. For example, a device driver may be written for each type of card reader that could potentially be connected to the EGM. Non-limiting examples of communication protocols used to implement the device drivers include Netplex, USB, Serial, Ethernet 175, Firewire, I/O debouncer, direct memory map, serial, PCI, parallel, RF, Bluetooth™, near-field communications (e.g., using near-field magnetics), 802.11 (WiFi), etc. In one embodiment, when one type of a particular device is exchanged for another type of the particular device, the at least one processor of the EGM loads the new device driver from the at least one memory device to enable communication with the new device. For instance, one type of card reader in the EGM can be replaced with a second different type of card reader when device drivers for both card readers are stored in the at least one memory device.

In certain embodiments, the software units stored in the at least one memory device 1016 can be upgraded as needed. For instance, when the at least one memory device 1016 is a hard drive, new games, new game options, new parameters, new settings for existing parameters, new settings for new parameters, new device drivers, and new communication protocols can be uploaded to the at least one memory device 1016 from the master game controller 1012 or from some other external device. As another example, when the at least one memory device 1016 includes a CD/DVD drive including a CD/DVD configured to store game options, parameters, and settings, the software stored in the at least one memory device 1016 can be upgraded by replacing a first CD/DVD with a second CD/DVD. In yet another example, when the at least one memory device 1016 uses flash memory 1019 or EPROM 1008 units configured to store games, game options, parameters, and settings, the software stored in the flash and/or EPROM memory units can be upgraded by replacing one or more memory units with new memory units that include the upgraded software. In another embodiment, one or more of the memory devices, such as the hard drive, may be employed in a game software download process from a remote software server.

In some embodiments, the at least one memory device 1016 also stores authentication and/or validation components 1044 configured to authenticate/validate specified EGM components and/or information, such as hardware components, software components, firmware components, peripheral device components, user input device components, information received from one or more user input devices, information stored in the at least one memory device 1016, etc. Examples of various authentication and/or validation components are described in U.S. Pat. No. 6,620,047, entitled "Electronic Gaming Apparatus Having Authentication Data Sets," which is incorporated herein by reference.

In certain embodiments, the peripheral devices 1022 include several device interfaces, such as: (1) at least one output device 1020 including at least one display device 1035; (2) at least one input device 1030 (which may include contact and/or non-contact interfaces); (3) at least one transponder 1054; (4) at least one wireless communication component 1056; (5) at least one wired/wireless power distribution component 1058; (6) at least one sensor 1060; (7) at least one data preservation component 1062; (8) at least one motion/gesture analysis and interpretation component 1064; (9) at least one motion detection component 1066; (10) at least one portable power source 1068; (11) at least one geolocation module 1076; (12) at least one user identification module 1077; (13) at least one player/device tracking module 1078; and (14) at least one information filtering module 1079.

The at least one output device 1020 includes at least one display device 1035 configured to display any game(s) displayed by the EGM and any suitable information associated with such game(s). In certain embodiments, the display devices are connected to or mounted on a housing of the EGM (described below). In various embodiments, the display devices serve as digital glass configured to advertise certain games or other aspects of the gaming establishment in which the EGM is located. In various embodiments, the EGM includes one or more of the following display devices: (a) a central display device; (b) a player tracking display configured to display various information regarding a player's player tracking status (as described below); (c) a secondary or upper display device in addition to the central display device and the player tracking display; (d) a credit display configured to display a current quantity of credits, amount of cash, account balance, or the equivalent; and (e) a bet display configured to display an amount wagered for one or more plays of one or more games. The example EGM 2000*a* illustrated in FIG. 8A includes a central display device 2116, a player tracking display 2140, a credit display 2120, and a bet display 2122. The example EGM 2000*b* illustrated in FIG. 8B includes a central display device 2116, an upper display device 2118, a player tracking display 2140, a credit display 2120, and a bet display 2122.

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. The display devices may be of any suitable sizes, shapes, and configurations.

The display devices of the EGM are configured to display one or more game and/or non-game images, symbols, and indicia. In certain embodiments, the display devices of the EGM are configured to display any suitable visual representation or exhibition of the movement of objects; dynamic lighting; video images; images of people, characters, places, things, and faces of cards; and the like. In certain embodiments, the display devices of the EGM are configured to display one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

In various embodiments, the at least one output device 1020 includes a payout device. In these embodiments, after the EGM receives an actuation of a cashout device (described below), the EGM causes the payout device to provide a payment to the player. In one embodiment, the payout device is one or more of: (a) a ticket printer and dispenser configured to print and dispense a ticket or credit slip associated with a monetary value, wherein the ticket or credit slip may be redeemed for its monetary value via a cashier, a kiosk, or other suitable redemption system; (b) a bill dispenser configured to dispense paper currency; (c) a coin dispenser configured to dispense coins or tokens (such as into a coin payout tray); and (d) any suitable combination thereof. The example EGMs 2000*a* and 2000*b* illustrated in FIGS. 8A and 8B each include a ticket printer and dispenser 2136. Examples of ticket-in ticket-out (TITO) technology are described in U.S. Pat. No. 5,429,361, entitled "Gaming Machine Information, Communication and Display System"; U.S. Pat. No. 5,470,079, entitled "Gaming Machine Accounting and Monitoring System"; U.S. Pat. No. 5,265, 874, entitled "Cashless Gaming Apparatus and Method"; U.S. Pat. No. 6,729,957, entitled "Gaming Method and Host Computer with Ticket-In/Ticket-Out Capability"; U.S. Pat. No. 6,729,958, entitled "Gaming System with Ticket-In/Ticket-Out Capability"; U.S. Pat. No. 6,736,725, entitled "Gaming Method and Host Computer with Ticket-In/Ticket-Out Capability"; U.S. Pat. No. 7,275,991, entitled "Slot Machine with Ticket-In/Ticket-Out Capability"; U.S. Pat. No. 6,048,269, entitled "Coinless Slot Machine System and Method"; and U.S. Pat. No. 5,290,003, entitled "Gaming Machine and Coupons," which are incorporated herein by reference.

In certain embodiments, rather than dispensing bills, coins, or a physical ticket having a monetary value to the player following receipt of an actuation of the cashout device, the payout device is configured to cause a payment to be provided to the player in the form of an electronic funds transfer, such as via a direct deposit into a bank account, a casino account, or a prepaid account of the player; via a transfer of funds onto an electronically recordable identification card or smart card of the player; or via sending a virtual ticket having a monetary value to an electronic device of the player. Examples of providing payment using virtual tickets are described in U.S. Pat. No. 8,613,659, entitled "Virtual Ticket-In and Ticket-Out on a Gaming Machine," which is incorporated herein by reference.

While any credit balances, any wagers, any values, and any awards are described herein as amounts of monetary credits or currency, one or more of such credit balances, such wagers, such values, and such awards may be for non-monetary credits, promotional credits, of player tracking points or credits.

In certain embodiments, the at least one output device 1020 is a sound generating device controlled by one or more sound cards. In one such embodiment, the sound generating device includes one or more speakers or other sound generating hardware and/or software configured to generate sounds, such as by playing music for any games or by playing music for other modes of the EGM, such as an attract mode. The example EGMs 2000*a* and 2000*b* illustrated in FIGS. 8A and 8B each include a plurality of speakers 2150. In another such embodiment, the EGM provides dynamic sounds coupled with attractive multimedia images displayed on one or more of the display devices to provide an audio-visual representation or to otherwise display full-motion video with sound to attract players to the EGM. In certain embodiments, the EGM displays a sequence of audio and/or visual attraction messages during idle periods to attract potential players to the EGM. The videos may be customized to provide any appropriate information.

The at least one input device 1030 may include any suitable device that enables an input signal to be produced and received by the at least one processor 1010 of the EGM.

In one embodiment, the at least one input device 1030 includes a payment device configured to communicate with the at least one processor of the EGM to fund the EGM. In certain embodiments, the payment device includes one or more of: (a) a bill acceptor into which paper money is inserted to fund the EGM; (b) a ticket acceptor into which a ticket or a voucher is inserted to fund the EGM; (c) a coin slot into which coins or tokens are inserted to fund the EGM; (d) a reader or a validator for credit cards, debit cards, or credit slips into which a credit card, debit card, or credit slip is inserted to fund the EGM; (e) a player identification card reader into which a player identification card is inserted to fund the EGM; or (f) any suitable combination thereof. The example EGMs 2000*a* and 2000*b* illustrates in FIGS. 8A and 8B each include a combined bill and ticket acceptor 2128 and a coin slot 2126.

In one embodiment, the at least one input device 1030 includes a payment device configured to enable the EGM to be funded via an electronic funds transfer, such as a transfer of funds from a bank account. In another embodiment, the EGM includes a payment device configured to communicate with a mobile device of a player, such as a mobile phone, a radio frequency identification tag, or any other suitable wired or wireless device, to retrieve relevant information associated with that player to fund the EGM. Examples of funding an EGM via communication between the EGM and a mobile device (such as a mobile phone) of a player are described in U.S. Patent Application Publication No. 2013/0344942, entitled "Avatar as Security Measure for Mobile Device Use with Electronic Gaming Machine," which is incorporated herein by reference. When the EGM is funded, the at least one processor determines the amount of funds entered and displays the corresponding amount on a credit display or any other suitable display as described below.

In certain embodiments, the at least one input device 1030 includes at least one wagering or betting device. In various embodiments, the one or more wagering or betting devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). One such wagering or betting device is as a maximum wager or bet device that, when actuated, causes the EGM to place a maximum wager on a play of a game. Another such wagering or betting device is a repeat bet device that, when actuated, causes the EGM to place a wager that is equal to the previously-placed wager on a play of a game. A further such wagering or betting device is a bet one device that, when actuated, causes the EGM to increase the wager by one credit. Generally, upon actuation of one of the wagering or betting devices, the quantity of credits displayed in a credit meter (described below) decreases by the amount of credits wagered, while the quantity of credits displayed in a bet display (described below) increases by the amount of credits wagered.

In various embodiments, the at least one input device 1030 includes at least one game play activation device. In various embodiments, the one or more game play initiation devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). After a player appropriately funds the EGM and places a wager, the EGM activates the game play activation device to enable the player to actuate the game play activation device to initiate a play of a game on the EGM (or another suitable sequence of events associated with the EGM). After the EGM receives an actuation of the game play activation device, the EGM initiates the play of the game. The example EGMs 2000*a* and 2000*b* illustrated in FIGS. 8A and 8B each include a game play activation device in the form of a game play initiation button 2132. In other embodiments, the EGM begins game play automatically upon appropriate funding rather than upon utilization of the game play activation device.

In other embodiments, the at least one input device 1030 includes a cashout device. In various embodiments, the cashout device is: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). When the EGM receives an actuation of the cashout device from a player and the player has a positive (i.e., greater-than-zero) credit balance, the EGM initiates a payout associated with the player's credit balance. The example EGMs 2000*a* and 2000*b* illustrated in FIGS. 8A and 8B each include a cashout device in the form of a cashout button 2134.

In various embodiments, the at least one input device 1030 includes a plurality of buttons that are programmable by the EGM operator to, when actuated, cause the EGM to perform particular functions. For instance, such buttons may be hard keys, programmable soft keys, or icons displayed on a display device of the EGM (described below) that are actuatable via a touch screen of the EGM (described below) or via use of a suitable input device of the EGM (such as a mouse or a joystick). The example EGMs 2000*a* and 2000*b* illustrated in FIGS. 8A and 8B each include a plurality of such buttons 2130.

In certain embodiments, the at least one input device 1030 includes a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the EGM by touching the touch screen at the appropriate locations.

In embodiments including a player tracking system, as further described below, the at least one input device 1030 includes a card reader in communication with the at least one processor of the EGM. The example EGMs 2000*a* and 2000*b* illustrated in FIGS. 8A and 8B each include a card reader 2138. The card reader is configured to read a player identification card inserted into the card reader.

The at least one wireless communication component 1056 includes one or more communication interfaces having different architectures and utilizing a variety of protocols, such as (but not limited to) 802.11 (WiFi); 802.15 (including Bluetooth™); 802.16 (WiMax); 802.22; cellular standards such as CDMA, CDMA2000, and WCDMA; Radio Frequency (e.g., RFID); infrared; and Near Field Magnetic communication protocols. The at least one wireless communication component 1056 transmits electrical, electromagnetic, or optical signals that carry digital data streams or analog signals representing various types of information.

The at least one wired/wireless power distribution component 1058 includes components or devices that are configured to provide power to other devices. For example, in one embodiment, the at least one power distribution component 1058 includes a magnetic induction system that is configured to provide wireless power to one or more user input devices near the EGM. In one embodiment, a user input device docking region is provided, and includes a power distribution component that is configured to recharge a user input device without requiring metal-to-metal contact. In one embodiment, the at least one power distribution component 1058 is configured to distribute power to one or more internal components of the EGM, such as one or more rechargeable power sources (e.g., rechargeable batteries) located at the EGM.

In certain embodiments, the at least one sensor 1060 includes at least one of: optical sensors, pressure sensors, RF sensors, infrared sensors, image sensors, thermal sensors, and biometric sensors. The at least one sensor 1060 may be used for a variety of functions, such as: detecting movements and/or gestures of various objects within a predetermined proximity to the EGM; detecting the presence and/or identity of various persons (e.g., players, casino employees, etc.), devices (e.g., user input devices), and/or systems within a predetermined proximity to the EGM.

The at least one data preservation component 1062 is configured to detect or sense one or more events and/or conditions that, for example, may result in damage to the EGM and/or that may result in loss of information associated with the EGM. Additionally, the data preservation system 1062 may be operable to initiate one or more appropriate action(s) in response to the detection of such events/conditions.

The at least one motion/gesture analysis and interpretation component 1064 is configured to analyze and/or interpret information relating to detected player movements and/or gestures to determine appropriate player input information relating to the detected player movements and/or gestures. For example, in one embodiment, the at least one motion/gesture analysis and interpretation component 1064 is configured to perform one or more of the following functions: analyze the detected gross motion or gestures of a player; interpret the player's motion or gestures (e.g., in the context of a casino game being played) to identify instructions or input from the player; utilize the interpreted instructions/input to advance the game state; etc. In other embodiments, at least a portion of these additional functions may be implemented at a remote system or device.

The at least one portable power source 1068 enables the EGM to operate in a mobile environment. For example, in one embodiment, the EGM 300 includes one or more rechargeable batteries.

The at least one geolocation module 1076 is configured to acquire geolocation information from one or more remote sources and use the acquired geolocation information to determine information relating to a relative and/or absolute position of the EGM. For example, in one implementation, the at least one geolocation module 1076 is configured to receive GPS signal information for use in determining the position or location of the EGM. In another implementation, the at least one geolocation module 1076 is configured to receive multiple wireless signals from multiple remote devices (e.g., EGMs, servers, wireless access points, etc.) and use the signal information to compute position/location information relating to the position or location of the EGM.

The at least one user identification module 1077 is configured to determine the identity of the current user or current owner of the EGM. For example, in one embodiment, the current user is required to perform a login process at the EGM in order to access one or more features. Alternatively, the EGM is configured to automatically determine the identity of the current user based on one or more external signals, such as an RFID tag or badge worn by the current user and that provides a wireless signal to the EGM that is used to determine the identity of the current user. In at least one embodiment, various security features are incorporated into the EGM to prevent unauthorized users from accessing confidential or sensitive information.

The at least one information filtering module 1079 is configured to perform filtering (e.g., based on specified criteria) of selected information to be displayed at one or more displays 1035 of the EGM.

In various embodiments, the EGM includes a plurality of communication ports configured to enable the at least one processor of the EGM to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices. U.S. Pat. No. 7,290,072 describes a variety of EGMs including one or more communication ports that enable the EGMs to communicate and operate with one or more external peripherals.

As generally described above, in certain embodiments, such as the example EGMs 2000*a* and 2000*b* illustrated in FIGS. 8A and 8B, the EGM has a support structure, housing, or cabinet that provides support for a plurality of the input devices and the output devices of the EGM. Further, the EGM is configured such that a player may operate it while standing or sitting. In various embodiments, the EGM is positioned on a base or stand, or is configured as a pub-style tabletop game (not shown) that a player may operate typically while sitting. As illustrated by the different example EGMs 2000*a* and 2000*b* shown in FIGS. 8A and 8B, EGMs may have varying housing and display configurations.

In certain embodiments, the EGM is a device that has obtained approval from a regulatory gaming commission, and in other embodiments, the EGM is a device that has not obtained approval from a regulatory gaming commission.

The EGMs described above are merely three examples of different types of EGMs. Certain of these example EGMs may include one or more elements that may not be included in all gaming systems, and these example EGMs may not include one or more elements that are included in other gaming systems. For example, certain EGMs include a coin acceptor while others do not.

Operation of Primary or Base Games and/or Secondary or Bonus Games

In various embodiments, an EGM may be implemented in one of a variety of different configurations. In various embodiments, the EGM may be implemented as one of: (a) a dedicated EGM in which computerized game programs executable by the EGM for controlling any primary or base games (referred to herein as "primary games") and/or any secondary or bonus games or other functions (referred to herein as "secondary games") displayed by the EGM are provided with the EGM prior to delivery to a gaming establishment or prior to being provided to a player; and (b) a changeable EGM in which computerized game programs executable by the EGM for controlling any primary games and/or secondary games displayed by the EGM are downloadable or otherwise transferred to the EGM through a data network or remote communication link; from a USB drive, flash memory card, or other suitable memory device; or in any other suitable manner after the EGM is physically located in a gaming establishment or after the EGM is provided to a player.

As generally explained above, in various embodiments in which the gaming system includes a central server, central controller, or remote host and a changeable EGM, the at least one memory device of the central server, central controller, or remote host stores different game programs and instructions executable by the at least one processor of the changeable EGM to control one or more primary games and/or secondary games displayed by the changeable EGM. More specifically, each such executable game program represents a different game or a different type of game that the at least one changeable EGM is configured to operate. In one example, certain of the game programs are executable by the changeable EGM to operate games having the same or substantially the same game play but different paytables. In different embodiments, each executable game program is associated with a primary game, a secondary game, or both. In certain embodiments, an executable game program is executable by the at least one processor of the at least one changeable EGM as a secondary game to be played simultaneously with a play of a primary game (which may be downloaded to or otherwise stored on the at least one changeable EGM), or vice versa.

In operation of such embodiments, the central server, central controller, or remote host is configured to communicate one or more of the stored executable game programs to the at least one processor of the changeable EGM. In different embodiments, a stored executable game program is communicated or delivered to the at least one processor of the changeable EGM by: (a) embedding the executable game program in a device or a component (such as a microchip to be inserted into the changeable EGM); (b) writing the executable game program onto a disc or other media; or (c) uploading or streaming the executable game program over a data network (such as a dedicated data network). After the executable game program is communicated from the central server, central controller, or remote host to the changeable EGM, the at least one processor of the changeable EGM executes the executable game program to enable the primary game and/or the secondary game associated with that executable game program to be played using the display device(s) and/or the input device(s) of the changeable EGM. That is, when an executable game program is communicated to the at least one processor of the changeable EGM, the at least one processor of the changeable EGM changes the game or the type of game that may be played using the changeable EGM.

In certain embodiments, the gaming system randomly determines any game outcome(s) (such as a win outcome) and/or award(s) (such as a quantity of credits to award for the win outcome) for a play of a primary game and/or a play of a secondary game based on probability data. In certain such embodiments, this random determination is provided through utilization of an RNG, such as a true RNG or a pseudo RNG, or any other suitable randomization process. In one such embodiment, each game outcome or award is associated with a probability, and the gaming system generates the game outcome(s) and/or the award(s) to be provided based on the associated probabilities. In these embodiments, since the gaming system generates game outcomes and/or awards randomly or based on one or more probability calculations, there is no certainty that the gaming system will ever provide any specific game outcome and/or award.

In certain embodiments, the gaming system maintains one or more predetermined pools or sets of predetermined game outcomes and/or awards. In certain such embodiments, upon generation or receipt of a game outcome and/or award request, the gaming system independently selects one of the predetermined game outcomes and/or awards from the one or more pools or sets. The gaming system flags or marks the selected game outcome and/or award as used. Once a game outcome or an award is flagged as used, it is prevented from further selection from its respective pool or set; that is, the gaming system does not select that game outcome or award upon another game outcome and/or award request. The gaming system provides the selected game outcome and/or award. Examples of this type of award evaluation are described in U.S. Pat. No. 7,470,183, entitled "Finite Pool Gaming Method and Apparatus"; U.S. Pat. No. 7,563,163, entitled "Gaming Device Including Outcome Pools for Providing Game Outcomes"; U.S. Pat. No. 7,833,092, entitled "Method and System for Compensating for Player Choice in a Game of Chance"; U.S. Pat. No. 8,070,579, entitled "Bingo System with Downloadable Common Patterns"; and U.S. Pat. No. 8,398,472, entitled "Central Determination Poker Game," which are incorporated herein by reference.

In certain embodiments, the gaming system determines a predetermined game outcome and/or award based on the results of a bingo, keno, or lottery game. In certain such embodiments, the gaming system utilizes one or more bingo, keno, or lottery games to determine the predetermined game outcome and/or award provided for a primary game and/or a secondary game. The gaming system is provided or associated with a bingo card. Each bingo card consists of a matrix or array of elements, wherein each element is designated with separate indicia. After a bingo card is provided, the gaming system randomly selects or draws a plurality of the elements. As each element is selected, a determination is made as to whether the selected element is present on the bingo card. If the selected element is present on the bingo card, that selected element on the provided bingo card is marked or flagged. This process of selecting elements and marking any selected elements on the provided bingo cards continues until one or more predetermined patterns are marked on one or more of the provided bingo cards. After one or more predetermined patterns are marked on one or more of the provided bingo cards, game outcome and/or award is determined based, at least in part, on the selected elements on the provided bingo cards. Examples of this type of award determination are described in U.S. Pat. No. 7,753,774, entitled "Using Multiple Bingo Cards to Represent Multiple Slot Paylines and Other Class III Game Options"; U.S. Pat. No. 7,731,581, entitled "Multi-Player Bingo Game with Multiple Alternative Outcome Displays"; U.S. Pat. No. 7,955,170, entitled "Providing Non-Bingo Outcomes for a Bingo Game"; U.S. Pat. No. 8,070,579, entitled "Bingo System with Downloadable Common Patterns"; and U.S. Pat. No. 8,500,538, entitled "Bingo Gaming System and Method for Providing Multiple Outcomes from Single Bingo Pattern," which are incorporated herein by reference.

In certain embodiments in which the gaming system includes a central server, central controller, or remote host and an EGM, the EGM is configured to communicate with the central server, central controller, or remote host for monitoring purposes only. In such embodiments, the EGM determines the game outcome(s) and/or award(s) to be provided in any of the manners described above, and the central server, central controller, or remote host monitors the activities and events occurring on the EGM. In one such embodiment, the gaming system includes a real-time or online accounting and gaming information system configured to communicate with the central server, central controller, or remote host. In this embodiment, the accounting and gaming information system includes: (a) a player database configured to store player profiles, (b) a player tracking module configured to track players (as described below), and (c) a credit system configured to provide automated transactions. Examples of such accounting systems are described in U.S. Pat. No. 6,913,534, entitled "Gaming Machine Having a Lottery Game and Capability for Integration with Gaming Device Accounting System and Player Tracking System," and U.S. Pat. No. 8,597,116, entitled "Virtual Player Tracking and Related Services," which are incorporated herein by reference.

As noted above, in various embodiments, the gaming system includes one or more executable game programs executable by at least one processor of the gaming system to provide one or more primary games and one or more secondary games. The primary game(s) and the secondary game(s) may comprise any suitable games and/or wagering games, such as, but not limited to: electro-mechanical or video slot or spinning reel type games; video card games such as video draw poker, multi-hand video draw poker, other video poker games, video blackjack games, and video baccarat games; video keno games; video bingo games; and video selection games.

In certain embodiments in which the primary game is a slot or spinning reel type game, the gaming system includes one or more reels in either an electromechanical form with mechanical rotating reels or in a video form with simulated reels and movement thereof. Each reel displays a plurality of indicia or symbols, such as bells, hearts, fruits, numbers, letters, bars, or other images that typically correspond to a theme associated with the gaming system. In certain such embodiments, the gaming system includes one or more paylines associated with the reels. The example EGM **2000*b* shown in FIG. 8B includes a payline 1152 and a plurality of reels 1154**. In certain embodiments, one or more of the reels are independent reels or unisymbol reels. In such embodiments, each independent reel generates and displays one symbol.

In various embodiments, one or more of the paylines is horizontal, vertical, circular, diagonal, angled, or any suitable combination thereof. In other embodiments, each of one or more of the paylines is associated with a plurality of adjacent symbol display areas on a requisite number of adjacent reels. In one such embodiment, one or more paylines are formed between at least two symbol display areas that are adjacent to each other by either sharing a common side or sharing a common corner (i.e., such paylines are connected paylines). The gaming system enables a wager to be placed on one or more of such paylines to activate such paylines. In other embodiments in which one or more paylines are formed between at least two adjacent symbol display areas, the gaming system enables a wager to be placed on a plurality of symbol display areas, which activates those symbol display areas.

In various embodiments, the gaming system provides one or more awards after a spin of the reels when specified types and/or configurations of the indicia or symbols on the reels occur on an active payline or otherwise occur in a winning pattern, occur on the requisite number of adjacent reels, and/or occur in a scatter pay arrangement.

In certain embodiments, the gaming system employs a ways to win award determination. In these embodiments, any outcome to be provided is determined based on a number of associated symbols that are generated in active symbol display areas on the requisite number of adjacent reels (i.e., not on paylines passing through any displayed winning symbol combinations). If a winning symbol combination is generated on the reels, one award for that occurrence of the generated winning symbol combination is provided. Examples of ways to win award determinations are described in U.S. Pat. No. 8,012,011, entitled "Gaming Device and Method Having Independent Reels and Multiple Ways of Winning"; U.S. Pat. No. 8,241,104, entitled "Gaming Device and Method Having Designated Rules for Determining Ways To Win"; and U.S. Pat. No. 8,430,739, entitled "Gaming System and Method Having Wager Dependent Different Symbol Evaluations," which are incorporated herein by reference.

In various embodiments, the gaming system includes a progressive award. Typically, a progressive award includes an initial amount and an additional amount funded through a portion of each wager placed to initiate a play of a primary game. When one or more triggering events occurs, the gaming system provides at least a portion of the progressive award. After the gaming system provides the progressive award, an amount of the progressive award is reset to the initial amount and a portion of each subsequent wager is allocated to the next progressive award. Examples of progressive gaming systems are described in U.S. Pat. No. 7,585,223, entitled "Server Based Gaming System Having Multiple Progressive Awards"; U.S. Pat. No. 7,651,392, entitled "Gaming Device System Having Partial Progressive Payout"; U.S. Pat. No. 7,666,093, entitled "Gaming Method and Device Involving Progressive Wagers"; U.S. Pat. No. 7,780,523, entitled "Server Based Gaming System Having Multiple Progressive Awards"; and U.S. Pat. No. 8,337,298, entitled "Gaming Device Having Multiple Different Types of Progressive Awards," which are incorporated herein by reference As generally noted above, in addition to providing winning credits or other awards for one or more plays of the primary game(s), in various embodiments the gaming system provides credits or other awards for one or more plays of one or more secondary games. The secondary game typically enables an award to be obtained in addition to any award obtained through play of the primary game(s). The secondary game(s) typically produces a higher level of player excitement than the primary game(s) because the secondary game(s) provides a greater expectation of winning than the primary game(s) and is accompanied with more attractive or unusual features than the primary game (s). The secondary game(s) may be any type of suitable game, either similar to or completely different from the primary game.

In various embodiments, the gaming system automatically provides or initiates the secondary game upon the occurrence of a triggering event or the satisfaction of a qualifying condition. In other embodiments, the gaming system initiates the secondary game upon the occurrence of the triggering event or the satisfaction of the qualifying condition and upon receipt of an initiation input. In certain embodiments, the triggering event or qualifying condition is a selected outcome in the primary game(s) or a particular arrangement of one or more indicia on a display device for a play of the primary game(s), such as a "BONUS" symbol appearing on three adjacent reels along a payline following a spin of the reels for a play of the primary game. In other embodiments, the triggering event or qualifying condition occurs based on a certain amount of game play (such as number of games, number of credits, amount of time) being exceeded, or based on a specified number of points being earned during game play. Any suitable triggering event or qualifying condition or any suitable combination of a plurality of different triggering events or qualifying conditions may be employed.

In other embodiments, at least one processor of the gaming system randomly determines when to provide one or more plays of one or more secondary games. In one such embodiment, no apparent reason is provided for providing the secondary game. In this embodiment, qualifying for a secondary game is not triggered by the occurrence of an event in any primary game or based specifically on any of the plays of any primary game. That is, qualification is provided without any explanation or, alternatively, with a simple explanation. In another such embodiment, the gaming system determines qualification for a secondary game at least partially based on a game triggered or symbol triggered event, such as at least partially based on play of a primary game.

In various embodiments, after qualification for a secondary game has been determined, the secondary game participation may be enhanced through continued play on the primary game. Thus, in certain embodiments, for each secondary game qualifying event, such as a secondary game symbol, that is obtained, a given number of secondary game wagering points or credits is accumulated in a "secondary game meter" configured to accrue the secondary game wagering credits or entries toward eventual participation in the secondary game. In one such embodiment, the occurrence of multiple such secondary game qualifying events in the primary game results in an arithmetic or exponential increase in the number of secondary game wagering credits awarded. In another such embodiment, any extra secondary game wagering credits may be redeemed during the secondary game to extend play of the secondary game.

In certain embodiments, no separate entry fee or buy-in for the secondary game is required. That is, entry into the secondary game cannot be purchased; rather, in these embodiments entry must be won or earned through play of the primary game, thereby encouraging play of the primary game. In other embodiments, qualification for the secondary game is accomplished through a simple "buy-in." For example, qualification through other specified activities is unsuccessful, payment of a fee or placement of an additional wager "buys-in" to the secondary game. In certain embodiments, a separate side wager must be placed on the secondary game or a wager of a designated amount must be placed on the primary game to enable qualification for the secondary game. In these embodiments, the secondary game triggering event must occur and the side wager (or designated primary game wager amount) must have been placed for the secondary game to trigger.

In various embodiments in which the gaming system includes a plurality of EGMs, the EGMs are configured to communicate with one another to provide a group gaming environment. In certain such embodiments, the EGMs enable players of those EGMs to work in conjunction with one another, such as by enabling the players to play together as a team or group, to win one or more awards. In other such embodiments, the EGMs enable players of those EGMs to compete against one another for one or more awards. In one such embodiment, the EGMs enable the players of those EGMs to participate in one or more gaming tournaments for one or more awards. Examples of group gaming systems are described in U.S. Pat. No. 8,070,583, entitled "Server Based Gaming System and Method for Selectively Providing One or More Different Tournaments"; U.S. Pat. No. 8,500,548, entitled "Gaming System and Method for Providing Team Progressive Awards"; and U.S. Pat. No. 8,562,423, entitled "Method and Apparatus for Rewarding Multiple Game Players for a Single Win," which are incorporated herein by reference.

In various embodiments, the gaming system includes one or more player tracking systems. Such player tracking systems enable operators of the gaming system (such as casinos or other gaming establishments) to recognize the value of customer loyalty by identifying frequent customers and rewarding them for their patronage. Such a player tracking system is configured to track a player's gaming activity. In one such embodiment, the player tracking system does so through the use of player tracking cards. In this embodiment, a player is issued a player identification card that has an encoded player identification number that uniquely identifies the player. When the player's playing tracking card is inserted into a card reader of the gaming system to begin a gaming session, the card reader reads the player identification number off the player tracking card to identify the player. The gaming system timely tracks any suitable information or data relating to the identified player's gaming session. The gaming system also timely tracks when the player tracking card is removed to conclude play for that gaming session. In another embodiment, rather than requiring insertion of a player tracking card into the card reader, the gaming system utilizes one or more portable devices, such as a mobile phone, a radio frequency identification tag, or any other suitable wireless device, to track when a gaming session begins and ends. In another embodiment, the gaming system utilizes any suitable biometric technology or ticket technology to track when a gaming session begins and ends.

In such embodiments, during one or more gaming sessions, the gaming system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the central display device and/or the upper display device. Examples of player tracking systems are described in U.S. Pat. No. 6,722,985, entitled "Universal Player Tracking System"; U.S. Pat. No. 6,908,387, entitled "Player Tracking Communication Mechanisms in a Gaming Machine"; U.S. Pat. No. 7,311,605, entitled "Player Tracking Assembly for Complete Patron Tracking for Both Gaming and Non-Gaming Casino Activity"; U.S. Pat. No. 7,611,411, entitled "Player Tracking Instruments Having Multiple Communication Modes"; U.S. Pat. No. 7,617,151, entitled "Alternative Player Tracking Techniques"; and U.S. Pat. No. 8,057,298, entitled "Virtual Player Tracking and Related Services," which are incorporated herein by reference.

Differentiating Certain Gaming Systems from General Purpose Computing Devices

Certain of the gaming systems described herein, such as EGMs located in a casino or another gaming establishment, include certain components and/or are configured to operate in certain manners that differentiate these systems from general purpose computing devices, i.e., certain personal gaming devices such as desktop computers and laptop computers.

For instance, EGMs are highly regulated to ensure fairness and, in many cases, EGMs are configured to award monetary awards up to multiple millions of dollars. To satisfy security and regulatory requirements in a gaming environment, hardware and/or software architectures are implemented in EGMs that differ significantly from those of general purpose computing devices. For purposes of illustration, a description of EGMs relative to general purpose computing devices and some examples of these additional (or different) hardware and/or software architectures found in EGMs are described below.

At first glance, one might think that adapting general purpose computing device technologies to the gaming industry and EGMs would be a simple proposition because both general purpose computing devices and EGMs employ processors that control a variety of devices. However, due to at least: (1) the regulatory requirements placed on EGMs, (2) the harsh environment in which EGMs operate, (3) security requirements, and (4) fault tolerance requirements, adapting general purpose computing device technologies to EGMs can be quite difficult. Further, techniques and methods for solving a problem in the general purpose computing device industry, such as device compatibility and connectivity issues, might not be adequate in the gaming industry. For instance, a fault or a weakness tolerated in a general purpose computing device, such as security holes in software or frequent crashes, is not tolerated in an EGM because in an EGM these faults can lead to a direct loss of funds from the EGM, such as stolen cash or loss of revenue when the EGM is not operating properly or when the random outcome determination is manipulated.

Certain differences between general purpose computing devices and EGMs are described below. A first difference between EGMs and general purpose computing devices is that EGMs are state-based systems. A state-based system stores and maintains its current state in a non-volatile memory such that, in the event of a power failure or other malfunction, the state-based system can return to that state when the power is restored or the malfunction is remedied. For instance, for a state-based EGM, if the EGM displays an award for a game of chance but the power to the EGM fails before the EGM provides the award to the player, the EGM stores the pre-power failure state in a non-volatile memory, returns to that state upon restoration of power, and provides the award to the player. This requirement affects the software and hardware design on EGMs. General purpose computing devices are not state-based machines, and a majority of data is usually lost when a malfunction occurs on a general purpose computing device.

A second difference between EGMs and general purpose computing devices is that, for regulatory purposes, the software on the EGM utilized to operate the EGM has been designed to be static and monolithic to prevent cheating by the operator of the EGM. For instance, one solution that has been employed in the gaming industry to prevent cheating and to satisfy regulatory requirements has been to manufacture an EGM that can use a proprietary processor running instructions to provide the game of chance from an EPROM or other form of non-volatile memory. The coding instructions on the EPROM are static (non-changeable) and must be approved by a gaming regulator in a particular jurisdiction and installed in the presence of a person representing the gaming jurisdiction. Any changes to any part of the software required to generate the game of chance, such as adding a new device driver used to operate a device during generation of the game of chance, can require burning a new EPROM approved by the gaming jurisdiction and reinstalling the new EPROM on the EGM in the presence of a gaming regulator. Regardless of whether the EPROM solution is used, to gain approval in most gaming jurisdictions, an EGM must demonstrate sufficient safeguards that prevent an operator or a player of an EGM from manipulating the EGM's hardware and software in a manner that gives him an unfair, and in some cases illegal, advantage.

A third difference between EGMs and general purpose computing devices is authentication—EGMs storing code are configured to authenticate the code to determine if the code is unaltered before executing the code. If the code has been altered, the EGM prevents the code from being executed. The code authentication requirements in the gaming industry affect both hardware and software designs on EGMs. Certain EGMs use hash functions to authenticate code. For instance, one EGM stores game program code, a hash function, and an authentication hash (which may be encrypted). Before executing the game program code, the EGM hashes the game program code using the hash function to obtain a result hash and compares the result hash to the authentication hash. If the result hash matches the authentication hash, the EGM determines that the game program code is valid and executes the game program code. If the result hash does not match the authentication hash, the EGM determines that the game program code has been altered (i.e., may have been tampered with) and prevents execution of the game program code. Examples of EGM code authentication are described in U.S. Pat. No. 6,962,530, entitled "Authentication in a Secure Computerized Gaming System"; U.S. Pat. No. 7,043,641, entitled "Encryption in a Secure Computerized Gaming System"; U.S. Pat. No. 7,201,662, entitled "Method and Apparatus for Software Authentication"; and U.S. Pat. No. 8,627,097, entitled "System and Method Enabling Parallel Processing of Hash Functions Using Authentication Checkpoint Hashes," which are incorporated herein by reference.

A fourth difference between EGMs and general purpose computing devices is that EGMs have unique peripheral device requirements that differ from those of a general purpose computing device, such as peripheral device security requirements not usually addressed by general purpose computing devices. For instance, in certain embodiments which utilize cash-based wagering and ticket-voucher based wagering in addition to any funding of an EGM via a mobile device, monetary devices, such as coin dispensers, bill validators, and ticket printers and computing devices that are used to govern the input and output of cash or other items having monetary value (such as tickets) to and from an EGM have security requirements that are not typically addressed in general purpose computing devices. Therefore, many general purpose computing device techniques and methods developed to facilitate device connectivity and device compatibility do not address the emphasis placed on security in the gaming industry.

To address some of the issues described above, a number of hardware/software components and architectures are utilized in EGMs that are not typically found in general purpose computing devices. These hardware/software components and architectures, as described below in more detail, include but are not limited to watchdog timers, voltage monitoring systems, state-based software architecture and supporting hardware, specialized communication interfaces, security monitoring, and trusted memory.

Certain EGMs use a watchdog timer to provide a software failure detection mechanism. In a normally-operating EGM, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits include a loadable timeout counter register to enable the operating software to set the timeout interval within a certain range of time. A differentiating feature of some circuits is that the operating software cannot completely disable the function of the watchdog timer. In other words, the watchdog timer always functions from the time power is applied to the board.

Certain EGMs use several power supply voltages to operate portions of the computer circuitry. These can be generated in a central power supply or locally on the computer board. If any of these voltages falls out of the tolerance limits of the circuitry they power, unpredictable operation of the EGM may result. Though most modern general purpose computing devices include voltage monitoring circuitry, these types of circuits only report voltage status to the operating software. Out of tolerance voltages can cause software malfunction, creating a potential uncontrolled condition in the general purpose computing device. Certain EGMs have power supplies with relatively tighter voltage margins than that required by the operating circuitry. In addition, the voltage monitoring circuitry implemented in certain EGMs typically has two thresholds of control. The first threshold generates a software event that can be detected by the operating software and an error condition then generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the EGM.

As described above, certain EGMs are state-based machines. Different functions of the game provided by the EGM (e.g., bet, play, result, points in the graphical presentation, etc.) may be defined as a state. When the EGM moves a game from one state to another, the EGM stores critical data regarding the game software in a custom non-volatile memory subsystem. This ensures that the player's wager and credits are preserved and to minimize potential disputes in the event of a malfunction on the EGM. In general, the EGM does not advance from a first state to a second state until critical information that enables the first state to be reconstructed has been stored. This feature enables the EGM to recover operation to the current state of play in the event of a malfunction, loss of power, etc. that occurred just prior to the malfunction. In at least one embodiment, the EGM is configured to store such critical information using atomic transactions.

Generally, an atomic operation in computer science refers to a set of operations that can be combined so that they appear to the rest of the system to be a single operation with only two possible outcomes: success or failure. As related to data storage, an atomic transaction may be characterized as series of database operations which either all occur, or all do not occur. A guarantee of atomicity prevents updates to the database occurring only partially, which can result in data corruption.

To ensure the success of atomic transactions relating to critical information to be stored in the EGM memory before a failure event (e.g., malfunction, loss of power, etc.), memory that includes one or more of the following criteria be used: direct memory access capability; data read/write capability which meets or exceeds minimum read/write access characteristics (such as at least 5.08 Mbytes/sec (Read) and/or at least 38.0 Mbytes/sec (Write)). Memory devices that meet or exceed the above criteria may be referred to as "fault-tolerant" memory devices.

Typically, battery-backed RAM devices may be configured to function as fault-tolerant devices according to the above criteria, whereas flash RAM and/or disk drive memory are typically not configurable to function as fault-tolerant devices according to the above criteria. Accordingly, battery-backed RAM devices are typically used to preserve EGM critical data, although other types of non-volatile memory devices may be employed. These memory devices are typically not used in typical general purpose computing devices.

Thus, in at least one embodiment, the EGM is configured to store critical information in fault-tolerant memory (e.g., battery-backed RAM devices) using atomic transactions. Further, in at least one embodiment, the fault-tolerant memory is able to successfully complete all desired atomic transactions (e.g., relating to the storage of EGM critical information) within a time period of 200 milliseconds or less. In at least one embodiment, the time period of 200 milliseconds represents a maximum amount of time for which sufficient power may be available to the various EGM components after a power outage event has occurred at the EGM.

As described previously, the EGM may not advance from a first state to a second state until critical information that enables the first state to be reconstructed has been atomically stored. After the state of the EGM is restored during the play of a game of chance, game play may resume and the game may be completed in a manner that is no different than if the malfunction had not occurred. Thus, for example, when a malfunction occurs during a game of chance, the EGM may be restored to a state in the game of chance just prior to when the malfunction occurred. The restored state may include metering information and graphical information that was displayed on the EGM in the state prior to the malfunction. For example, when the malfunction occurs during the play of a card game after the cards have been dealt, the EGM may be restored with the cards that were previously displayed as part of the card game. As another example, a bonus game may be triggered during the play of a game of chance in which a player is required to make a number of selections on a video display screen. When a malfunction has occurred after the player has made one or more selections, the EGM may be restored to a state that shows the graphical presentation just prior to the malfunction including an indication of selections that have already been made by the player. In general, the EGM may be restored to any state in a plurality of states that occur in the game of chance that occurs while the game of chance is played or to states that occur between the play of a game of chance.

Game history information regarding previous games played such as an amount wagered, the outcome of the game, and the like may also be stored in a non-volatile memory device. The information stored in the non-volatile memory may be detailed enough to reconstruct a portion of the graphical presentation that was previously presented on the EGM and the state of the EGM (e.g., credits) at the time the game of chance was played. The game history information may be utilized in the event of a dispute. For example, a player may decide that in a previous game of chance that they did not receive credit for an award that they believed they won. The game history information may be used to reconstruct the state of the EGM prior to, during, and/or after the disputed game to demonstrate whether the player was correct or not in her assertion. Examples of a state-based EGM, recovery from malfunctions, and game history are described in U.S. Pat. No. 6,804,763, entitled "High Performance Battery Backed RAM Interface"; U.S. Pat. No. 6,863,608, entitled "Frame Capture of Actual Game Play"; U.S. Pat. No. 7,111,141, entitled "Dynamic NV-RAM"; and U.S. Pat. No. 7,384,339, entitled, "Frame Capture of Actual Game Play," which are incorporated herein by reference.

Another feature of EGMs is that they often include unique interfaces, including serial interfaces, to connect to specific subsystems internal and external to the EGM. The serial devices may have electrical interface requirements that differ from the "standard" EIA serial interfaces provided by general purpose computing devices. These interfaces may include, for example, Fiber Optic Serial, optically coupled serial interfaces, current loop style serial interfaces, etc. In addition, to conserve serial interfaces internally in the EGM, serial devices may be connected in a shared, daisy-chain fashion in which multiple peripheral devices are connected to a single serial channel.

The serial interfaces may be used to transmit information using communication protocols that are unique to the gaming industry. For example, IGT's Netplex is a proprietary communication protocol used for serial communication between EGMs. As another example, SAS is a communication protocol used to transmit information, such as metering information, from an EGM to a remote device. Often SAS is used in conjunction with a player tracking system.

Certain EGMs may alternatively be treated as peripheral devices to a casino communication controller and connected in a shared daisy chain fashion to a single serial interface. In both cases, the peripheral devices are assigned device addresses. If so, the serial controller circuitry must implement a method to generate or detect unique device addresses. General purpose computing device serial ports are not able to do this.

Security monitoring circuits detect intrusion into an EGM by monitoring security switches attached to access doors in the EGM cabinet. Access violations result in suspension of game play and can trigger additional security operations to preserve the current state of game play. These circuits also function when power is off by use of a battery backup. In power-off operation, these circuits continue to monitor the access doors of the EGM. When power is restored, the EGM can determine whether any security violations occurred while power was off, e.g., via software for reading status registers. This can trigger event log entries and further data authentication operations by the EGM software.

Trusted memory devices and/or trusted memory sources are included in an EGM to ensure the authenticity of the software that may be stored on less secure memory subsystems, such as mass storage devices. Trusted memory devices and controlling circuitry are typically designed to not enable modification of the code and data stored in the memory device while the memory device is installed in the EGM. The code and data stored in these devices may include authentication algorithms, random number generators, authentication keys, operating system kernels, etc. The purpose of these trusted memory devices is to provide gaming regulatory authorities a root trusted authority within the computing environment of the EGM that can be tracked and verified as original. This may be accomplished via removal of the trusted memory device from the EGM computer and verification of the secure memory device contents is a separate third party verification device. Once the trusted memory device is verified as authentic, and based on the approval of the verification algorithms included in the trusted device, the EGM is enabled to verify the authenticity of additional code and data that may be located in the gaming computer assembly, such as code and data stored on hard disk drives. Examples of trusted memory devices are described in U.S. Pat. No. 6,685,567, entitled "Process Verification," which is incorporated herein by reference.

In at least one embodiment, at least a portion of the trusted memory devices/sources may correspond to memory that cannot easily be altered (e.g., "unalterable memory") such as EPROMS, PROMS, Bios, Extended Bios, and/or other memory sources that are able to be configured, verified, and/or authenticated (e.g., for authenticity) in a secure and controlled manner.

According to one embodiment, when a trusted information source is in communication with a remote device via a network, the remote device may employ a verification scheme to verify the identity of the trusted information source. For example, the trusted information source and the remote device may exchange information using public and private encryption keys to verify each other's identities. In another embodiment, the remote device and the trusted information source may engage in methods using zero knowledge proofs to authenticate each of their respective identities.

EGMs storing trusted information may utilize apparatuses or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected. Examples of trusted memory devices/sources are described in U.S. Pat. No. 7,515,718, entitled "Secured Virtual Network in a Gaming Environment," which is incorporated herein by reference.

Mass storage devices used in general purpose computing devices typically enable code and data to be read from and written to the mass storage device. In a gaming environment, modification of the gaming code stored on a mass storage device is strictly controlled and would only be enabled under specific maintenance type events with electronic and physical enablers required. Though this level of security could be provided by software, EGMs that include mass storage devices include hardware level mass storage data protection circuitry that operates at the circuit level to monitor attempts to modify data on the mass storage device and will generate both software and hardware error triggers should a data modification be attempted without the proper electronic and physical enablers being present. Examples of using a mass storage device are described in U.S. Pat. No. 6,149,522, entitled "Method of Authenticating Game Data Sets in an Electronic Casino Gaming System," which is incorporated herein by reference.

Various changes and modifications to the present embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A device comprising:
- a processor; and
- a memory device that stores a plurality of instructions, that when executed by the processor, cause the processor to:
  - capture:
    - data associated with a financial institution account,
    - user authentication data associated with the financial institution account, and
    - data associated with a fund transfer amount,
  - receive data associated with a financial institution confirmation of an availability of the fund transfer amount in the financial institution account,
  - receive data associated with a cashless wagering account which is distinct from any account of a gaming establishment patron management system and authentication data associated with the cashless wagering account, and
  - communicate, via a network, to a server of a cashless wagering system, each of the data associated with the cashless wagering account, the authentication data associated with the cashless wagering account and the data associated with the fund transfer amount, wherein a balance of the cashless wagering account is modified based on the fund transfer amount.

2. The device of claim 1, wherein the data associated with the cashless wagering account and the authentication data associated with the cashless wagering account is received from a mobile device.

3. The device of claim 2, wherein the data is received from the mobile device following the mobile device engaging a wireless interface of the device.

4. The device of claim 1, wherein the balance of the cashless wagering account is modified based on the fund transfer amount independent of any transfer of any physical forms of currency.

5. The device of claim 1, further comprising a housing and a card reader supported by the housing, wherein the data associated with the financial institution account is captured in association with a financial institution card.

6. The device of claim 1, wherein the user authentication data associated with the financial institution account is captured in association with a financial institution personal identification number.

7. The device of claim 1, wherein the data associated with the financial institution confirmation of the availability of the fund transfer amount in the financial institution account is received via a financial institution network.

8. The device of claim 1, further comprising a housing and a vault supported by the housing, wherein the vault is configured to store an amount of monetary currency.

9. A device comprising:
- a housing;
- a card reader supported by the housing;
- an input device supported by the housing;
- a wireless interface supported by the housing;
- a processor supported by the housing; and
- a memory device that stores a plurality of instructions, that when executed by the processor, cause the processor to:
  - capture, via the card reader, data associated with a financial institution account from a financial institution card,
  - receive, via at least one of the input device and the wireless interface, user authentication data associated with the financial institution account,
  - receive, via at least one of the input device and the wireless interface, data associated with an amount of funds, and
  - following a receipt, via a financial institution network and from a server of a financial institution that maintains the financial institution account, of data associated with a financial institution confirmation of an availability of the amount of funds in the financial institution account, communicate, to a server of a cashless wagering system and via a cashless wagering system application programming interface, data that results in a modification, based on the amount of funds, of a balance of a cashless wagering account which is distinct from any account of a gaming establishment patron management system, wherein following the modification of the balance of the cashless wagering account, at least part of the amount of funds are transferrable, via a gaming establishment data network, to a credit balance of an electronic gaming machine operating independent of the device.

10. The device of claim 9, wherein at least one of the user authentication data and the data associated with the amount of funds is received, via the wireless interface, from a mobile device.

11. The device of claim 10, wherein the electronic gaming machine is identified in association with a camera of the mobile device capturing a quick response code.

12. The device of claim 10, wherein data associated with the cashless wagering account is received, via the wireless interface, from the mobile device.

13. A method of operating a device, the method comprising:

capturing, via a processor:

data associated with a financial institution account, user authentication data associated with the financial institution account, and data associated with a fund transfer amount, receiving data associated with a financial institution confirmation of an availability of the fund transfer amount in the financial institution account, receiving data associated with a cashless wagering account which is distinct from any account of a gaming establishment patron management system and authentication data associated with the cashless wagering account, and communicating, via a network, to a server of a cashless wagering system, each of the data associated with the cashless wagering account, the authentication data associated with the cashless wagering account and the data associated with the fund transfer amount, wherein a balance of the cashless wagering account is modified based on the fund transfer amount.

14. The method of claim 13, wherein the data associated with the cashless wagering account and the authentication data associated with the cashless wagering account is received from a mobile device.

15. The method of claim 14, wherein the data is received from the mobile device following the mobile device engaging a wireless interface of the device.

16. The method of claim 13, wherein the balance of the cashless wagering account is modified based on the fund transfer amount independent of any transfer of any physical forms of currency.

17. The method of claim 13, wherein the data associated with the financial institution account is captured, via a card reader supported by a housing of the device, in association with a financial institution card.

18. The method of claim 13, wherein the user authentication data associated with the financial institution account is captured in association with a financial institution personal identification number.

19. The method of claim 13, wherein the data associated with the financial institution confirmation of the availability of the fund transfer amount in the financial institution account is received via a financial institution network.

20. The method of claim 13, further comprising storing, in a vault supported by a housing of the device, an amount of monetary currency.

* * * * *